US008515136B2

(12) United States Patent
Mori et al.

(10) Patent No.: US 8,515,136 B2
(45) Date of Patent: Aug. 20, 2013

(54) IMAGE PROCESSING DEVICE, IMAGE DEVICE, IMAGE PROCESSING METHOD

(75) Inventors: Katsuhiko Mori, Kawasaki (JP); Yuji Kaneda, Kitakyushu (JP); Masakazu Matsugu, Chiba (JP); Yusuke Mitarai, Yokohama (JP); Takashi Suzuki, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 11/330,138

(22) Filed: Jan. 12, 2006

(65) Prior Publication Data

US 2006/0115157 A1 Jun. 1, 2006

Related U.S. Application Data

(63) Continuation of application No. PCT/JP2004/010208, filed on Jul. 16, 2004.

(30) Foreign Application Priority Data

Jul. 18, 2003 (JP) ................................. 2003-199357
Jul. 18, 2003 (JP) ................................. 2003-199358
Jun. 4, 2004 (JP) ................................. 2004-167588
Jun. 4, 2004 (JP) ................................. 2004-167589

(51) Int. Cl.
*G06K 9/00* (2006.01)

(52) U.S. Cl.
USPC ........... 382/118; 382/181; 382/190; 382/209; 382/224

(58) Field of Classification Search
USPC ................. 382/115, 118, 116, 117, 181, 190, 382/209, 224
See application file for complete search history.

(56) References Cited

U.S. PATENT DOCUMENTS

| 5,774,591 | A | * | 6/1998 | Black et al. | 382/118 |
|---|---|---|---|---|---|
| 6,563,950 | B1 | * | 5/2003 | Wiskott et al. | 382/118 |
| 7,039,233 | B2 | | 5/2006 | Mori et al. | 382/181 |
| 7,054,850 | B2 | | 5/2006 | Matsugu | 706/48 |
| 7,106,887 | B2 | | 9/2006 | Kinjo | |
| 7,472,134 | B2 | | 12/2008 | Kaku | |
| 2002/0001468 | A1 | * | 1/2002 | Kaku | 396/310 |

(Continued)

FOREIGN PATENT DOCUMENTS

| EP | 0552770 | 1/1993 |
| EP | 0767442 A2 | 4/1997 |

(Continued)

OTHER PUBLICATIONS

U.S. Application No. 11/630,031 (Suzuki et al.), filed 12/19/06 (Gau 2624).

(Continued)

*Primary Examiner* — Wesley Tucker
(74) *Attorney, Agent, or Firm* — Fitzpatrick, Cella, Harper & Scinto

(57) ABSTRACT

An image including a face is input (S201), a plurality of local features are detected from the input image, a region of a face in the image is specified using the plurality of detected local features (S202), and an expression of the face is determined on the basis of differences between the detection results of the local features in the region of the face and detection results which are calculated in advance as references for respective local features in the region of the face (S204).

18 Claims, 53 Drawing Sheets

U.S. PATENT DOCUMENTS

| | | | |
|---|---|---|---|
| 2002/0181765 A1 | 12/2002 | Mori et al. | 382/158 |
| 2002/0181775 A1 | 12/2002 | Matsugu | 382/195 |
| 2003/0053685 A1* | 3/2003 | Lestideau | 382/164 |
| 2003/0133599 A1* | 7/2003 | Tian et al. | 382/118 |
| 2006/0074653 A1 | 4/2006 | Mitari et al. | 704/240 |
| 2006/0115157 A1 | 6/2006 | Mori et al. | 382/190 |
| 2006/0204053 A1 | 9/2006 | Mori et al. | 382/118 |
| 2006/0228005 A1 | 10/2006 | Mabsugu et al. | 382/116 |
| 2007/0076960 A1* | 4/2007 | Takamori et al. | 382/224 |

FOREIGN PATENT DOCUMENTS

| | | |
|---|---|---|
| JP | 2-573126 | 10/1996 |
| JP | 8-315133 A | 11/1996 |
| JP | 9-44676 | 2/1997 |
| JP | 9-251534 | 9/1997 |
| JP | 2-767814 | 4/1998 |
| JP | 2-973676 | 9/1999 |
| JP | 11-283036 | 10/1999 |
| JP | 3-062181 | 4/2000 |
| JP | 2000-306095 | 11/2000 |
| JP | 2000-347278 A | 12/2000 |
| JP | 2001-051338 A | 2/2001 |
| JP | 2002-024229 A | 1/2002 |
| JP | 2002-077592 A | 3/2002 |
| JP | 2002-358500 | 12/2002 |
| JP | 2003-018587 A | 1/2003 |
| JP | 2003-092701 A | 3/2003 |
| JP | 2003-187352 A | 7/2003 |
| JP | 2003-271958 | 9/2003 |
| WO | 02/09025 A1 | 1/2002 |

OTHER PUBLICATIONS

Ebine, Hideuki et al., "Automatic Detection of Reference Face and the Recognition of Transition of Facial Expressions", The Trans. of the Inst. of Elect. Eng. of Japan, C, vol. 121-C, No. 10, Inst. of Elect. Eng. of Japan, Oct. 1, 2001, pp. 157-1585 (w/Abstract).

Bai, Ou et al., "Model Based Facial Feature Tracking and Facial Expression Recognition from Image Sequence", The Trans. of the Inst. of Elect. Eng. of Japan, D, vol. 119-3, No. 5, The Inst. of Elect. Eng. of Japan, May 1, 1999, pp. 699-706 (w/partial translation).

Omori, Tadahiko et al., "A Simple Method to Extract the Best Shot from Sequential Images", The Inst. of Elec. Info. and Comm. Eng. Gijutsu kenkyu Hokoku, vol. 101, No. 425, The Inst. of Elect., Info. and Comm. Eng., Nov. 8, 2001, pp. 27-32 (w/Abstract).

LeCun et al., "Convolutional Networks for Images Speech, and Time Series" in Handbook of Brain Theory and Neural Networks (M. Arbib, Ed.), MIT Press, pp. 255-258.

Search Report, dated Apr. 16, 2008, in EP Application EP 04 74 7673.

Fasel, B. et al., "Automatic facial expression analysis: a survey", Pattern Recognition, Elsevier, GB, vol. 36, No. 1, XP004383473, pp. 259-275, Jan. 2003.

European Office Action dated Jun. 19, 2009 in corresponding European Application No. 04747673.4.

European Office Action dated Jul. 6, 2010 in corresponding European Application No. 04747673.4.

Hideyuki Ebine, et al., "The Recognition of Facial Expressions Based on Tracking of Movement of Specific Facial Areas from Reference Face", IEEJ Transactions on Electronics, Information and Systems, vol. 122-C, No. 3, pp. 471-484, The Institute of Electrical Engineers of Japan (Mar. 1, 2002).

Hiroshi Shimoda, et al., "A Prototype of a Real-Time Expression Recognition System from Dynamic Facial Image", Human Interface Society Journal, vol. 1, No. 2, pp. 25-32, Human Interface Society (May 24, 1999).

Japanese Office Action dated Jul. 20, 2010 in Japanese Application No. 2004-167589.

Japanese Office Action dated Jul. 20, 2010 in Japanese Application No. 2004-167588.

Japanese Office Action dated Oct. 15, 2010 issued in Japanese Patent Application No. 2004-167588.

Japanese Office Action dated Feb. 3, 2012, concerning Japanese Patent Application No. 2010-211395.

Omori, Masahiko, et al., "A Simple Method to Extract the Best Shot from Sequential Images", The Inst. of Elec. Info and Comm. Eng. Gijutsu kenkyu Hokoki, vol. 101, No. 425, The Inst. of Elect. Info. and Comm. Eng., Nov. 8, 2001, pp. 27-32 (w/Abstract).

Yamada et al., "The Expression Recognition of Facial Images Using Higher-order Local Autocorrelation Features and Discriminant Analysis", ITE Technical Report, Japan, The Institute of Image Information and Television Engineers, vol. 27, Apr. 18, 2003.

Pramadihanto et al, "Face Identification under Varying Pose Using a Single Example View", The Transactions of the Institute of Electronics, Information and Communication Engineers, vol. J80-D-II, Oct. 9, 1997.

Japanese Office Action dated Jun. 15, 2012, concerning Japanese Patent Application No. 2010-211395.

Japanese Office Action dated Feb. 15, 2013, concerning Japanese Patent Application No. 2010-211395.

G. Donato, T.J. Sejnowski et al., "Classifying Facial Actions", IEEE Trans. PAMI, vol. 21, No. 10, Oct. 1999.

Y. Tian et al., "Recognizing Action Units for Facial Expression Analysis", IEEE Trans. PAMI vol. 23, No. 2, Feb. 2001.

Shigeru Akamatsu, "Computer Facial Recognition—A Survey", Systems & Computers in Japan, vol. 30, No. 10, 1999, pp. 76-89 (Engl.-lang. transl. only).

M. Turk et al., "Eigenfaces for recognition", J. Cognitive Neurosci., vol. 3, No. 1, pp. 71-86, Mar. 1991.

M. Kamachi et al., "Dynamic properties influence the perception of facial expression", Perception, vol. 30, pp. 875-887, Jul. 2001.

M. Matsugu et al, "Convolutional Spiking Neural Network Model for Robust Face Detection", 2002, Intl. Conf. on Neural Info. Proc. (ICONIP02).

LeCun et al., "Convolutional Networks for Images Speech, and Time Series" in Handbook of Brain Theory and Neural Networks (M. Arbib, Ed.), MIT Press, pp. 255-258, 1995.

\* cited by examiner

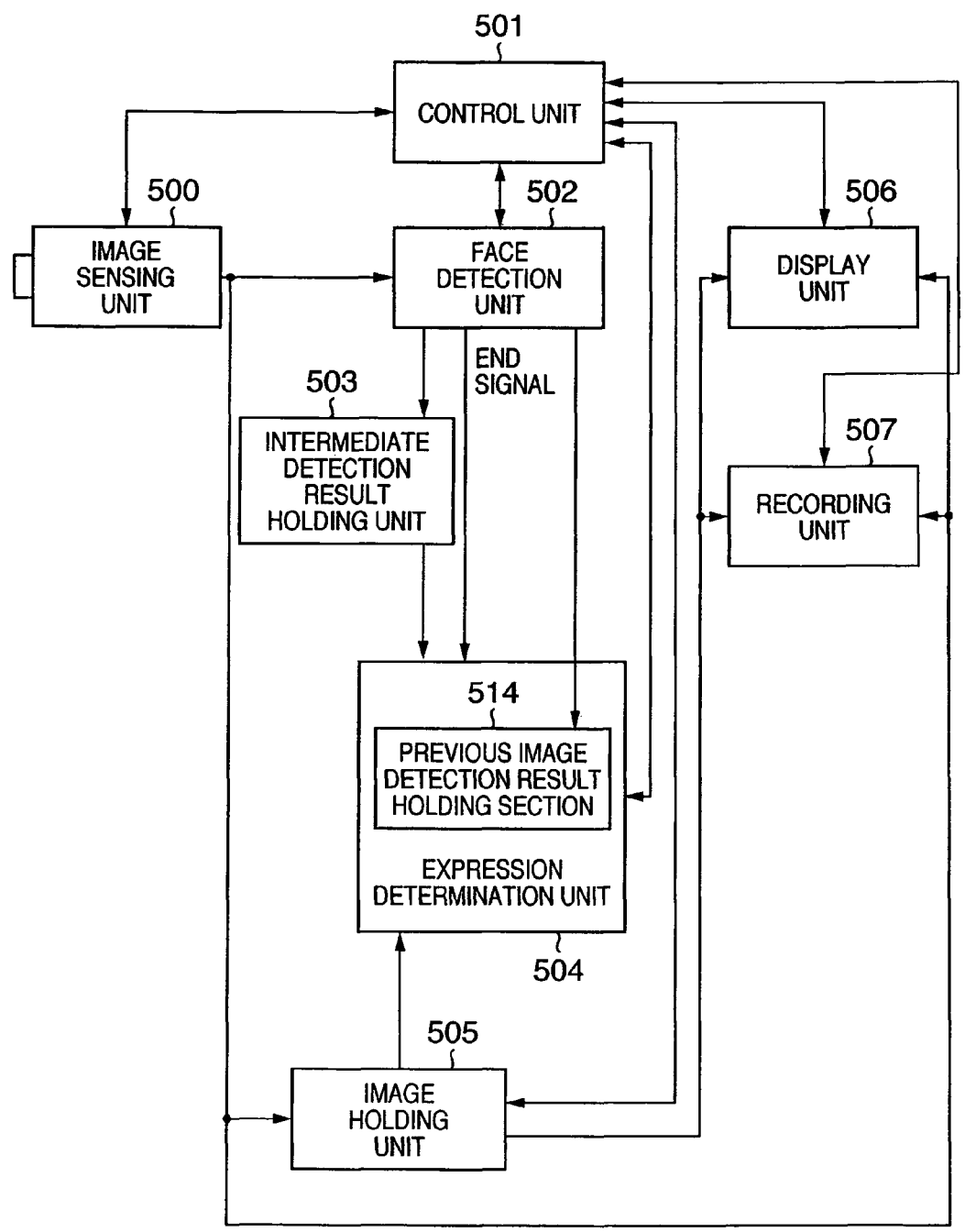

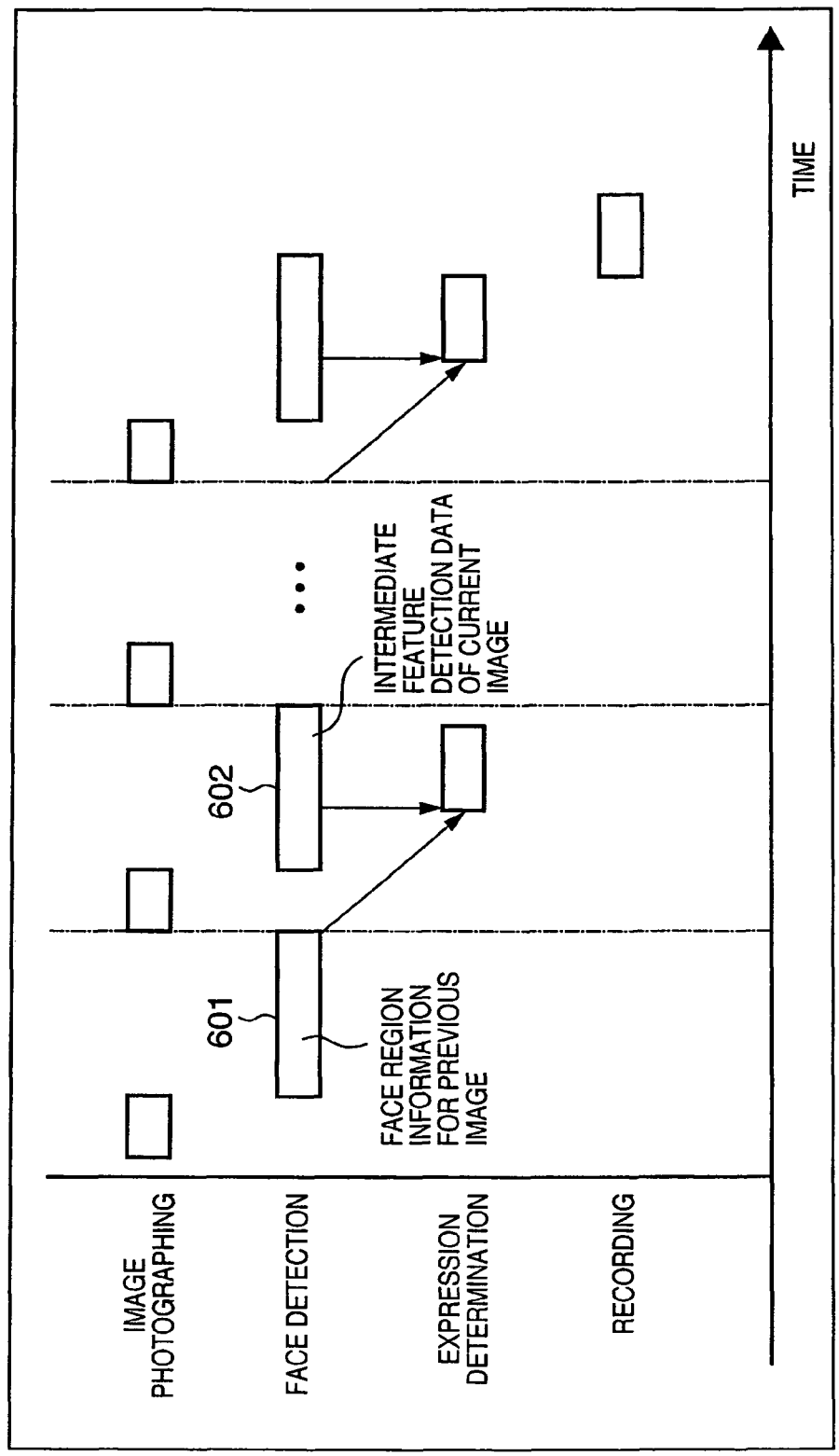

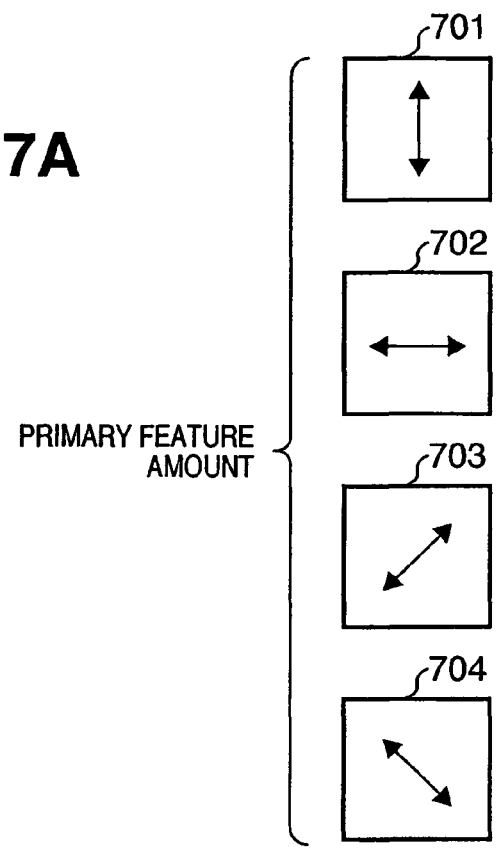
FIG. 7A — PRIMARY FEATURE AMOUNT
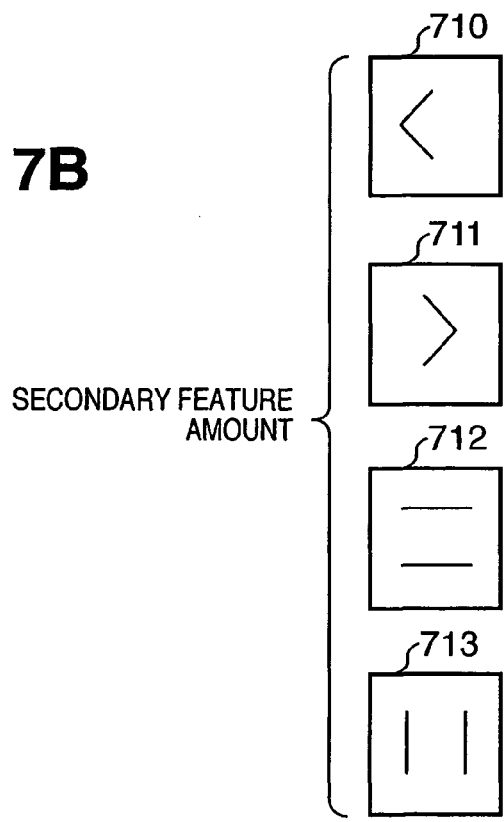
FIG. 7B — SECONDARY FEATURE AMOUNT F I G. 7C
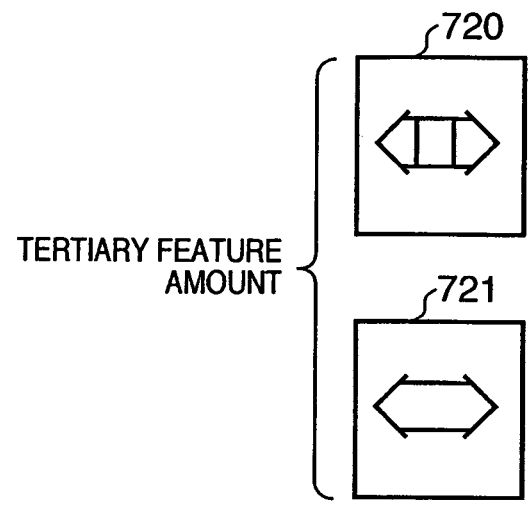
TERTIARY FEATURE AMOUNT
F I G. 7D
QUARTIC FEATURE AMOUNT
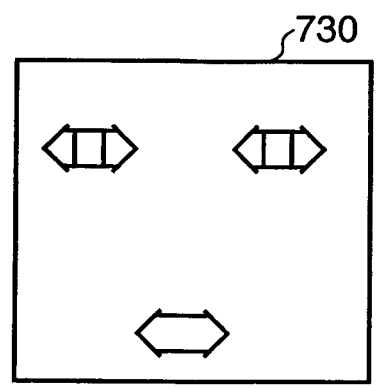

FIG. 16

| TYPE OF IMAGE | FACE IMAGE | | | BACKGROUND IMAGE |
|---|---|---|---|---|
| TYPE OF FACE | MR. A | MR. B | OTHER | |
| FACE DETECTION IDENTIFIER | USED AS CORRECT ANSWER DATA | USED AS CORRECT ANSWER DATA | USED AS CORRECT ANSWER DATA | USED AS WRONG ANSWER DATA |
| MR. A IDENTIFIER | USED AS CORRECT ANSWER DATA | USED AS WRONG ANSWER DATA | USED AS WRONG ANSWER DATA | NOT USED |
| MR. B IDENTIFIER | USED AS WRONG ANSWER DATA | USED AS CORRECT ANSWER DATA | USED AS WRONG ANSWER DATA | NOT USED |

FIG. 19

| FACE NUMBER | EXPRESSION | PERSON |
|---|---|---|
| 1 | SMILE | A |
| 2 | EMOTIONLESS | B |
| . . . . | | |

FIG. 22

| PERSON | EXPRESSION DETERMINATION PARAMETER |
|---|---|
| MR. A | VARIATION RATE OF EYE-MOUTH DISTANCE > 1.1, CHEEK REGION EDGE DENSITY > 3.0,... |
| MR. B | VARIATION RATE OF EYE-MOUTH DISTANCE > 1.2, CHEEK REGION EDGE DENSITY > 3.5,... |
| MR. C | VARIATION RATE OF EYE-MOUTH DISTANCE > 1.05, CHEEK REGION EDGE DENSITY > 2.0,... |
| MR. D | VARIATION RATE OF EYE-MOUTH DISTANCE > 1.1, CHEEK REGION EDGE DENSITY > 3.1,... |

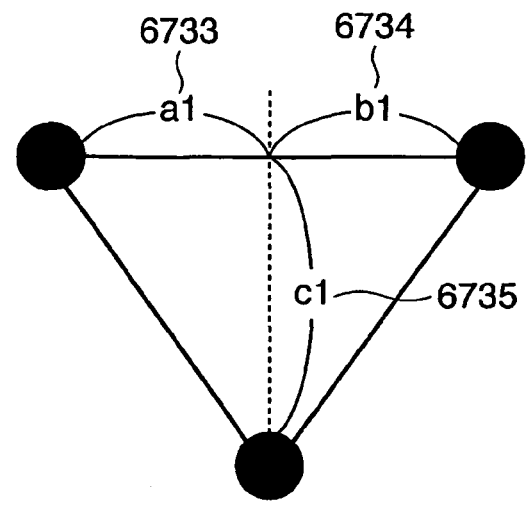
F I G. 50
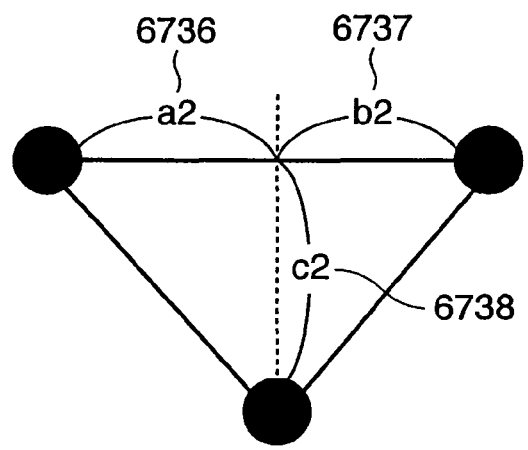
F I G. 51
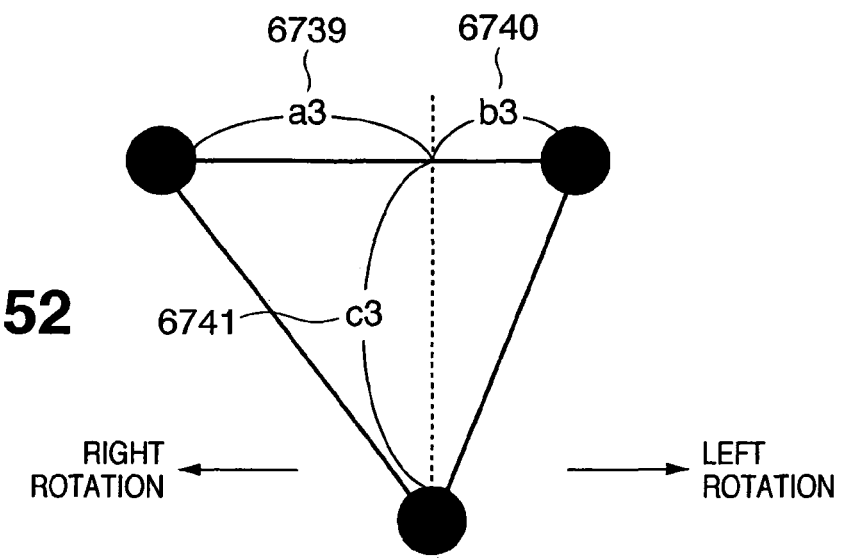
F I G. 52

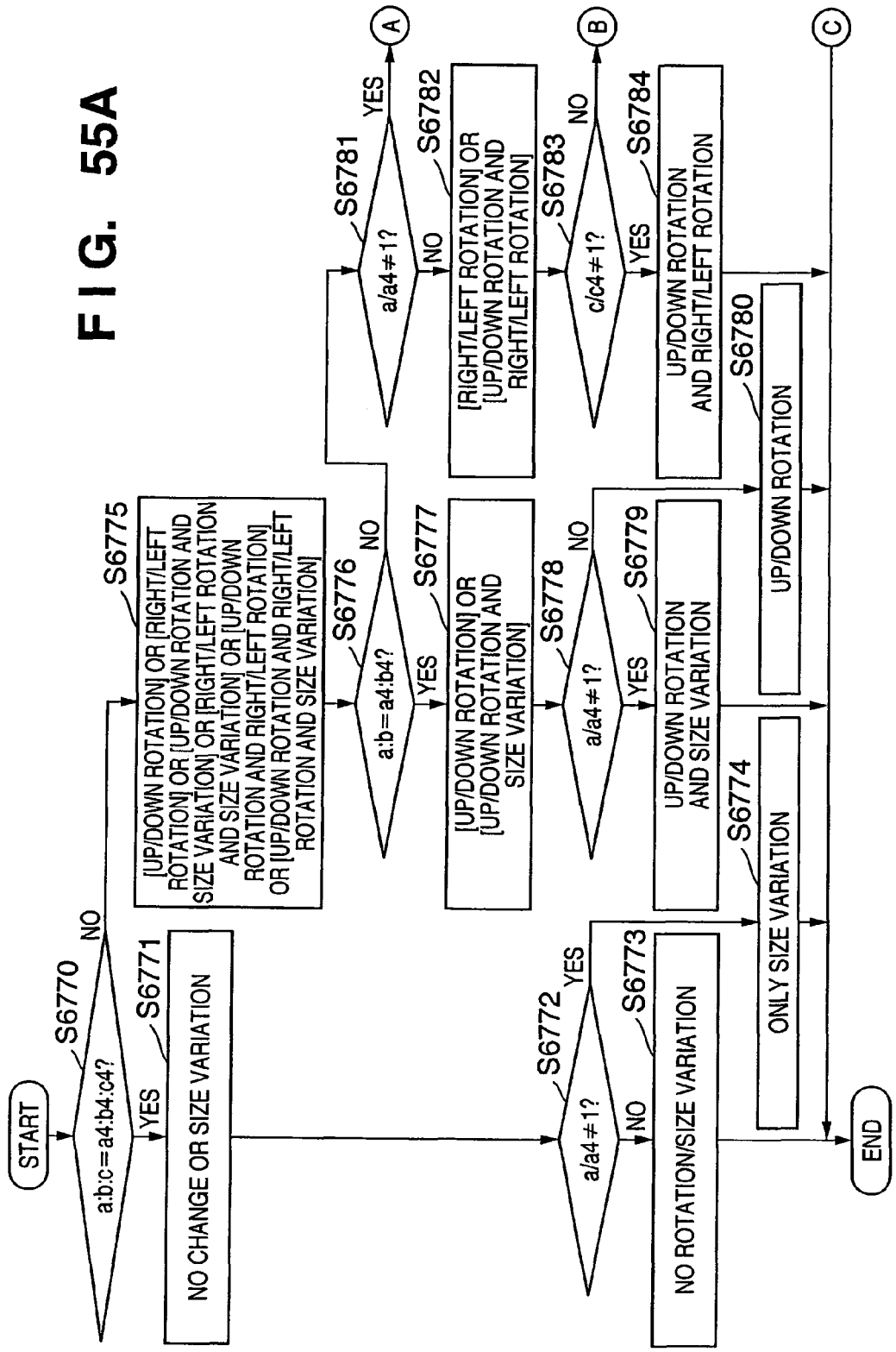

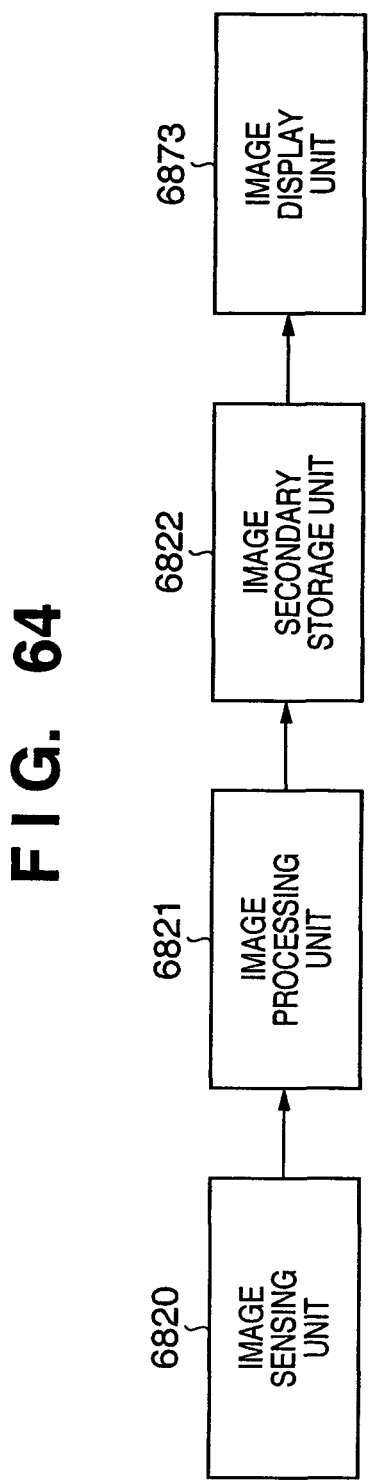
F I G. 64

IMAGE PROCESSING DEVICE, IMAGE DEVICE, IMAGE PROCESSING METHOD

This application is a continuation application of Application No. PCT/JP2004/010208, filed Jul. 16, 2004, which claims priority from Japanese Patent Application No. 2003-199357, filed Jul. 18, 2003, Japanese Patent Application No. 2003-199358, filed Jul. 18, 2003, Japanese Patent Application No. 2004-167588, filed Jun. 4, 2004, and Japanese Patent Application No. 2004-167589, filed Jun. 4, 2004, the entire contents of which are incorporated by reference herein.

TECHNICAL FIELD

The present invention relates to a technique for making discrimination associated with the category of an object such as a face or the like in an input image.

BACKGROUND ART

Conventionally, in the fields of image recognition and speech recognition, a recognition processing algorithm specialized to a specific object to be recognized is implemented by computer software or hardware using a dedicated parallel image processing processor, thus detecting an object to be recognized.

Especially, some references about techniques for detecting a face as a specific object to be recognized from an image including the face have been conventionally disclosed (for example, see patent references 1 to 5).

According to one of these techniques, an input image is searched for a face region using a template called a standard face, and partial templates are then applied to feature point candidates such as eyes, nostrils, mouth, and the like to authenticate a person. However, this technique is vulnerable to a plurality of face sizes and a change in face direction, since the template is initially used to match the entire face to detect the face region. To solve such problem, a plurality of standard faces corresponding to different sizes and face directions must be prepared to perform detection. However, the template for the entire face has a large size, resulting in high processing cost.

According to another technique, eye and mouth candidate groups are obtained from a face image, and face candidate groups formed by combining these groups are collated with a pre-stored face structure to find regions corresponding to the eyes and mouth. According to this technique, the number of faces in the input image is one or a few, the face size is large to some extent, and an image in which a most region in the input image corresponds to a face, and which has a small background region is assumed as the input image.

According to still another technique, a plurality of eye, nose, and mouth candidates are obtained, and a face is detected on the basis of the positional relationship among feature points, which are prepared in advance.

According to still another technique, upon checking matching levels between shape data of respective parts of a face and an input image, the shape data are changed, and search regions of respective face parts are determined based on the previously obtained positional relationship of parts. With this technique, shape data of an iris, mouth, nose, and the like are held. Upon obtaining two irises first, and then a mouth, nose, and the like, search regions of face parts such as a mouth, nose, and the like are limited on the basis of the positions of the irises. That is, this algorithm finds the irises (eyes) first in place of parallelly detecting face parts such as irises (eyes), a mouth, nose, and the like that form a face, and detects face parts such as a mouth and nose using the detection result of the irises. This method assumes a case wherein an image includes only one face, and the irises are accurately obtained. If the irises are erroneously detected, search regions of other features such as a mouth, nose, and the like cannot be normally set.

According to still another technique, a region model set with a plurality of determination element acquisition regions is moved in an input image to determine the presence/absence of each determination element within each of these determination element acquisition regions, thus recognizing a face. In this technique, in order to cope with faces with different sizes or rotated faces, region models with different sizes and rotated region models must be prepared. If a face with a given size or a given rotation angle is not present in practice, many wasteful calculations are made.

Some methods of recognizing an expression of a face in an image have been conventionally proposed (for example, see non-patent references 1 and 2).

One of these techniques is premised on that partial regions of a face are visually accurately extracted from a frame image. In another technique, rough positioning of a face pattern is automated, but positioning of feature points requires visual fine adjustment. In still another technique (for example, see patent reference 6), expression elements are converted into codes using muscle actions, a neural system connection relationship, and the like, thus determining an emotion. However, with this technique, regions of parts required to recognize an expression are fixed, and regions required for recognition are likely to be excluded or unwanted regions are likely to be included, thus adversely influencing the recognition precision of the expression.

In addition, a system that detects a change corresponding to an Action Unit of FACS (Facial Action Coding System) known as a method of objectively describing facial actions, so as to recognize an expression has been examined.

In still another technique (for example, see patent reference 7), an expression is estimated in real time to deform a three-dimensional (3D) face model, thus reconstructing the expression. With this technique, a face is detected based on a difference image between an input image which includes a face region and a background image which does not include any face region, and a chromaticity value indicating a flesh color, and the detected face region is then binarized to detect the contour of the face. The positions of eyes and a mouth are obtained from the region within the contour, and a rotation angle of the face is calculated based on the positions of the eyes and mouth to apply rotation correction. After that, two-dimensional (2D) discrete cosine transforms are calculated to estimate an expression. The 3D face model is converted based on a change amount of a spatial frequency component, thereby reconstructing the expression. However, detection of flesh color is susceptible to variations of illumination and the background. For this reason, in this technique, non-detection or erroneous detection of an object is more likely to occur in the first flesh color extraction process.

As a method of identifying a person based on a face image, the Eigenface method (Turk et. al.) is well known (for example, see non-patent references 3 and 4). With this method, principal component analysis is applied to a set of density value vectors of many face images to calculate orthonormal bases called eigenfaces, and the Karhunen-Loeve expansion is applied to the density value vector of an input face image to obtain a dimension-compressed face pattern. The dimension-compressed pattern is used as a feature vector for identification.

As one of methods for identifying a person in practice using the feature vector for identification, the above reference presents a method of calculating the distances between the dimension-compressed face pattern of an input image and those of persons, which are held, and identifying a class to which the pattern with the shortest distance belongs as a class to which the input face image belongs, i.e., a person. However, this method basically uses a corrected image as an input image, which is obtained in such a manner that the position of a face in an image is detected using an arbitrary method, and the face region undergoes size normalization and rotation correction to obtain a face image.

An image processing method that can recognize a face in real time has been disclosed as a prior art (for example, see patent reference 8). In this method, an arbitrary region is extracted from an input image, and it is checked if that region corresponds to a face region. If that region is a face region, matching between a face image that has undergone affine transformation and contrast correction, and faces that have already been registered in a learning database is made to estimate the probabilities that this is the same person. Based on the probabilities, a person who is most likely to be the same as the input face of the registered persons is output.

As one of conventional expression recognition apparatuses, a technique for determining an emotion from an expression has been disclosed (for example, see patent reference 6). An emotion normally expresses a feeling such as anger, grief, and the like. According to the above technique, the following method is available. That is, predetermined expression elements are extracted from respective features of a face on the basis of relevant rules, and expression element information is extracted from the predetermined expression elements. Note that the expression elements indicate an open/close action of an eye, an action of a brow, an action of a metope, an up/down action of lips, an open/close action of the lips, and an up/down action of a lower lip. The expression element for a brow action includes a plurality of pieces of facial element information such as the slope of the left brow, that of the right brow, and the like.

An expression element code that quantifies the expression element is calculated from the plurality of pieces of expression element information that form the obtained expression element on the basis of predetermined expression element quantization rules. Furthermore, an emotion amount is calculated for each emotion category from the predetermined expression element code determined for each emotion category using a predetermined emotion conversion formula. Then, a maximum value of emotion amounts of each emotion category is determined as an emotion.

The shapes and lengths of respective features of faces have large differences depending on persons. For example, some persons who have eyes slanting down outwards, narrow eyes, and so forth in their emotionless images as sober faces, look deceptively joyful from perceptual viewpoints based on such images, but they are simply keeping their faces straight. Furthermore, face images do not always have constant sizes and directions of faces. When the face size has varied or the face has rotated, required feature amounts must be normalized in accordance with the face size variation or face rotation variation.

When time-series images that assume a daily scene including a non-expression scene as a conversation scene in addition to an expression scene and a non-expression scene as a sober face image are used as an input image, for example, non-expression scenes such as a pronunciation "o" in a conversation scene similar to an expression of surprise, pronunciations "i" and "e" similar to expressions of joy, and the like may be erroneously determined as expression scenes.

Patent reference 1: Japanese Patent Laid-Open No. 9-251534
Patent reference 2: Japanese Patent No. 2767814
Patent reference 3: Japanese Patent Laid-Open No. 9-44676
Patent reference 4: Japanese Patent No. 2973676
Patent reference 5: Japanese Patent Laid-Open No. 11-283036
Patent reference 6: Japanese Patent No. 2573126
Patent reference 7: Japanese Patent No. 3062181
Patent reference 8: Japanese Patent Laid-Open No. 2003-271958
Non-patent reference 1: G. Donate, T. J. Sejnowski, et. al, "Classifying Facial Actions" IEEE Trans. PAMI, vol. 21, no. 10, October 1999
Non-patent reference 2: Y. Tian, T. Kaneda, and J. F. Cohn "Recognizing Action Units for Facial Expression Analysis" IEEE tran. PAMI vol. 23, no. 2, February 2001
Non-patent reference 3: Shigeru Akamatsu "Computer Facial Recognition—Survey—", the Journal of IEICE Vol. 80, No. 8, pp. 2031-2046, August 1997
Non-patent reference 4: M. Turk, A. Pentland, "Eigenfaces for recognition" J. Cognitive Neurosci., vol. 3, no. 1, pp. 71-86, March 1991

DISCLOSURE OF INVENTION

Problems that Invention is to Solve

The present invention has been made in consideration of the aforementioned problems, and has as its object to provide a technique for easily determining a person who has a face in an image, and an expression of the face.

It is another object of the present invention to cope with variations of the position and direction of an object by a simple method in face detection in an image, expression determination, and person identification.

It is still another object of the present invention to provide a technique which is robust against personal differences in facial expressions, expression scenes, and the like, and can accurately determine the category of an object in an image. It is still another object of the present invention to provide a technique that can accurately determine an expression even when the face size has varied or the face has rotated.

Means for Solving Problems

In order to achieve the objects of the present invention, for example, an image processing apparatus of the present invention comprises the following arrangement.

That is, an image processing apparatus is characterized by comprising:
input means for inputting an image including an object;
object region specifying means for detecting a plurality of local features from the image input by the input means, and specifying a region of the object in the image using the plurality of detected local features; and
determination means for determining a category of the object using detection results of the respective local features in the region of the object specified by the object region specifying means, and detection results of the respective local features for an object image which is set in advance as a reference.

In order to achieve the objects of the present invention, for example, an image processing apparatus of the present invention comprises the following arrangement.

That is, an image processing apparatus is characterized by comprising:

input means for successively inputting frame images each including a face;

face region specifying means for detecting a plurality of local features from the frame image input by the input means, and specifying a region of a face in the frame image using the plurality of detected local features; and determination means for determining an expression of the face on the basis of detection results of the local features detected by the face region specifying means in a region of an image of a second frame, as a frame after a first frame, which positionally corresponds to a region of a face specified by the face region specifying means in an image of the first frame input by the input means.

In order to achieve the objects of the present invention, for example, an image processing apparatus of the present invention comprises the following arrangement.

That is, an image processing apparatus is characterized by comprising:

input means for inputting an image including a face;

face region specifying means for detecting a plurality of local features from the image input by the input means, and specifying a region of a face in the image using the plurality of detected local features;

first determination means for identifying a person who has the face in the image input by the input means using detection results of the local features in the region of the face detected by the face region specifying means, and detection results of the local features which are obtained in advance from images of respective faces; and second determination means for determining an expression of the face using detection results of the local features in the region of the face detected by the face region specifying means, and detection results of the local features for a face image which is set in advance as a reference.

In order to achieve the objects of the present invention, for example, an image processing method of the present invention comprises the following arrangement.

That is, an image processing method is characterized by comprising:

an input step of inputting an image including an object;

an object region specifying step of detecting a plurality of local features from the image input in the input step, and specifying a region of the object in the image using the plurality of detected local features; and a determination step of determining a category of the object using detection results of the respective local features in the region of the object specified in the object region specifying step, and detection results of the respective local features for an object image which is set in advance as a reference.

In order to achieve the objects of the present invention, for example, an image processing method of the present invention comprises the following arrangement.

That is, an image processing method is characterized by comprising:

an input step of successively inputting frame images each including a face;

a face region specifying step of detecting a plurality of local features from the frame image input in the input step, and specifying a region of a face in the frame image using the plurality of detected local features; and a determination step of determining an expression of the face on the basis of detection results of the local features detected in the face region specifying step in a region of an image of a second frame succeeding to a first frame, the region of the image of the second frame positionally corresponds to a region of a face specified in the face region specifying step in an image of the first frame input in the input step.

In order to achieve the objects of the present invention, for example, an image processing method of the present invention comprises the following arrangement.

That is, an image processing method is characterized by comprising:

an input step of inputting an image including a face;

a face region specifying step of detecting a plurality of local features from the image input in the input step, and specifying a region of a face in the image using the plurality of detected local features;

a first determination step of identifying a person who has the face in the image input in the input step using detection results of the local features in the region of the face detected in the face region specifying step, and detection results of the local features which are obtained in advance from images of respective faces; and a second determination step of determining an expression of the face using detection results of the local features in the region of the face detected in the face region specifying step, and detection results of the local features for a face image which is set in advance as a reference.

In order to achieve the objects of the present invention, for example, an image sensing apparatus according to the present invention, which comprises the aforementioned image processing apparatus, is characterized by comprising image sensing means for, when an expression determined by the determination means matches a predetermined expression, sensing an image input by the input means.

In order to achieve the objects of the present invention, for example, an image processing method of the present invention comprises the following arrangement.

That is, an image processing method is characterized by comprising:

an input step of inputting an image including a face;

a first feature amount calculation step of calculating feature amounts of predetermined portion groups in a face in the image input in the input step;

a second feature amount calculation step of calculating feature amounts of the predetermined portion groups of a face in an image including the face of a predetermined expression;

a change amount calculation step of calculating change amounts of the feature amounts of the predetermined portion groups on the basis of the feature amounts calculated in the first feature amount calculation step and the feature amounts calculated in the second feature amount calculation step;

a score calculation step of calculating scores for the respective predetermined portion groups on the basis of the change amounts calculated in the change amount calculation step for the respective predetermined portion groups; and a determination step of determining an expression of the face in the image input in the input step on the basis of the scores calculated in the score calculation step for the respective predetermined portion groups.

In order to achieve the objects of the present invention, for example, an image processing method of the present invention comprises the following arrangement.

That is, an image processing apparatus is characterized by comprising:

input means for inputting an image including a face;

first feature amount calculation means for calculating feature amounts of predetermined portion groups in a face in the image input by the input means;

second feature amount calculation means for calculating feature amounts of the predetermined portion groups of a face in an image including the face of a predetermined expression;

change amount calculation means for calculating change amounts of the feature amounts of the predetermined portion groups on the basis of the feature amounts calculated by the first feature amount calculation means and the feature amounts calculated by the second feature amount calculation means;

score calculation means for calculating scores for the respective predetermined portion groups on the basis of the change amounts calculated by the change amount calculation means for the respective predetermined portion groups; and determination means for determining an expression of the face in the image input by the input means on the basis of the scores calculated by the score calculation means for the respective predetermined portion groups.

In order to achieve the objects of the present invention, for example, an image sensing apparatus of the present invention is characterized by comprising:

the aforementioned image processing apparatus;

image sensing means for sensing an image to be input to the input means; and storage means for storing an image determined by the determination means.

Effect of Invention

With the arrangements of the present invention, identification of a face in an image and determination of an expression of the face can be easily made.

Also, variations of the position and direction of an object can be coped with by a simple method in face detection in an image, expression determination, and person identification.

Furthermore, the category of an object in an image can be more accurately determined by a method robust against personal differences in facial expressions, expression scenes, and the like.

Moreover, even when the face size has varied or the face has rotated, an expression can be accurately determined.

Other features and advantages of the present invention will become apparent from the following description taken in conjunction with the accompanying drawings. Note that the same reference numerals denote the same or similar parts throughout the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 5 is a block diagram showing the functional arrangement of an image processing apparatus according to the third embodiment of the present invention;

FIG. 6 is a timing chart showing the operation of the arrangement shown in FIG. 5;

FIG. 7A shows primary features;

FIG. 7B shows secondary features;

FIG. 7C shows tertiary features;

FIG. 7D shows a quartic feature;

FIG. 16 is a table showing data used upon learning in each of three identifiers;

FIG. 19 is a table showing an example of the configuration of data managed by an integration unit 1708;

FIG. 22 is a table showing an example of the configuration of expression determination data;

FIG. 50 shows the distance between right and left eyes, the distances between the right and left eyes and nose, and the distance between the eye and nose when a size variation has occurred;

FIG. 51 shows the distance between right and left eyes, the distances between the right and left eyes and nose, and the distance between the eye and nose when an up/down rotation variation has occurred;

FIG. 52 shows the distance between right and left eyes, the distances between the right and left eyes and nose, and the distance between the eye and nose when a right/left rotation variation has occurred;

FIG. 55A is a flowchart of a process for determining a size variation, right/left rotation variation, and up/down rotation variation;

FIG. 64 is a block diagram showing the functional arrangement of an image sensing apparatus according to the 14th embodiment of the present invention.

BEST MODE FOR CARRYING OUT THE INVENTION

Preferred embodiments of the present invention will be described in detail hereinafter with reference to the accompanying drawings.

First Embodiment

Figure 1:
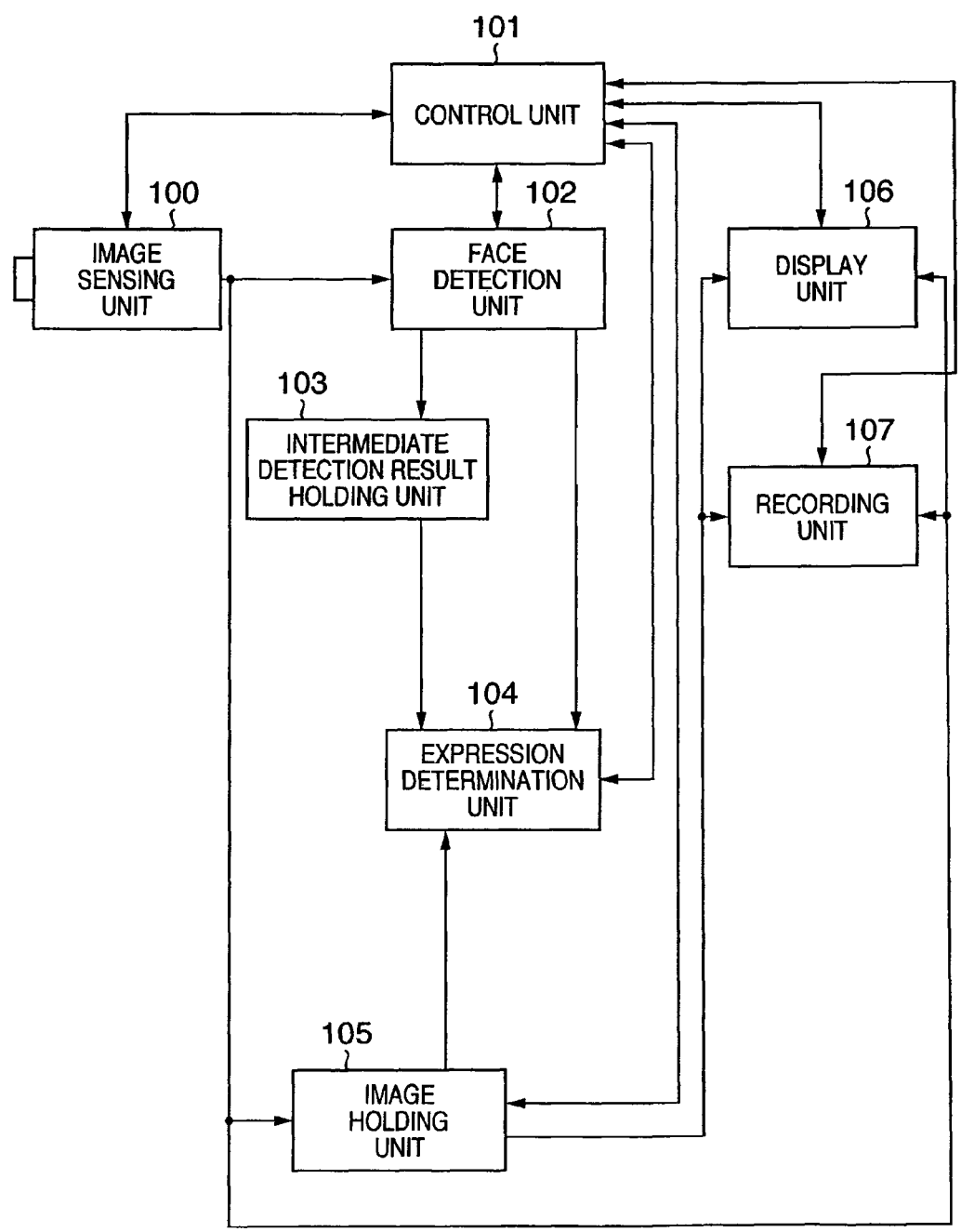
FIG. 1 is a block diagram showing the functional arrangement of an image processing apparatus according to the first embodiment of the present invention.

FIG. 1 is a block diagram showing the functional arrangement of an image processing apparatus according to this embodiment. An image processing apparatus according to this embodiment detects a face from an image and determines its expression, and comprises an image sensing unit 100, control unit 101, face detection unit 102, intermediate detection result holding unit 103, expression determination unit 104, image holding unit 105, display unit 106, and recording unit 107. Respective units will be explained below.

The image sensing unit 100 senses an image, and outputs the sensed image (photographed image) to the face detection unit 102, image holding unit 105, display unit 106, or recording unit 107 on the basis of a control signal from the control unit 101.

The control unit 101 performs processes for controlling the overall image processing apparatus according to this embodiment. The control unit 101 is connected to the image sensing unit 100, face detection unit 102, intermediate detection result holding unit 103, expression determination unit 104, image holding unit 105, display unit 106, and recording unit 107, and controls these units so that they operate at appropriate timings.

The face detection unit 102 executes a process for detecting regions of faces in the photographed image (regions of face images included in the photographed image) from the image sensing unit 101. This process is equivalent to, i.e., a process for obtaining the number of face regions in the photographed image, the coordinate positions of the face regions in the photographed images, the sizes of the face regions, and the rotation amounts of the face regions in the image (for example, if a face region is represented by a rectangle, a rotation amount indicates a direction and slope of this rectangle in the photographed image). Note that these pieces of information (the number of face regions in the photographed image, the coordinate positions of the face regions in the photographed images, the sizes of the face regions, and the rotation amounts of the face regions in the image) will be generally referred to as "face region information" hereinafter. Therefore, the face regions in the photographed image can be specified by obtaining the face region information.

These detection results are output to the expression determination unit 104. Also, intermediate detection results (to be described later) obtained during the detection process are output to the intermediate detection result holding unit 103. The intermediate detection result holding unit 103 holds the intermediate feature detection results.

The expression determination unit 104 receives data of the face region information output from the face detection unit 102 and data of the intermediate feature detection results output from the intermediate detection result holding unit 103. The expression determination unit 104 reads a full or partial photographed image (in case of the partial image, only an image of the face region) from the image holding unit 105, and executes a process for determining an expression of a face in the read image by a process to be described later.

The image holding unit 105 temporarily holds the photographed image output from the image sensing unit 100, and outputs the full or partial photographed image held by itself to the expression determination unit 104, display unit 106, and recording unit 107 on the basis of a control signal from the control unit 101.

The display unit 106 comprises, e.g., a CRT, liquid crystal display, or the like, and displays the full or partial photographed image output from the image holding unit 105 or a photographed image sensed by the image sensing unit 100.

The recording unit 107 comprises a device such as one for recording information on a recording medium such as a hard disk drive, DVD-RAM, compact flash (registered trademark), or the like, and records the image held by the image holding unit 105 or a photographed image sensed by the image sensing unit 100.

A main process for determining an expression of a face in a photographed image, which is executed by the operations of the aforementioned units, will be described below using FIG. 2 which shows the flowchart of this process.

The image sensing unit 100 photographs an image on the basis of a control signal from the control unit 101 (step S201). Data of the photographed image is displayed on the display unit 106, is also output to the image holding unit 105, and is further input to the face detection unit 102.

The face detection unit 102 executes a process for detecting a region of a face in the photographed image using the input photographed image (step S202). The face region detection process will be described in more detail below.

A series of processes for detecting local features in the photographed image and specifying a face region will be described below with reference to FIGS. 7A, 7B, 7C, and 7D, in which FIG. 7A shows primary features, FIG. 7B shows secondary features, FIG. 7C shows tertiary features, and FIG. 7D shows a quartic feature.

Primary features as the most primitive local features are detected first. As the primary features, as shown in FIG. 7A, a vertical feature 701, horizontal feature 702, upward-sloping oblique feature 703, and downward-sloping oblique feature 704 are to be detected. Note that "feature" represents an edge segment in the vertical direction taking the vertical feature 701 as an example.

Since a technique for detecting segments in respective directions in the photographed image is known to those who are skilled in the art, segments in respective directions are detected from the photographed image using this technique so as to generate an image that has a vertical feature alone detected from the photographed image, an image that has a horizontal feature alone detected from the photographed image, an image that has an upward-sloping oblique feature alone detected from the photographed image, and an image that has a downward-sloping oblique feature alone detected from the photographed image. As a result, since the sizes (the numbers of pixels in the vertical and horizontal directions) of the four images (primary feature images) are the same as that of the photographed image, each feature image and photographed image have one-to-one correspondence between them. In each feature image, pixels of the detected feature assume values different from those of the remaining portion. For example, the pixels of the feature assume 1, and those of the remaining portion assume 0. Therefore, if pixels assume a pixel value=1 in the feature image, it is determined that corresponding pixels in the photographed image are those which form a primary feature.

By generating the primary feature image group in this way, the primary features in the photographed image can be detected.

Next, a secondary feature group as combinations of any of the detected primary feature group is detected. The secondary feature group includes a right-open V-shaped feature 710, left-open V-shaped feature 711, horizontal parallel line feature 712, and vertical parallel line feature 713, as shown in FIG. 7B. The right-open V-shaped feature 710 is a feature defined by combining the upward-slanting oblique feature 703 and downward-slanting oblique feature 704 as the primary features, and the left-open V-shaped feature 711 is a feature defined by combining the downward-slanting oblique feature 704 and upward-slanting oblique feature 703 as the primary features. Also, the horizontal parallel line feature 712 is a feature defined by combining the horizontal features 702 as the primary features, and the vertical parallel line feature 713 is a feature defined by combining the vertical features 701 as the primary features.

As in generation of the primary feature images, an image that has the right-open V-shaped feature 710 alone detected from the photographed image, an image that has the left-open V-shaped feature 711 alone detected from the photographed image, an image that has the horizontal parallel line feature 712 alone detected from the photographed image, and an image that has the vertical parallel line feature 713 alone detected from the photographed image are generated. As a result, since the sizes (the numbers of pixels in the vertical and horizontal directions) of the four images (secondary feature images) are the same as that of the photographed image, each feature image and photographed image have one-to-one correspondence between them. In each feature image, pixels of the detected feature assume values different from those of the remaining portion. For example, the pixels of the feature assume 1, and those of the remaining portion assume 0. Therefore, if pixels assume a pixel value=1 in the feature image, it is determined that corresponding pixels in the photographed image are those which form a secondary feature.

By detecting the secondary feature image group in this way, the secondary features in the photographed image can be generated.

A tertiary feature group as combinations of any features of the detected secondary feature group is detected from the photographed image. The tertiary feature group includes an eye feature 720 and mouth feature 721, as shown in FIG. 7C. The eye feature 720 is a feature defined by combining the right-open V-shaped feature 710, left-open V-shaped feature 711, horizontal parallel line feature 712, and vertical horizontal parallel line feature 713 as the secondary features, and the mouth feature 721 is a feature defined by combining the right-open V-shaped feature 710, left-open V-shaped feature 711, and horizontal parallel line feature 712 as the secondary features.

As in generation of the primary feature images, an image that has the eye feature 720 alone detected from the photographed image, and an image that has the mouth feature 721 alone detected from the photographed image are generated. As a result, since the sizes (the numbers of pixels in the vertical and horizontal directions) of the four images (tertiary feature images) are the same as that of the photographed image, each feature image and photographed image have one-to-one correspondence between them. In each feature image, pixels of the detected feature assume values different from those of the remaining portion. For example, the pixels of the feature assume 1, and those of the remaining portion assume 0. Therefore, if pixels assume a pixel value=1 in the feature image, it is determined that corresponding pixels in the photographed image are those which form a tertiary feature.

By generating the tertiary feature image group in this way, the tertiary features in the photographed image can be detected.

A quartic feature as a combination of the detected tertiary feature group is detected from the photographed image. The quartic feature is a face feature itself in FIG. 7D. The face feature is a feature defined by combining the eye features 720 and mouth feature 721 as the tertiary features.

As in generation of the primary feature images, an image that detects the face feature (quartic feature image) is generated. As a result, since the size (the numbers of pixels in the vertical and horizontal directions) of the quartic feature image is the same as that of the photographed image, the feature image and photographed image have one-to-one correspondence between them. In each feature image, pixels of the detected feature assume values different from those of the remaining portion. For example, the pixels of the feature assume 1, and those of the remaining portion assume 0. Therefore, if pixels assume a pixel value=1 in the feature image, it is determined that corresponding pixels in the photographed image are those which form a quartic feature. Therefore, by referring to this quartic feature image, the position of the face region can be calculated based on, e.g., the barycentric positions of pixels with a pixel value=1.

When this face region is specified by a rectangle, a slope of this rectangle with respect to the photographed image is calculated to obtain information indicating the degree and direction of the slope of this rectangle with respect to the photographed image, thus obtaining the aforementioned rotation amount.

In this way, the face region information can be obtained. The obtained face region information is output to the expression determination unit 104, as described above.

The respective feature images (primary, secondary, tertiary, and quartic feature images in this embodiment) are output to the intermediate detection result holding unit 103 as the intermediate detection results.

In this fashion, by detecting the quartic feature in the photographed image, the region of the face in the photographed image can be obtained. By applying the aforementioned face region detection process to the entire photographed image, even when the photographed image includes a plurality of face regions, respective face regions can be detected.

Note that the face region detection process can also be implemented using a neural network that attains image recognition by parallel hierarchical processes, and such process is described in M. Matsugu, K. Mori, et. al, "Convolutional Spiking Neural Network Model for Robust Face Detection", 2002, International Conference On Neural Information Processing (ICONIP02).

Figure 8:
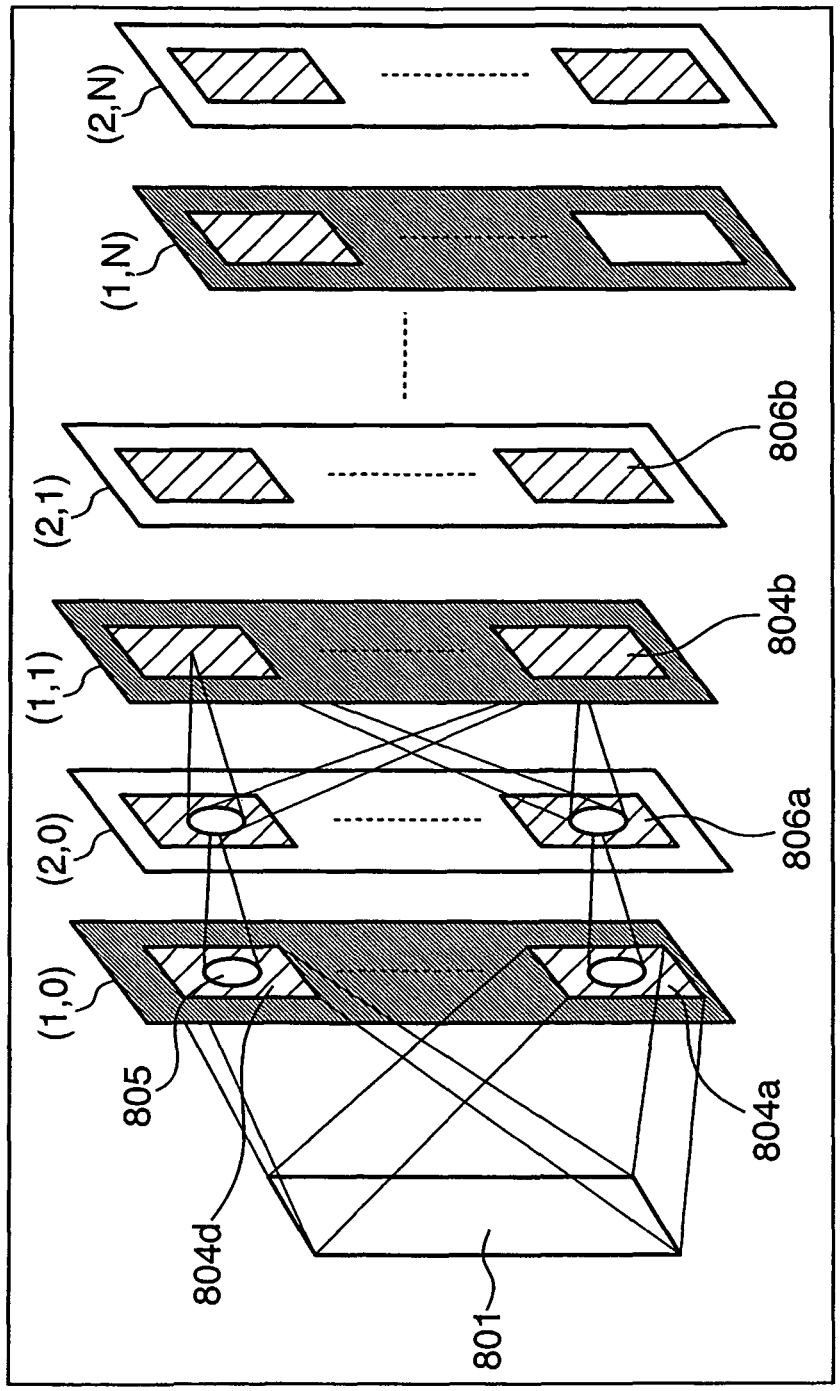
FIG. 8 is a view showing the arrangement of a neural network used to make image recognition.

The processing contents of the neural network will be described below with reference to FIG. 8. FIG. 8 shows the arrangement of the neural network required to attain image recognition.

This neural network hierarchically handles information associated with recognition (detection) of an object, geometric feature, or the like in a local region of input data, and its basic structure corresponds to a so-called Convolutional network structure (LeCun, Y. and Bengio, Y., 1995, "Convolutional Networks for Images Speech, and Time Series" in Handbook of Brain Theory and Neural Networks (M. Arbib, Ed.), MIT Press, pp. 255-258). The final layer (uppermost layer) can obtain the presence/absence of an object to be detected, and position information of that object on the input data if it is present. By applying this neural network to this embodiment, the presence/absence of a face region in the photographed image and the position information of that face region on the photographed image if it is present are obtained from the final layer.

Referring to FIG. 8, a data input layer 801 is a layer for inputting image data. A first feature detection layer (1, 0) detects local, low-order features (which may include color component features in addition to geometric features such as specific direction components, specific spatial frequency components, and the like) at a single position in a local region having, as the center, each of positions of the entire frame (or a local region having, as the center, each of predetermined sampling points over the entire frame) at a plurality of scale levels or resolutions in correspondence with the number of a plurality of feature categories.

A feature integration layer (2, 0) has a predetermined receptive field structure (a receptive field means a connection range with output elements of the immediately preceding layer, and the receptive field structure means the distribution of connection weights), and integrates (arithmetic operations such as sub-sampling by means of local averaging, maximum output detection or the like, and so forth) a plurality of neuron element outputs in identical receptive fields from the feature detection layer (1, 0). This integration process has a role of allowing positional deviations, deformations, and the like by spatially blurring the outputs from the feature detection layer (1, 0). Also, the receptive fields of neurons in the feature integration layer have a common structure among neurons in a single layer.

Respective feature detection layers (1, 1), (1, 2), ..., (1, M) and respective feature integration layers (2, 1), (2, 2), ..., (2, M) are subsequent layers, the former layers ((1, 1), ...) detect a plurality of different features by respective feature detection modules, and the latter layers ((2, 1), ...) integrate detection results associated with a plurality of features from the previous feature detection layers. Note that the former feature detection layers are connected (wired) to receive cell element outputs of the previous feature integration layers that belong to identical channels. Sub-sampling as a process executed by each feature integration layer performs averaging and the like of outputs from local regions (local receptive fields of corresponding feature integration layer neurons) from a feature detection cell mass of an identical feature category.

In order to detect respective features shown in FIGS. 7A, 7B, 7C, and 7D using the neural network shown in FIG. 8, the receptive field structure used in detection of each feature detection layer is designed to detect a corresponding feature, thus allowing detection of respective features. Also, receptive field structures used in face detection in the face detection layer as the final layer are prepared to be suited to respective sizes and rotation amounts, and face data such as the size, direction, and the like of a face can be obtained by detecting which of receptive field structures is used in detection upon obtaining the result indicating the presence of the face.

Referring back to FIG. 2, the control unit 101 checks with reference to the result of the face region detection process in step S202 by the face detection unit 102 whether or not a face region is present in the photographed image (step S203). As this determination method, for example, whether or not a quartic feature image is obtained is checked. If a quartic feature image is obtained, it is determined that a face region is present in the photographed image. In addition, it may be checked if neurons in the (face) feature detection layer include that which has an output value equal to or larger than a given reference value, and it may be determined that a face (region) is present at a position indicated by a neuron with an output value equal to or larger than the reference value. If no neuron with an output value equal to or larger than the reference value is found, it is determined that no face is present.

If it is determined as a result of the determination process in step S203 that no face region is present in the photographed image, since the face detection unit 102 advises the control unit 101 accordingly, the flow returns to step S201, and the control unit 101 controls the image sensing unit 100 to sense a new image.

On the other hand, if a face region is present, since the face detection unit 102 advises the control unit 101 accordingly, the flow advances to step S204, and the feature images held in the intermediate detection result holding unit 103 are output to the expression determination unit 104, which executes a process for determining an expression of a face included in the face region in the photographed image using the input feature images and face region information (step S204).

Note that an image to be output from the image holding unit 105 to the expression determination unit 104 is the entire photographed image. However, the present invention is not limited to such specific image. For example, the control unit 101 may specify a face region in the photographed image using the face region information, and may output an image of the face region alone to the expression determination unit 104.

The expression determination process executed by the expression determination unit 104 will be described in more detail below. As described above, in order to detect a facial expression, an Action Unit (AU) used in FACS (Facial Action Coding System) as a general expression description method is detected to perform expression determination based on the type of the detected AU. AUs include "outer brow raiser", "lip stretcher", and the like. Since every expressions of human being can be described by combining AUs, if all AUs can be detected, all expressions can be determined in principle. However, there are 44 AUs, and it is not easy to detect all of them.

Figure 9:
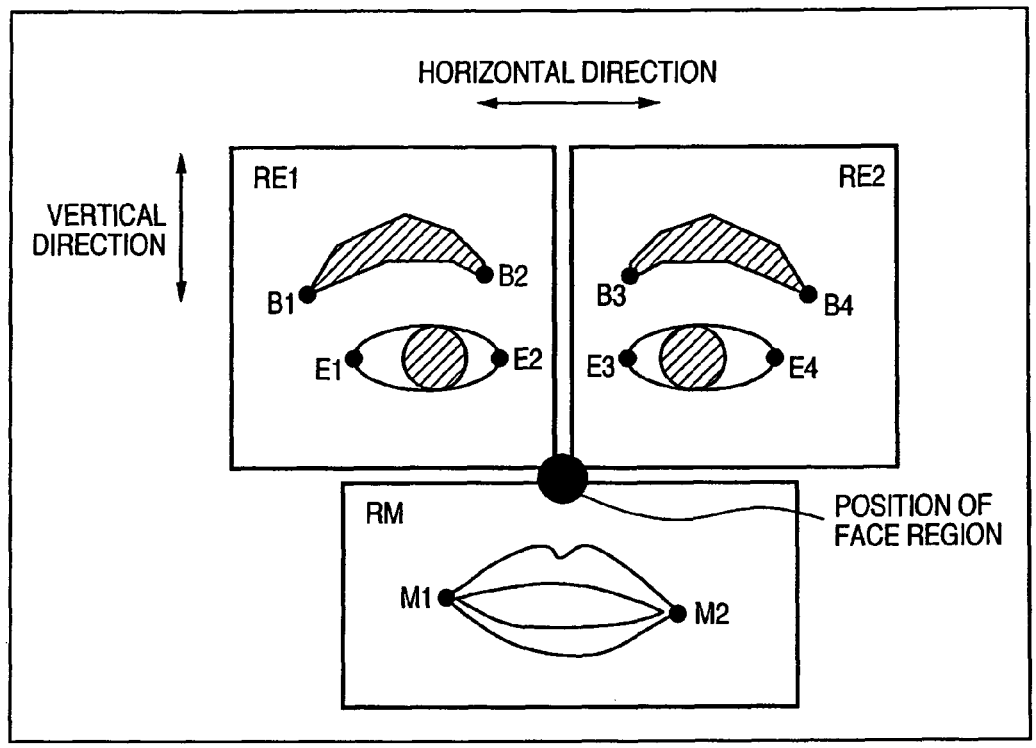
FIG. 9 shows respective feature points.

Hence, in this embodiment, as shown in FIG. 9, end points (B1 to B4) of brows, end points (E1 to E4) of eyes, and end points (M1, M2) of a mouth are set as features used in expression determination, and an expression is determined by obtaining changes of relative positions of these feature points. Some AUs can be described by changes of these feature points, and a basic expression can be determined. Note that changes of respective feature points in respective expressions are held in the expression determination unit 104 as expression determination data, and are used in the expression determination process of the expression determination unit 104.

FIG. 9 shows respective feature points.

Respective feature points for expression detection shown in FIG. 9 are the end portions of the eyes, brows, and the like, and the shapes of the end portions are roughly defined by a right-open V shape and left-open V shape. Hence, these end portions correspond to the right-open V-shaped feature 710 and left-open V-shaped feature 711 as the secondary features shown in, e.g., FIG. 7B.

The feature points used in expression detection have already been detected in the middle stage of the face detection process in the face detection unit 102. The intermediate processing results of the face detection process are held in the intermediate feature result holding unit 103.

However, the right-open V-shaped feature 710 and left-open V-shaped feature 711 are present at various positions such as a background and the like in addition to a face. For this reason, a face region in the secondary feature image is specified using the face region information obtained by the face detection unit 102, and the end points of the right-open V-shaped feature 710 and left-open V-shaped feature 711, i.e., those of the brows, eyes, and mouth are detected in this region.

Hence, as shown in FIG. 9, search ranges (RE1, RE2) of the end points of the brows and eyes, and a search range (RM) of the end points of the mouth are set in the face region. With reference to pixel values within the set search ranges, the positions of pixels at the two ends in the horizontal direction in FIG. 9 of those which form the right-open V-shaped feature 710 and left-open V-shaped feature 711 are detected, and the detected positions are determined as those of the feature points. Note that the relative positions of these search ranges (RE1, RE2, RM) with respect to the central position of the face region are set in advance.

For example, since the positions of end pixels in the horizontal direction in FIG. 9 of those which form the right-open V-shaped feature 710 within the search range RE1 are B1 and E1, each of these positions is set as that of one end of the brow or eye. The positions in the vertical direction of the positions B1 and E1 are referred to, and the upper one of these positions is set as the position of one end of the brow. In FIG. 9, since B1 is located at a position higher than E1, B1 is set as the position of one end of the brow.

In this manner, the positions of one ends of the eye and brow can be obtained. Likewise, the same process is repeated for the left-open V-shaped feature within the search range RE1, and the positions of B2 and E2 of the other ends of the brow and eye can be obtained.

With the above processes, the positions of the two ends of the eyes, brows, and mouth, i.e., the positions of the respective feature points can be obtained. Since each feature image has the same size as that of the photographed image, and pixels have one-to-one correspondence between these images, the positions of the respective feature points in the feature images can also be used as those in the photographed image.

In this embodiment, the secondary features are used in the process for obtaining the positions of the respective feature points. However, the present invention is not limited to this, and one or a combination of the primary features, tertiary features, and the like may be used.

For example, in addition to the right-open V-shaped feature 710 and left-open V-shaped feature 711, the eye feature 720 and mouth feature 721 as the tertiary features shown in FIG. 7C, and the vertical feature 701, horizontal feature 702, upward-sloping oblique feature 703, and downward-sloping oblique feature 704 as the primary features can also be used.

Figure 10:
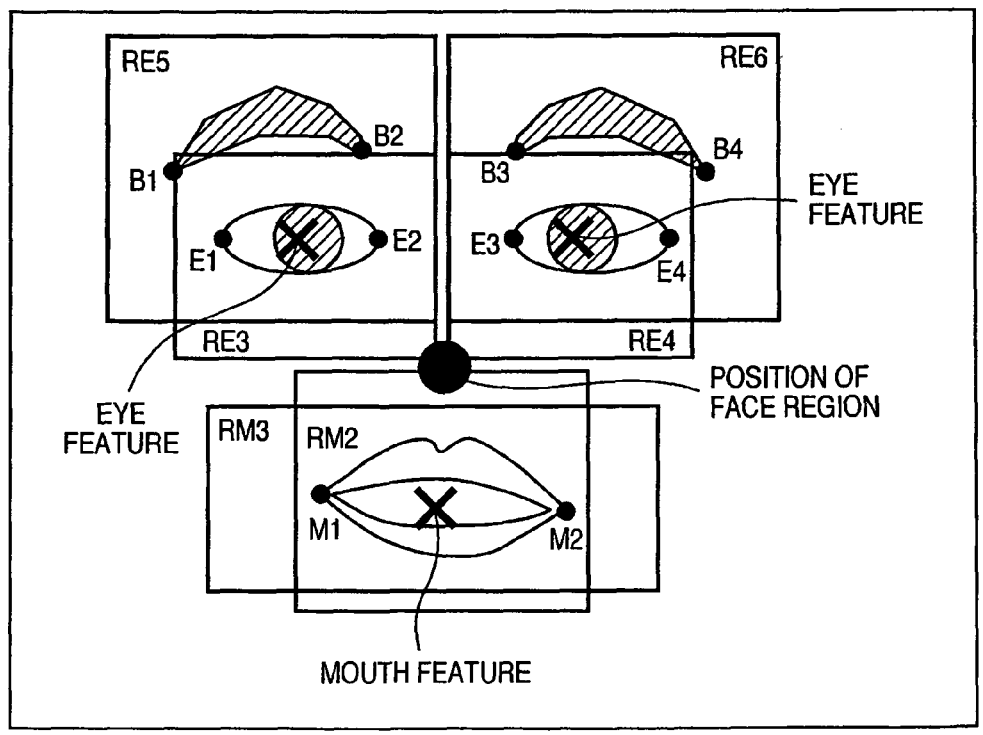
FIG. 10 is a view for explaining a process for obtaining feature points using primary and tertiary features in the face region shown in FIG. 9.

A process for obtaining feature points using the primary and tertiary features will be explained below using FIG. 10. FIG. 10 is a view for explaining a process for obtaining feature points using the primary and tertiary features in the face region shown in FIG. 9.

As shown in FIG. 10, eye search ranges (RE3, RE4) and a mouth search range (RM2) are set, and a range where pixel groups which form the eye features 720 and mouth feature 721 are located is obtained with reference to pixel values within the set search ranges. Then, search ranges (RE5, RE6) of the end points of the brows and eyes and a search range (RM3) of the end points of the mouth are set to cover the obtained range.

Within each search range (RE5, RE6, RM3), a continuous line segment formed of the vertical feature 701, horizontal feature 702, upward-sloping oblique feature 703, and downward-sloping oblique feature 704 is traced to consequently obtain positions of two ends in the horizontal direction, thus obtaining the two ends of the eyes, brows, and mouth. Since the primary features are basically results of edge extraction, regions equal to or higher than a given threshold value are converted into thin lines for respective detection results, and end points can be detected by tracing the conversion results.

The expression determination process using the obtained feature points will be described below. In order to eliminate personal differences of expression determination, a face detection process is applied to an emotionless face image to obtain detection results of respective local features. Using these detection results, the relative positions of respective feature points shown in FIG. 9 or 10 are obtained, and their data are held in the expression determination unit 104 as reference relative positions. The expression determination unit 104 executes a process for obtaining changes of respective feature points from the reference positions, i.e., "deviations" with reference to the reference relative positions and the relative positions of the obtained feature points. Since the size of the face in the photographed image is normally different from that of an emotionless face, the positions of the respective feature points are normalized on the basis of the relative positions of the obtained feature points, e.g., the distance between the two eyes.

Then, scores depending on changes of respective feature points are calculated for respective feature points, and an expression is determined based on the distribution of the scores. For example, since an expression of joy has features: (1) eyes slant down outwards; (2) muscles of cheeks are raised; (3) lip corners are pulled up; and so forth, large changes appear in "the distances from the end points of the eyes to the end points of the mouth", "the horizontal width of the mouth", and "the horizontal widths of the eyes". The score distribution obtained from these changes becomes that unique to an expression of joy.

As for the unique score distribution, the same applies to other expressions. Therefore, the shape of the distribution is parametrically modeled by mixed Gaussian approximation to determine a similarity between the obtained score distribution and those for respective expressions by checking the distance in a parameter space. An expression indicated by the score distribution with a higher similarity with the obtained score distribution (the score distribution with a smaller distance) is determined as an expression of a determination result.

A method of executing a threshold process for the sum total of scores may be applied. This threshold process is effective to accurately determine a non-expression scene (e.g., a face that has pronounced "i" during conversation) similar to an expression scene from an expression scene. Note that one of determination of the score distribution shape and the threshold process of the sum total may be executed. By determining an expression on the basis of the score distribution and the threshold process of the sum total of scores, an expression scene can be accurately recognized, and the detection ratio can be increased.

With the above process, since the expression of the face can be determined, the expression determination unit 104 outputs a code (a code unique to each expression) corresponding to the determined expression. This code may be a number, and its expression method is not particularly limited.

Next, the expression determination unit 104 checks if the determined expression is a specific expression (e.g., smile) which is set in advance, and notifies the control unit 101 of the determination result (step S205).

If the expression determined by the processes until step S204 is the same as the specific expression which is set in advance, for example, in this embodiment, if the "code indicating the expression" output from the expression determination unit 104 matches a code indicating the specific expression which is set in advance, the control unit 101 records the photographed image held by the image holding unit 105 in the recording unit 107. When the recording unit 107 comprises a DVD-RAM or compact flash (registered trademark), the control unit 101 controls the recording unit 107 to record the photographed image on a storage media such as a DVD-RAM, compact flash (registered trademark), or the like (step S206). An image to be recorded may be an image of the face region, i.e., the face image of the specific expression.

On the other hand, the expression determined by the processes until step S204 is not the same as the specific expression which is set in advance, for example, in this embodiment, if the "code indicating the expression" output from the expression determination unit 104 does not match a code indicating the specific expression which is set in advance, the control unit 101 controls the image sensing unit 100 to sense a new image.

In addition, if the determined expression is the specific expression, the control unit 101 may hold the photographed image on the recording unit 107 while controlling the image sensing unit 100 to sense the next image in step S206. Also, the control unit 101 may control the display unit 106 to display the photographed image on the display unit 106.

In general, since an expression does not change abruptly but has continuity to some extent, if the processes in steps S202 and S204 end within a relative short period of time, images continuous to the image that shows the specific expression often have the same expressions. For this reason, in order to make the face region detected in step S202 clearer, the control unit 101 may set photographing parameters (image sensing parameters of an image sensing system such as exposure correction, auto-focus, color correction, and the like) to perform photographing again, and to display and record another image.

Figure 11:
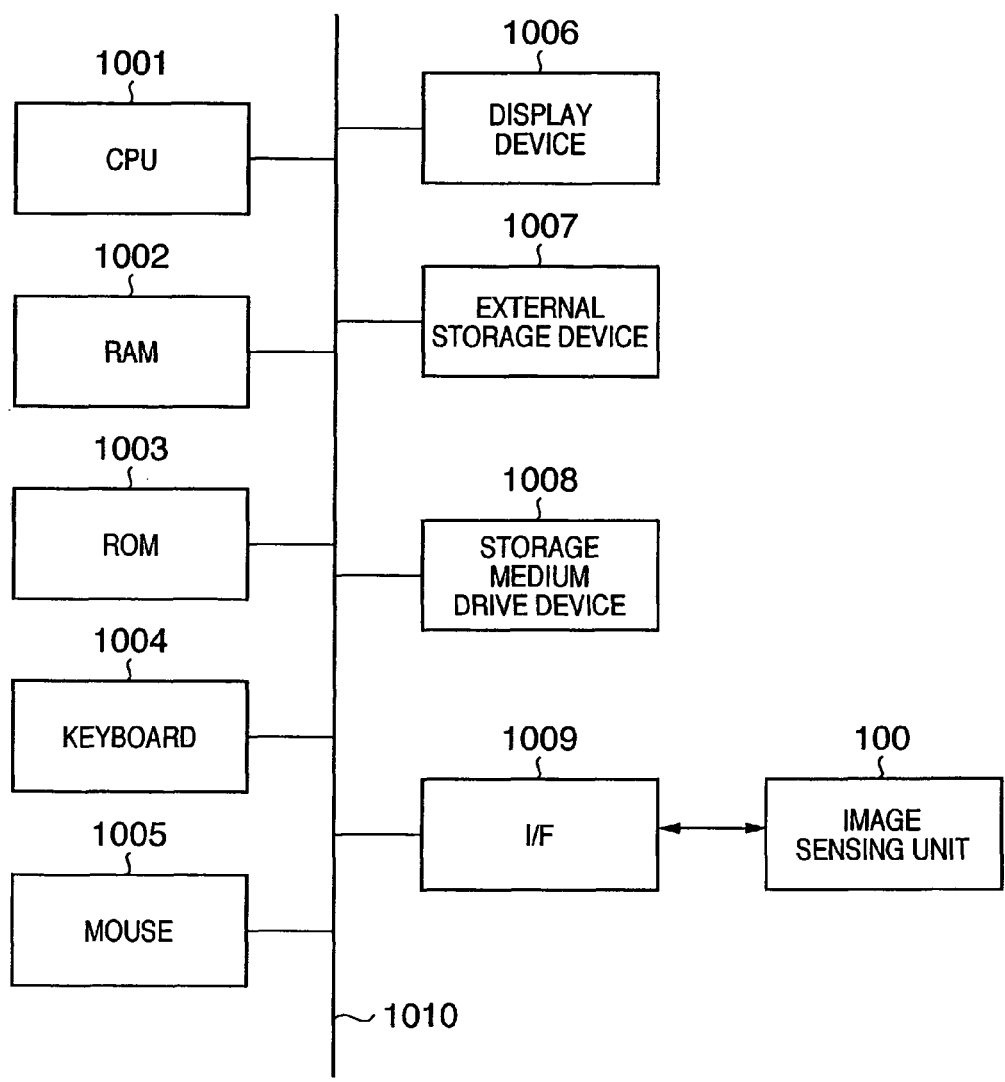
FIG. 11 is a block diagram showing the basic arrangement of the image processing apparatus according to the first embodiment of the present invention.

FIG. 11 is a block diagram showing the basic arrangement of the image processing apparatus according to this embodiment.

Reference numeral 1001 denotes a CPU, which controls the overall apparatus using programs and data stored in a RAM 1002 and ROM 1003, and executes a series of processes associated with expression determination described above. The CPU 101 corresponds to the control unit 101 in FIG. 1.

Reference numeral 1002 denotes a RAM, which comprises an area for temporarily storing programs and data loaded from an external storage device 1007 and storage medium drive 1008, image data input from the image sensing unit 100 via an I/F 1009, and the like, and also an area required for the CPU 1001 to execute various processes. In FIG. 1, the intermediate detection result holding unit 103 and image holding unit 105 correspond to this RAM 1002.

Reference numeral 1003 denotes a ROM which stores, e.g., a port program, setup data, and the like of the overall apparatus.

Reference numerals 1004 and 1005 respectively denote a keyboard and mouse, which are used to input various instructions to the CPU 1001.

Reference numeral 1006 denotes a display device which comprises a CRT, liquid crystal display, or the like, and can display various kinds of information including images, text, and the like. In FIG. 1, the display device 1006 corresponds to the display unit 106.

Reference numeral 1007 denotes an external storage device, which serves as a large-capacity information storage device such as a hard disk drive device or the like, and saves an OS (operating system), a program executed by the CPU 1001 to implement a series of processes associated with expression determination described above, and the like. This program is loaded onto the RAM 1002 in accordance with an instruction from the CPU 1001, and is executed by the CPU 1001. Note that this program includes those which correspond to the face detection unit 102 and expression determination unit 104 if the face detection unit 102 and expression determination unit 104 shown in FIG. 1 are implemented by programs.

Reference numeral 1008 denotes a storage medium drive device 1008, which reads out programs and data recorded on a storage medium such as a CD-ROM, DVD-ROM, or the like, and outputs them to the RAM 1002 and external storage device 1007. Note that a program to be executed by the CPU 1001 to implement a series of processes associated with expression determination described above may be recorded on this storage medium, and the storage medium drive device 1008 may load the program onto the RAM 1002 in accordance with an instruction from the CPU 1001.

Reference numeral 1009 denotes an I/F which is used to connect the image sensing unit 100 shown in FIG. 1 and this apparatus. Data of an image sensed by the image sensing unit 100 is output to the RAM 1002 via the I/F 1009.

Reference numeral 1010 denotes a bus which interconnects the aforementioned units.

Figure 12:
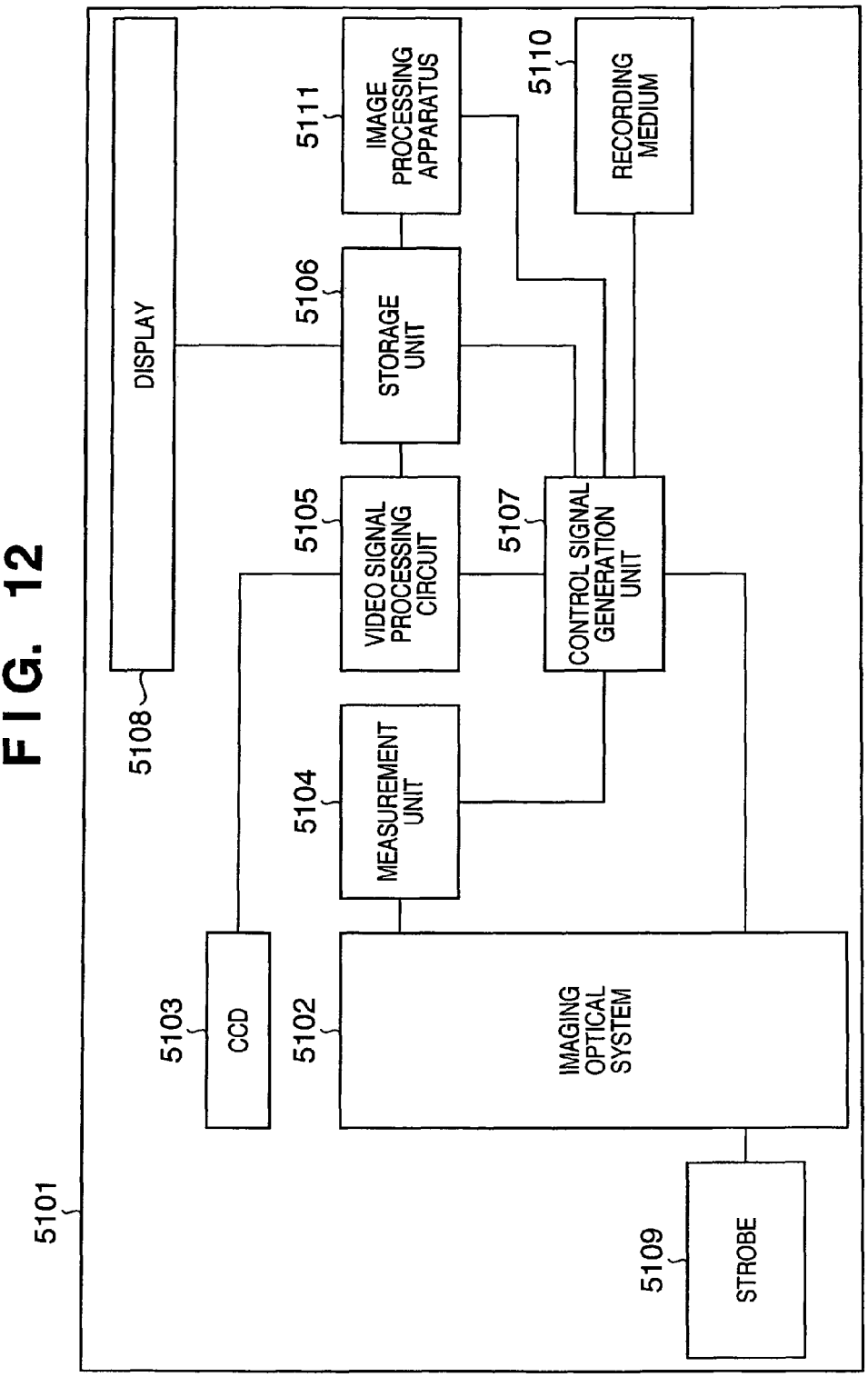
FIG. 12 is a block diagram showing the arrangement of an example in which the image processing apparatus according to the first embodiment of the present invention is applied to an image sensing apparatus.

A case will be explained below with reference to FIG. 12 wherein the image processing apparatus according to this embodiment is mounted in an image sensing apparatus, which senses an image when an object has a specific expression. FIG. 12 is a block diagram showing the arrangement of an example in which the image processing apparatus according to this embodiment is used in an image sensing apparatus.

An image sensing apparatus 5101 shown in FIG. 12 comprises an imaging optical system 5102 including a photographing lens and zoom photographing drive control mechanism, a CCD or CMOS image sensor 5103, a measurement unit 5104 of image sensing parameters, a video signal processing circuit 5105, a storage unit 5106, a control signal generation unit 5107 for generating control signals used to control an image sensing operation, image sensing conditions, and the like, a display 5108 which also serves as a viewfinder such as an EVF or the like, a strobe emission unit 5109, a recording medium 5110, and the like, and further comprises the aforementioned image processing apparatus 5111 as an expression detection apparatus.

This image sensing apparatus 5101 performs detection of a face image of a person (detection of a position, size, and rotation angle) and detection of an expression from a sensed video picture using the image processing apparatus 5111. When the position information, expression information, and the like of that person are input from the image processing apparatus 5111 to the control signal generation unit 5107, the control signal generation unit 5107 generates a control signal for optimally photographing an image of that person on the basis of the output from the image sensing parameter measurement unit 5104. More specifically, the photographing timing can be set when the full-faced image of the person is obtained at the center of the photographing region to have a predetermined size or more, and the person smiles.

When the aforementioned image processing apparatus is used in the image sensing apparatus in this way, face detection and expression detection, and a timely photographing operation based on these detection results can be made. In the above description, the image sensing apparatus 5101 which comprises the aforementioned processing apparatus as the image processing apparatus 5111 has been explained. Alternatively, the aforementioned algorithm may be implemented as a program, and may be installed in the image sensing apparatus 5101 as processing means executed by the CPU.

An image processing apparatus which can be applied to this image sensing apparatus is not limited to that according to this embodiment, and image processing apparatuses according to embodiments to be described below may be applied.

As described above, since the image processing apparatus according to this embodiment uses local features such as the primary features, secondary features, and the like, not only a face region in the photographed image can be specified, but also an expression determination process can be done more simply without any new detection processes of a mouth, eyes, and the like.

Even when the positions, directions, and the like of faces in photographed images are all different, the aforementioned local features can be obtained, and the expression determination process can be done consequently. Therefore, expression determination robust against the positions, directions, and the like of faces in images can be attained.

According to this embodiment, during a process for repeating photographing, only a specific expression can be photographed.

Note that an image used to detect a face region in this embodiment is a photographed image. However, the present invention is not limited to such specific image, and an image which is saved in advance or downloaded may be used.

Second Embodiment

In this embodiment, the detection process of a face detection region (step S202) and the expression determination process (step S204) in the first embodiment are parallelly executed. In this manner, the overall process can be done at higher speed.

Figure 3:
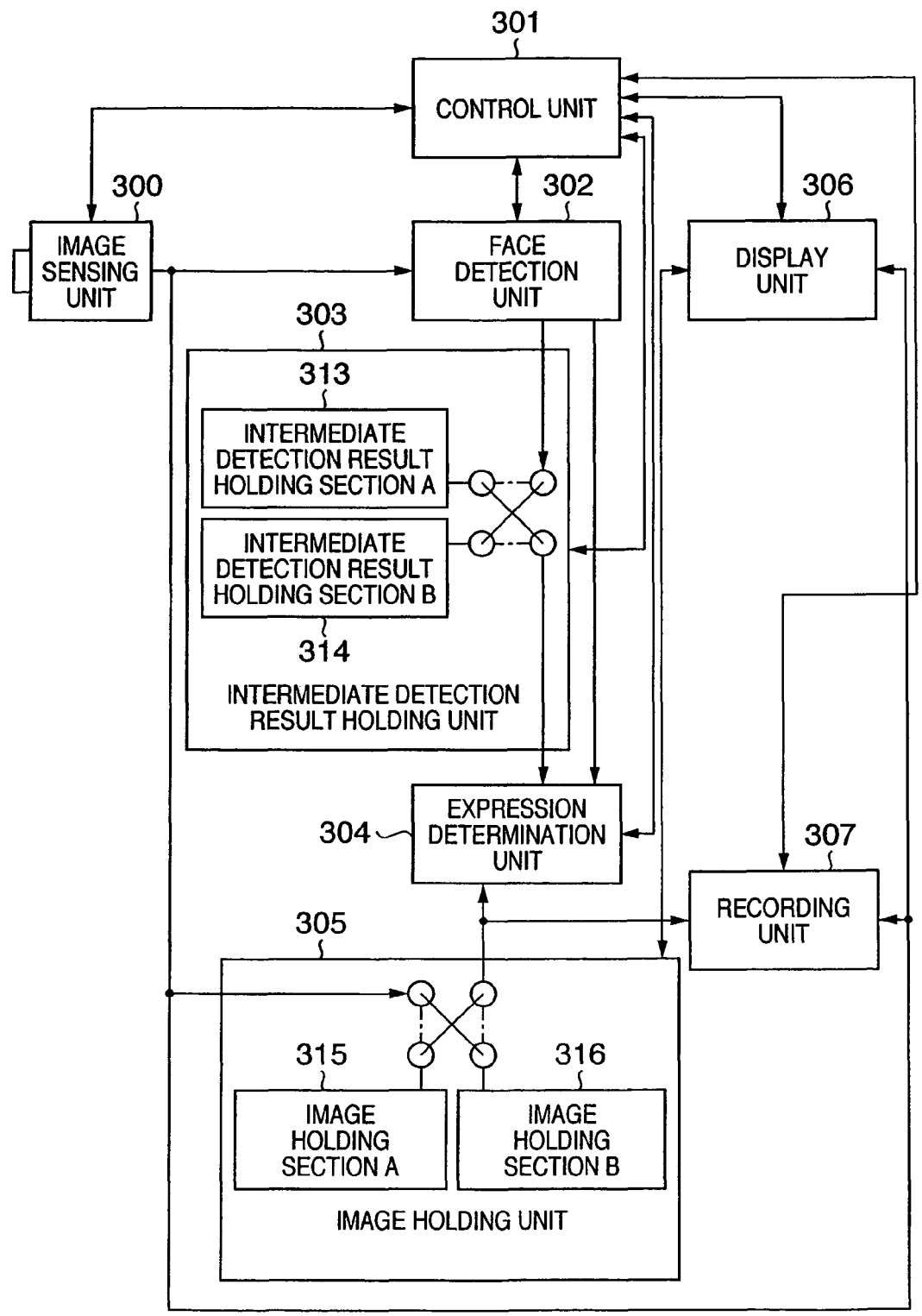
FIG. 3 is a block diagram showing the functional arrangement of an image processing apparatus according to the second embodiment of the present invention.

FIG. 3 is a block diagram showing the functional arrangement of an image processing apparatus according to this embodiment. In the arrangement according to this embodiment, the arrangement of an intermediate detection result holding unit 303 and that of an image holding unit 305 are substantially different from those according to the first embodiment.

The intermediate detection result holding unit 303 further comprises intermediate detection result holding sections A 313 and B 314. Likewise, the image holding unit 305 comprises image holding sections A 315 and B 316.

The operation of the arrangement shown in FIG. 3 will be described below using the timing chart of FIG. 4.

Figure 4:
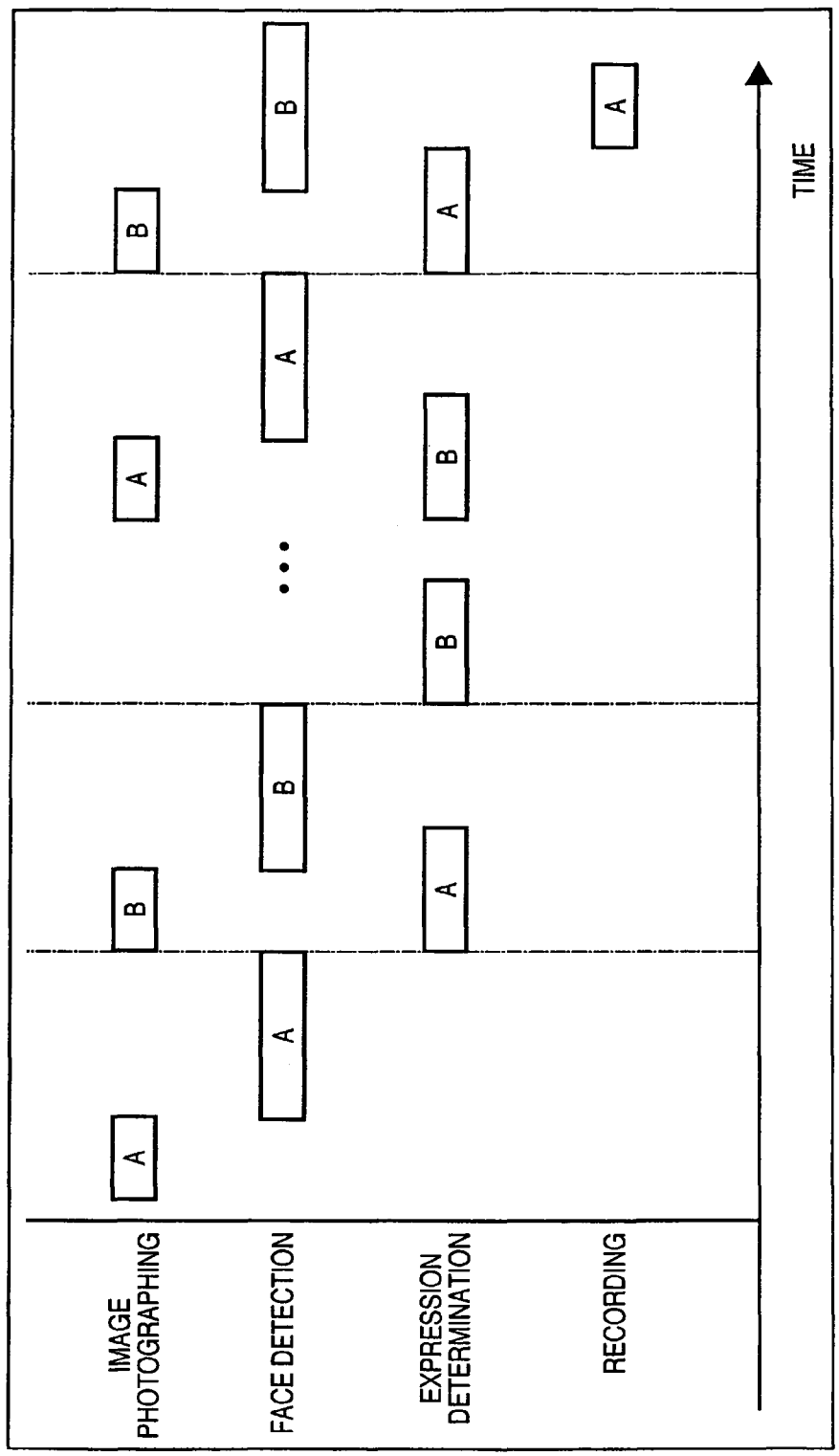
FIG. 4 is a timing chart showing the operation of the arrangement shown in FIG. 3.

In the timing chart of FIG. 4, "A" indicates an operation in an A mode, and "B" indicates an operation in a B mode. The A mode of "image photographing" is to hold a photographed image in the image holding section A 315 upon holding it in the image holding unit 305, and the B mode is to hold an image in the image holding section B 316. The A and B modes of image photographing are alternately switched, and an image sensing unit 300 photographs images accordingly. Hence, the image sensing unit 300 successively photographs images. Note that the photographing timings are given by a control unit 101.

The A mode of "face detection" is to hold intermediate processing results in the intermediate detection result holding section A 313 upon holding them in the intermediate detection result holding unit 303 in a face region detection process of a face detection unit 302, and the B mode is to hold the results in the intermediate detection result holding section B 314.

The A mode of "expression determination" is to determine an expression using the image held in the image holding section A 315, the intermediate processing results held in the intermediate detection result holding section A 313, and face region information of a face detection unit 302 in an expression determination process of an expression determination unit 304, and the B mode is to determine an expression using the image held in the image holding section B 316, the intermediate processing results held in the intermediate detection result holding section B 314, and face region information of the face detection unit 302.

The operation of the image processing apparatus according to this embodiment will be described below.

An image is photographed in the A mode of image photographing, and the photographed image is held in the image holding section A 315 of the image holding unit 305. Also, the image is displayed on a display unit 306, and is input to the face detection unit 302. The face detection unit 302 executes a process for generating face region information by applying the same process as in the first embodiment to the input image. If a face is detected from the image, data of the face region information is input to the expression determination unit 304. Intermediate feature detection results obtained during the face detection process are held in the intermediate detection result holding section A 313 of the intermediate result holding unit 303.

Next, the image photographing process and face detection process in the B mode and the expression determination process in the A mode are parallelly executed. In the image photographing process in the B mode, a photographed image is held in the image holding section B 316 of the image holding unit 305. Also, the image is displayed on the display unit 306, and is input to the face detection unit 302. The face detection unit 302 executes a process for generating face region information by applying the same process as in the first embodiment to the input image, and holds intermediate processing results in the intermediate processing result holding section B 314.

Parallel to the image photographing process and face region detection process in the B mode, the expression determination process in the A mode is executed. In the expression determination process in the A mode, the expression determination unit 304 determines an expression of a face using the face region information from the face detection unit 302 and the intermediate feature detection results held in the intermediate detection result holding section A 313 with respect to the image input from the image holding section A 315. If the expression determined by the expression determination unit 304 matches a desired expression, the image in the image holding section A 315 is recorded, thus ending the process.

If the expression determined by the expression determination unit 304 is different from a desired expression, the image photographing process and face region detection process in the A mode, and the expression determination process in the B mode are parallelly executed. In the image photographing process in the A mode, a photographed image is held in the image holding section A 315 of the image holding unit 305. Also, the image is displayed on the display unit 306, and is input to the face detection processing unit 302. The face detection unit 302 applies a face region detection process to the input image. In the expression determination process in the B mode, which is done parallel to the aforementioned processes, the expression determination unit 304 detects an expression of a face using the face region information from the face detection unit 302 and the intermediate detection results held in the intermediate detection result holding section B 314 with respect to the image input from the image holding section B 316.

The same processes are repeated until it is determined that the expression determined by the expression determination unit 304 matches a specific expression. When the desired expression is determined, if the current expression determination process is the A mode, the image of the image holding section A 315 is recorded, or if it is the B mode, the image of the image holding section B 316 is recorded, thus ending the process.

Note that the modes of the respective processes are switched by the control unit 101 at a timing when the control unit 101 detects completion of the face detection process executed by the face detection unit 102.

In this manner, since the image holding unit 305 comprises the image holding sections A 315 and B 316, and the intermediate detection result holding unit 303 comprises the intermediate detection result holding sections A 313 and B 314, the image photographing process, face region detection process, and expression determination process can be parallelly executed. As a result, the photographing rate of images used to determine an expression can be increased.

Third Embodiment

An image processing apparatus according to this embodiment has as its object to improve the performance of the whole system by parallelly executing the face region detection process executed by the face detection unit 102 and the expression determination process executed by the expression determination unit 104 in the first and second embodiments.

In the second embodiment, by utilizing the fact that the image photographing and face region detection processes require a longer operation time than the expression determination process, the expression determination process, and the photographing process and face region detection process of the next image are parallelly executed. By contrast, in this embodiment, by utilizing the face that the process for detecting a quartic feature amount shown in FIG. 7D in the first embodiment requires a longer processing time than detection of tertiary feature amounts from primary feature amounts, face region information utilizes the detection results of the previous image, and the feature point detection results used to detect an expression of eyes and a mouth utilize the detection results of the current image. In this way, parallel processes of the face region detection process and expression determination process are implemented.

FIG. 5 is a block diagram showing the functional arrangement of the image processing apparatus according to this embodiment.

An image sensing unit 500 senses a time-series image or moving image and outputs data of images of respective frames to a face detection unit 502, image holding unit 505, display unit 506, and recording unit 507. In the arrangement according to this embodiment, the face detection unit 502 and expression determination unit 504 are substantially different from those of the first embodiment.

The face detection unit 502 executes the same face region detection process as that according to the first embodiment. Upon completion of this process, the unit 502 outputs an end signal to the expression determination unit 504.

The expression determination unit 504 further includes a previous image detection result holding section 514.

The processes executed by the respective units shown in FIG. 5 will be explained below using the timing chart shown in FIG. 6.

When the image sensing unit 500 photographs an image of the first frame, data of this image is input to the face detection unit 502. The face detection unit 502 generates face region information by applying the same process as in the first embodiment to the input image, and outputs the information to the expression determination unit 504. The face region information input to the expression determination unit 504 is held in the previous image detection result holding section 514. Also, intermediate feature detection results obtained during the process of the unit 502 are input to and held by the intermediate detection result holding unit 503.

When the image sensing unit 500 photographs an image of the next frame, data of this image is input to the face detection unit 502. The photographed image is displayed on the display unit 506, and is also input to the face detection unit 502. The face detection unit 502 generates face region information by executing the same process as in the first embodiment. Upon completion of this face region detection process, the face detection unit 502 inputs intermediate feature detection results to the intermediate detection result holding unit 503, and outputs a signal indicating completion of a series of processes to be executed by the expression determination unit 504.

If an expression as a determination result of the expression determination unit 504 is not a desired expression, the face region information obtained by the face detection unit 502 is held in the previous image detection result holding section 514 of the expression determination unit 504.

Upon reception of the end signal from the face detection unit 502, the expression determination unit 504 executes an expression determination process for the current image using face region information 601 for the previous image (one or more images of previous frames) held in the previous image detection result holding section 514, the current image (image of the current frame) held in the image holding unit 505, and intermediate feature detection results 602 of the current image held in the intermediate detection result holding unit 503.

In other words, the unit 504 executes the expression determination process for a region in an original image corresponding in position to a region specified by the face region information in one or more images of previous frames using the intermediate detection results obtained from that region.

If the difference between the photographing times of the previous image and current image is short, the positions of face regions in respective images do not change largely. For this reason, the face region information obtained from the previous image is used, and broader search ranges shown in FIGS. 9 and 10 are set, thus suppressing the influence of positional deviation between the face regions of the previous and current images upon execution of the expression determination process.

If the expression determined by the expression determination unit 504 matches a desired expression, the image of the image holding unit 505 is recorded, thus ending this process. If the expression determined by the expression determination unit 504 is different from a desired expression, the next image is photographed, the face detection unit 502 executes a face detection process, and the expression determination unit 504 executes an expression determination process using the photographed image, the face detection result for the previous image held in the previous image detection result holding section 514, and the intermediate processing results held in the intermediate detection result holding unit 503.

The same processes are repeated until an expression determined by the expression determination unit 504 matches a desired expression. If a desired expression is determined, the image of the image holding unit 505 is recorded, thus ending the process.

Since the expression determination process is executed using the face region information for the previous image held in the previous image detection result holding section 514 and the intermediate feature detection process results held in the intermediate detection result holding unit 503, the face region detection process and expression determination process can be parallelly executed. As a result, the photographing rate of images used to determine an expression can be increased.

Fourth Embodiment

In the above embodiments, the technique for determining a facial expression has been explained. In this embodiment, a technique for determining a person who has that face, i.e., for identifying a person corresponding to the face, will be described.

Figure 13:
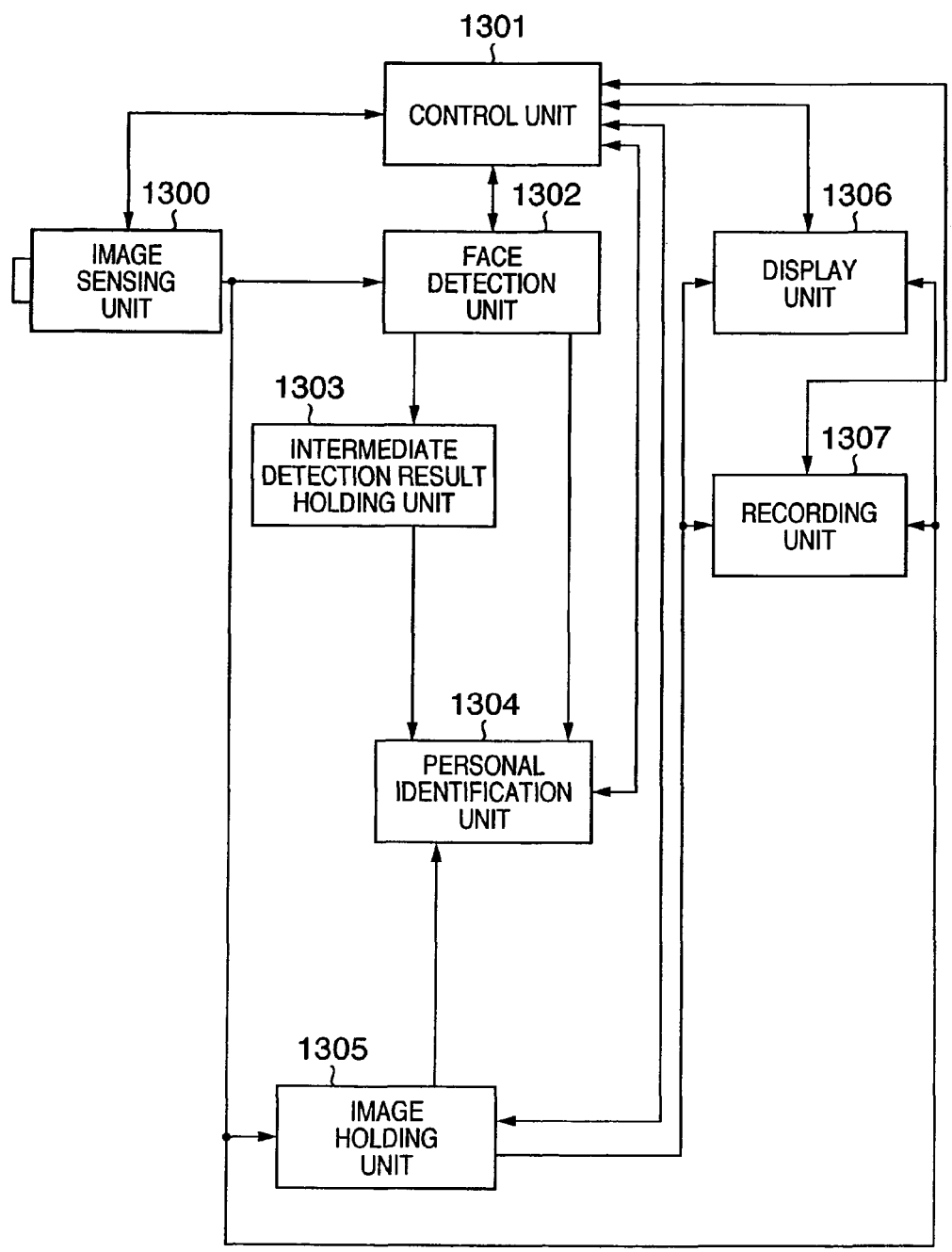
FIG. 13 is a block diagram showing the functional arrangement of an image processing apparatus according to the fourth embodiment of the present invention.

FIG. 13 is a block diagram showing the functional arrangement of an image processing apparatus according to this embodiment. An image processing apparatus according to this embodiment comprises an image sensing unit 1300, control unit 1301, face detection unit 1302, intermediate detection result holding unit 1303, personal identification unit 1304, image holding unit 1305, display unit 1306, and recording unit 1307. The respective units will be described below.

The image sensing unit 1300 senses an image, and outputs the sensed image (photographed image) to the face detection unit 1302, image holding unit 1305, and display unit 1306 or recording unit 1307 on the basis of a control signal from the control unit 1301.

The control unit 1301 performs processes for controlling the overall image processing apparatus according to this embodiment. The control unit 1301 is connected to the image sensing unit 1300, face detection unit 1302, intermediate detection result holding unit 1303, personal identification unit 1304, image holding unit 1305, display unit 1306, and recording unit 107, and controls these units so that they operate at appropriate timings.

The face detection unit 1302 executes a process for detecting regions of faces in the photographed image (regions of face images included in the photographed image) from the image sensing unit 1301. This process is, i.e., a process for determining the presence/absence of face regions in the photographed image, and obtaining, if face regions are present, the number of face regions in the photographed image, the coordinate positions of the face regions in the photographed images, the sizes of the face regions, and the rotation amounts of the face regions in the image (for example, if a face region is represented by a rectangle, a rotation amount indicates a direction and slope of this rectangle in the photographed image). Note that these pieces of information (the number of face regions in the photographed image, the coordinate positions of the face regions in the photographed images, the sizes of the face regions, and the rotation amounts of the face regions in the image) will be generally referred to as "face region information" hereinafter. Therefore, the face regions in the photographed image can be specified by obtaining the face region information.

These detection results are output to the personal identification unit 1304. Also, intermediate detection results (to be described later) obtained during the detection process are output to the intermediate detection result holding unit 1303.

The intermediate detection result holding unit 1303 holds the intermediate feature detection results output from the face detection unit 1302.

The personal identification unit 1304 receives data of the face region information output from the face detection unit 1302 and data of the intermediate feature detection results output from the intermediate detection result holding unit 1303. The personal identification unit 1304 executes a determination process for determining a person who has this face on the basis of these data. This determination process will be described in detail later.

The image holding unit 1305 temporarily holds the photographed image output from the image sensing unit 1300, and outputs the full or partial photographed image held by itself to the display unit 1306 and recording unit 107 on the basis of a control signal from the control unit 1301.

The display unit 1306 comprises, e.g., a CRT, liquid crystal display, or the like, and displays the full or partial photographed image output from the image holding unit 1305 or a photographed image sensed by the image sensing unit 1300.

The recording unit 107 comprises a device such as one for recording information on a recording medium such as a hard disk drive, DVD-RAM, compact flash (registered trademark), or the like, and records the image held by the image holding unit 1305 or a photographed image sensed by the image sensing unit 1300.

A main process for determining a person who has a face in a photographed image, which is executed by the operations of the aforementioned units, will be described below using FIG. 14 which shows the flowchart of this process.

The image sensing unit 1300 photographs an image on the basis of a control signal from the control unit 1301 (step S1401). Data of the photographed image is displayed on the display unit 1306, is also output to the image holding unit 1305, and is further input to the face detection unit 1302.

The face detection unit 1302 executes a process for detecting a region of a face in the photographed image using the input photographed image (step S1402). Since the face region detection process is done in the same manner as in the first embodiment, a description thereof will be omitted. As a large characteristic feature of the face detection processing system according to this embodiment, features such as eyes, a mouth, the end points of the eyes and mouth, and the like, which are effective for person identification are detected.

The control unit 1301 checks with reference to the result of the face region detection process in step S1402 by the face detection unit 1302 whether or not a face region is present in the photographed image (step S1403). As this determination method, for example, it is checked if neurons in the (face) feature detection layer include that which has an output value equal to or larger than a given reference value, and it is determined that a face (region) is present at a position indicated by a neuron with an output value equal to or larger than the reference value. If no neuron with an output value equal to or larger than the reference value is found, it is determined that no face is present.

If it is determined as a result of the determination process in step S1403 that no face region is present in the photographed image, since the face detection unit 1302 advises the control unit 1301 accordingly, the flow returns to step S1401, and the control unit 1301 controls the image sensing unit 1300 to sense a new image.

On the other hand, if a face region is present, since the face detection unit 1302 advises the control unit 1301 accordingly, the flow advances to step S1404, and the control unit 1301 controls the intermediate detection result holding unit 1303 to hold the intermediate detection result information of the face detection unit 1302, and inputs the face region information of the face detection unit 1302 to the personal identification unit 1304.

Note that the number of faces can be obtained based on the number of neurons with output values equal to or larger than the reference value. Face detection by means of the neural network is robust against face size and rotation variations. Hence, one face in an image does not always correspond to one neuron that has an output value exceeding the reference value. In general, one face corresponds to a plurality of neurons. Hence, by combining neurons that have output values exceeding the reference value on the basis of the distances between neighboring neurons that have output values exceeding the reference value, the number of faces in an image can be calculated. Also, the average or barycentric position of the plurality of neurons which are combined in this way is used as the position of the face.

The rotation amount and face size are calculated as follows. As described above, the detection results of eyes and a mouth are obtained as intermediate processing results upon detection of face features. That is, as shown in FIG. 10 described in the first embodiment, the eye search ranges (RE3, RE4) and mouth search range (RM2) are set using the face detection results, and eye and mouth features can be detected from the eye and mouth feature detection results within these ranges. More specifically, the average or barycentric positions of a plurality of neurons that have output values exceeding the reference value of those of the eye and mouth detection layers are determined as the positions of the eyes (right and left eyes) and mouth. The face size and rotation amount can be calculated from the positional relationship among these three points. Upon calculating the face size and rotation amount, only the positions of the two eyes may be calculated from the eye feature detection results, and the face size and rotation amount can be calculated from only the positions of the two eyes without using any mouth feature.

The personal identification unit 1304 executes a determination process for determining a person who has a face included in each face region in the photographed image using the face region information and the intermediate detection result information held in the intermediate detection result holding unit 1303 (step S1404).

The determination process (personal identification process) executed by the personal identification unit 1304 will be described below. In the following description, a feature vector used in this determination process will be explained first, and identifiers used to identify using the feature vector will then be explained.

As has been explained in the background art, the personal identification process is normally executed independently of the face detection process that detects the face position and size in an image. That is, normally, a process for calculating a feature vector used in the personal identification process, and the face detection process are independent from each other. By contrast, since this embodiment calculates a feature vector used in the personal identification process from the intermediate process results of the face detection process, and the number of feature amounts to be calculated during the personal identification process can be smaller than that in the conventional method, the entire process can become simpler.

Figure 15A:
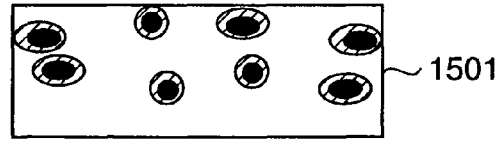
FIG. 15A shows a feature vector 1301 used in a personal identification process.
Figure 15B:
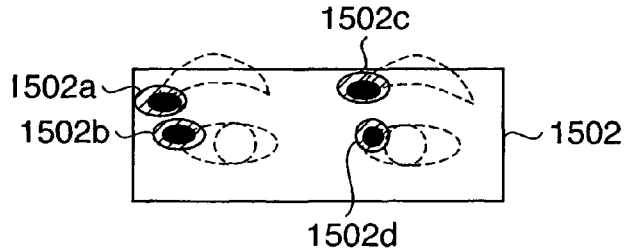
FIG. 15B shows a right-open V-shaped feature detection result of a secondary feature.
Figure 15C:
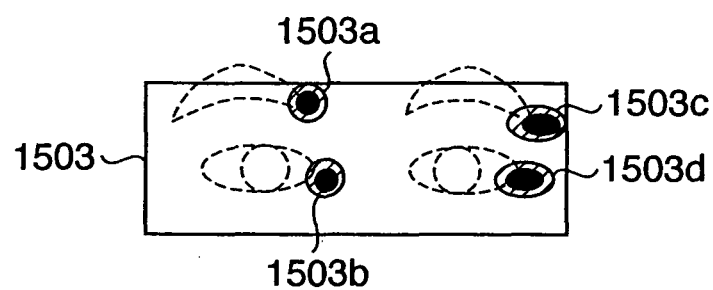
FIG. 15C shows a left-open V-shaped feature detection result.
Figure 15D:
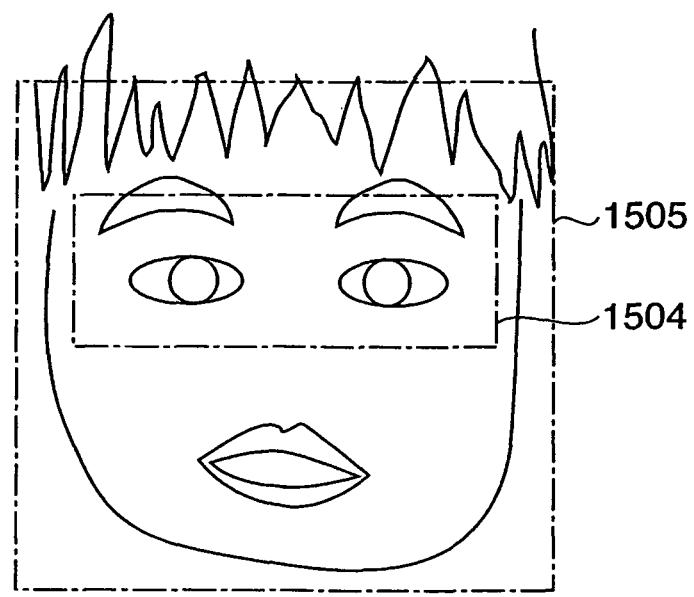
FIG. 15D shows a photographed image including a face region.

FIG. 15A shows a feature vector 1301 used in the personal identification process, FIG. 15B shows a right-open V-shaped feature detection result of the secondary feature, FIG. 15C shows a left-open V-shaped feature detection result, and FIG. 15D shows a photographed image including a face region.

The dotted lines in FIGS. 15B and 15C indicate eye edges in a face. These edges are not actual feature vectors but are presented to make easier to understand the relationship between the V-shaped feature detection results and eyes. Also, reference numerals 1502a to 1502d in FIG. 15B denote firing distributions of neurons in respective features in the right-open V-shaped feature detection result of the secondary feature: each black mark indicates a large value, and each white mark indicate a small value. Likewise, reference numerals 1503a to 1503d in FIG. 15C denote firing distributions of neurons in respective features in the left-open V-shaped feature detection result of the secondary feature: each black mark indicates a large value, and each white mark indicate a small value.

In general, in case of a feature having an average shape to be detected, a neuron assumes a large output value. If the shape suffers any variation such as rotation, movement, or the like, a neuron assumes a small output value. Hence, the distributions of the output values of neurons shown in FIGS. 15B and 15C become weak from the coordinate positions where the objects to be detected are present toward the periphery.

As depicted in FIG. 15A, a feature vector 1501 used in the personal identification process is generated from the right- and left-open V-shaped feature detection results of the secondary features as ones of the intermediate detection results held in the intermediate detection result holding unit 1303. This feature vector uses a region 1504 including the two eyes in place of an entire face region 1505 shown in FIG. 15D. More specifically, a plurality of output values of right-open V-shaped feature detection layer neurons and those of left-open V-shaped feature detection layer neurons are considered as sequences, and larger values are selected by comparing output values at identical coordinate positions, thus generating a feature vector.

In the Eigenface method described in the background art, the entire face region is decomposed by bases called eigenfaces, and their coefficients are set as a feature vector used in personal identification. That is, the Eigenface method performs personal identification using the entire face region. However, if features that indicate different tendencies among persons are used, personal identification can be made without using the entire face region. The right- and left-open V-shaped feature detection results of the region including the two eyes shown in FIG. 15D include information such as the sizes of the eyes, the distance between the two eyes, and the distances between the brows and eyes, and personal identification can be made based on these pieces of information.

The Eigenface method has a disadvantage, i.e., it is susceptible to variations of illumination conditions. However, the right- and left-open V-shaped feature detection results shown in FIGS. 15B and 15C are obtained using receptive fields which are learned to detect a face so as to be robust against the illumination conditions and size/rotation variations, and are prone to the influences of the illumination conditions and size/rotation variations. Hence, these features are suited to generate a feature vector used in personal identification.

Furthermore, a feature vector used in personal identification can be generated by a very simple process from the right- and left-open V-shaped feature detection results, as described above. As described above, it is very effective to generate a feature vector used in personal identification using the intermediate processing results obtained during the face detection process.

In this embodiment, an identifier used to perform personal identification using the obtained feature vector is not particularly limited. For example, a nearest neighbor identifier may be used. The nearest neighbor identifier is a scheme for storing a training vector indicating each person as a prototype, and identifying an object by a class to which a prototype nearest to the input feature vector. That is, the feature vectors of respective persons are calculated and held in advance by the aforementioned method, and the distances between the feature vector calculated from an input image and the held feature vectors are calculated, and a person who exhibits a feature vector with the nearest distance is output as an identification result.

As another identifier, a Support Vector Machine (to be abbreviated as SVM hereinafter) proposed by Vapnik et. al. may be used. This SVM learns parameters of linear threshold elements using maximization of a margin as a reference.

Also, the SVM is an identifier with excellent identification performance by combining non-linear transformations called kernel tricks (Vapnik, "Statistical Learning Theory", John Wiley & Sons (1998)). That is, the SVM obtains parameters for determination from training data indicating respective persons, and determines a person based on the parameters and a feature vector calculated from an input image. Since the SVM basically forms an identifier that identifies two classes, a plurality of SVMs are combined to perform determination upon determining a plurality of persons.

The face detection process executed in step S1402 uses the neural network that performs image recognition by parallel hierarchical processes, as described above. Also, the receptive fields used upon detecting respective features are acquired by learning using a large number of face images and non-face images. That is, the neural network that implements a face detection process extracts information, which is common to a large number of face images but is not common to non-face images, from an input image, and discriminates a face and non-face using that information.

By contrast, an identifier that performs personal identification is designed to identify a difference of feature vectors generated for respective persons from face images. That is, when a plurality of face images which have slightly different expressions, directions, and the like are prepared for each person, and are used as training data, a cluster is formed for each person, and the SVM can acquire a plane that separates clusters with high accuracy if it is used.

There is a rationale that the nearest neighbor identifier can attain an error probability twice or less the Bayes error probability if it is given a sufficient number of prototypes, thus identifying a personal difference.

FIG. 16 shows, as a table, data used upon learning in three identifiers. That is, the table shown in FIG. 16 shows data used upon training a face detection identifier to detect faces of persons (including Mr. A and Mr. B), data used upon training a Mr. A identifier to identify Mr. A, and data used upon training a Mr. B identifier to identify Mr. B. Upon trailing for face detection using the face detection identifier, feature vectors obtained from images of faces of all persons (Mr. A, Mr. B, and other persons) used as samples are used as correct answer data, and background images (non-face images) which are not images of faces are used as wrong answer data.

On the other hand, upon training for identification of Mr. A using the Mr. A identifier, feature vectors obtained from face images of Mr. A are used as correct answer data, and feature vectors obtained from face images of persons other than Mr. A (in FIG. 16, "Mr. B", "other") are used as wrong answer data. Background images are not used upon training.

Likewise, upon training for identification of Mr. B using the Mr. B identifier, feature vectors obtained from face images of Mr. B are used as correct answer data, and feature vectors obtained from face images of persons other than Mr. B (in FIG. 16, "Mr. A", "other") are used as wrong answer data. Background images are not used upon training.

Therefore, although some of the secondary feature detection results used upon detecting eyes as tertiary features are common to those used in personal identification, the identifier (neural network) used to detect eye features upon face detection and the identifier used to perform personal identification not only are of different types, but also use different data sets used in training. Therefore, even when common detection results are used, information, which is extracted from these results and is used in identification, is consequently different: the former identifier detects eyes, and the latter identifier determines a person.

When the face size and direction obtained by the face detection unit 1302 fall outside predetermined ranges upon generation of a feature vector, the intermediate processing results held in the intermediate detection result holding unit 1303 can undergo rotation correction and size normalization. Since the identifier for personal identification is designed to identify a slight personal difference, the accuracy can be improved when the size and rotation are normalized. The rotation correction and size normalization can be done when the intermediate processing results held in the intermediate detection result holding unit 1303 are read out from the intermediate detection result holding unit 1303 to be input to the personal identification unit 1304.

With the above processes, since personal identification of a face is attained, the personal identification unit 1304 checks if a code (a code unique to each person) corresponding to the determined person matches a code corresponding to a person who is set in advance (step S1405). This code may be a number, and its expression method is not particularly limited. This checking result is sent to the control unit 1301.

If the person who is identified by the processes until step S1404 matches a specific person who is set in advance, for example, in this embodiment, if the "code indicating the person" output from the personal identification unit 1304 matches the code indicating the specific person who is set in advance, the control unit 1301 records the photographed image held by the image holding unit 1305 in the recording unit 1307. When the recording unit 1307 comprises a DVD-RAM or compact flash (registered trademark), the control unit 1301 controls the recording unit 1307 to record the photographed image on a storage media such as a DVD-RAM, compact flash (registered trademark), or the like (step S1406). An image to be recorded may be an image of the face region.

On the other hand, if the person identified by the processes until step S1404 does not match the specific person who is set in advance, for example, in this embodiment, if the "code indicating the person" output from the personal identification unit 1304 does not match the code indicating the specific person who is set in advance, the control unit 1301 controls the image sensing unit 1300 to photograph a new image.

In addition, if the identified person matches the specific expression, the control unit 1301 may hold the photographed image on the recording unit 1307 while controlling the image sensing unit 1300 to sense the next image in step S1406. Also, the control unit 1301 may control the display unit 1306 to display the photographed image on the display unit 1306.

Also, in order to finely sense a face region detection in step S202, the control unit 1301 may set photographing parameters (image sensing parameters of an image sensing system such as exposure correction, auto-focus, color correction, and the like) to perform photographing again, and to display and record another image.

As described above, when a face in an image is detected on the basis of the algorithm that detects a final object to be detected from hierarchically detected local features, not only processes such as exposure correction, auto-focus, color correction, and the like can be done based on the detected face region, but also a person can be identified using the detection results of eye and mouth candidates as the intermediate feature detection results obtained during the face detection process without any new detection process for detecting the eyes and mouth. Hence, a person can be detected and photographed while suppressing an increase in processing cost. Also, personal recognition robust against variations of the face position, size, and the like can be realized.

The image processing apparatus according to this embodiment may adopt a computer which comprises the arrangement shown in FIG. 11. Also, the image processing apparatus according to this embodiment may be applied to the image processing apparatus 5111 in the image sensing apparatus shown in FIG. 12. In this case, photographing can be made in accordance with the personal identification result.

Fifth Embodiment

An image processing apparatus according to this embodiment performs the face region detection process described in the above embodiments, the expression determination process described in the first to third embodiments, and the personal identification process described in the fourth embodiment for one image.

Figure 17:
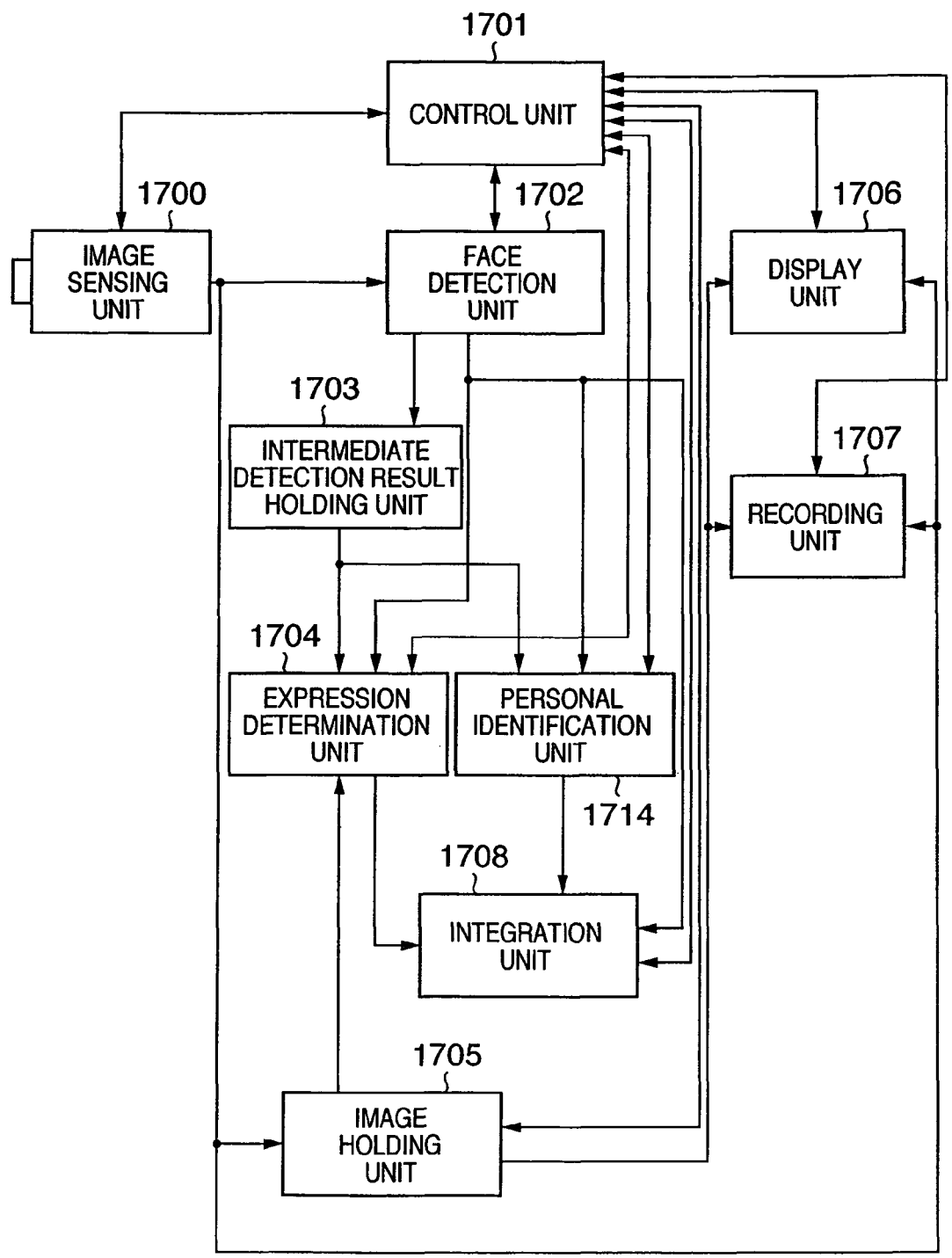
FIG. 17 is a block diagram showing the functional arrangement of an image processing apparatus according to the fifth embodiment of the present invention.

FIG. 17 is a block diagram showing the functional arrangement of the image processing apparatus according to this embodiment. Basically, the image processing apparatus according to this embodiment has an arrangement obtained by adding that of the image processing apparatus of the fourth embodiment and an integration unit 1708 to that of the image processing apparatus according to the first embodiment. Respective units except for the integration unit 1708 perform the same operations as those of the units with the same names in the above embodiments. That is, an image from an image sensing unit 1700 is output to a face detection unit 1702, image holding unit 1705, recording unit 1707, and display unit 1706. The face detection unit 1702 executes the same face region detection process as in the above embodiments, and outputs the detection processing result to an expression determination unit 1704 and personal identification unit 1714 as in the above embodiments. Also, the face detection unit 1702 outputs intermediate detection results obtained during its process to an intermediate detection result holding unit 1703. The expression determination unit 1704 executes the same process as in the expression determination unit 104 in the first embodiment. The personal identification unit 1714 executes the same process as in the personal identification unit 1304 in the fourth embodiment.

The integration unit 1708 receives data of the processing results of the face detection unit 1702, expression determination unit 1704, and personal identification unit 1714, and executes, using these data, determination processes for determining if a face detected by the face detection unit 1702 is that of a specific person, and if the specific face has a specific expression when it is determined the face is that of the specific person. That is, the integration unit 1708 determines if a specific person has a specific expression.

The main process for identifying a person who has a face in a photographed image, and determining an expression of that face, which is executed by the operations of the above units, will be described below using FIG. 18 that shows the flowchart of this process.

Figure 14:
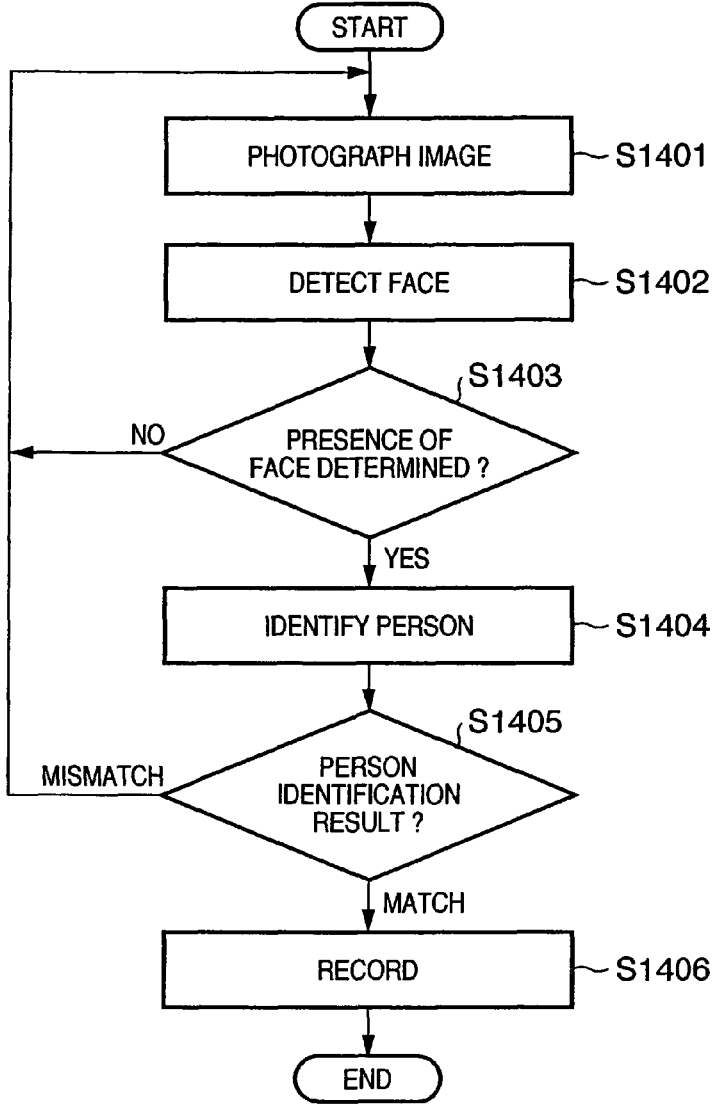
FIG. 14 is a flowchart of a main process for determining a person who has a face in a photographed image.

Processes in steps S1801 to S1803 are the same as those in steps S1401 to S1403 in FIG. 14, and a description thereof will be omitted. That is, in the processes in steps S1801 to S1803, a control unit 1701 and the face detection unit 1702 determine if an image from the image sensing unit 1700 includes a face region.

Figure 2:
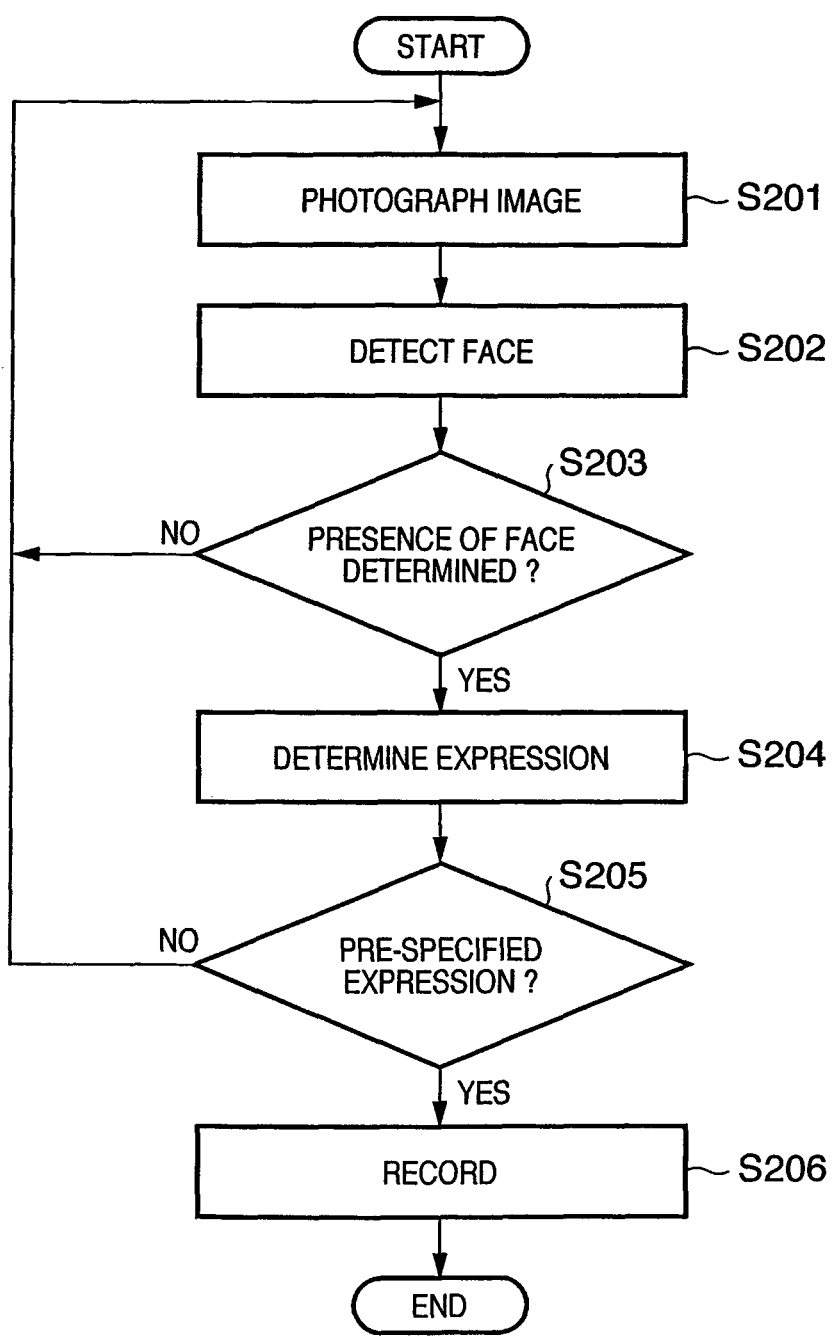
FIG. 2 is a flowchart of a main process for determining a facial expression in a photographed image.

If a face region is included, the flow advances to step S1804 to execute the same process as that in step S204 in FIG. 2, so that the expression determination unit 1704 determines an expression of a face in the detected face region.

In step S1805, the same process as that in step S1404 in FIG. 14 is executed, and the personal identification unit 1714 identifies a person with the face in the detected face region.

Note that the processes in steps S1804 and S1805 are executed for each face detected in step S1802.

In step S1806, the integration unit 1708 manages a "code according to the determined expression" output from the expression determination unit 1704 and a "code according to the identified person" output from the personal identification unit 1714 for each face.

FIG. 19 shows an example of the configuration of the managed data. As described above, the expression determination unit 1704 and personal identification unit 1714 perform expression determination and personal identification for each face detected by the face detection unit 1702. Therefore, the integration unit 1708 manages "codes according to determined expressions" and "code according to identified persons" in association with IDs (numerals 1, 2, ... in FIG. 19) unique to faces. For example, a code "smile" as the "code according to the determined expression" and a code "A" as the "code according to the identified person" correspond to a face with an ID=1, and these codes are managed in association with the ID=1. The same applies to an ID=2. In this way, the integration unit 1708 generates and holds table data (with the configuration shown in, e.g., FIG. 19) used to manage respective codes.

After that, the integration unit 1708 checks in step S1806 with reference to this table data if a specific person has a specific expression. For example, whether or not Mr. A is smiling is checked using the table data shown in FIG. 19. Since the table data in FIG. 19 indicates that Mr. A has a smile, it is determined that Mr. A is smiling.

If a specific person has a specific expression as a result of such determination, the integration unit 1708 advises the control unit 1701 accordingly. Hence, the flow advances to step S1807 to execute the same process as in step S1406 in FIG. 14.

In this embodiment, the face detection process and expression determination process are successively done. Alternatively, the method described in the second and third embodiments may be used. In this case, the total processing time can be shortened.

As described above, according to this embodiment, since a face is detected from an image, a person is specified, and his or her expression is specified, a photograph of a desired person with a desired expression can be taken among a large number of persons. For example, an instance of one's child with a smile can be photographed among a plurality of children.

That is, when the image processing apparatus according to this embodiment is applied to the image processing apparatus of the image sensing apparatus described in the first embodiment, both the personal identification process and expression determination process can be executed. As a result, a specific person with a specific expression can be photographed. Furthermore, by recognizing a specific person and expression, the apparatus can be used as a man-machine interface.

Sixth Embodiment

This embodiment sequentially executes the expression determination process and personal identification process explained in the fifth embodiment. With these processes, a specific expression of a specific person can be determined accurately.

Figure 20:
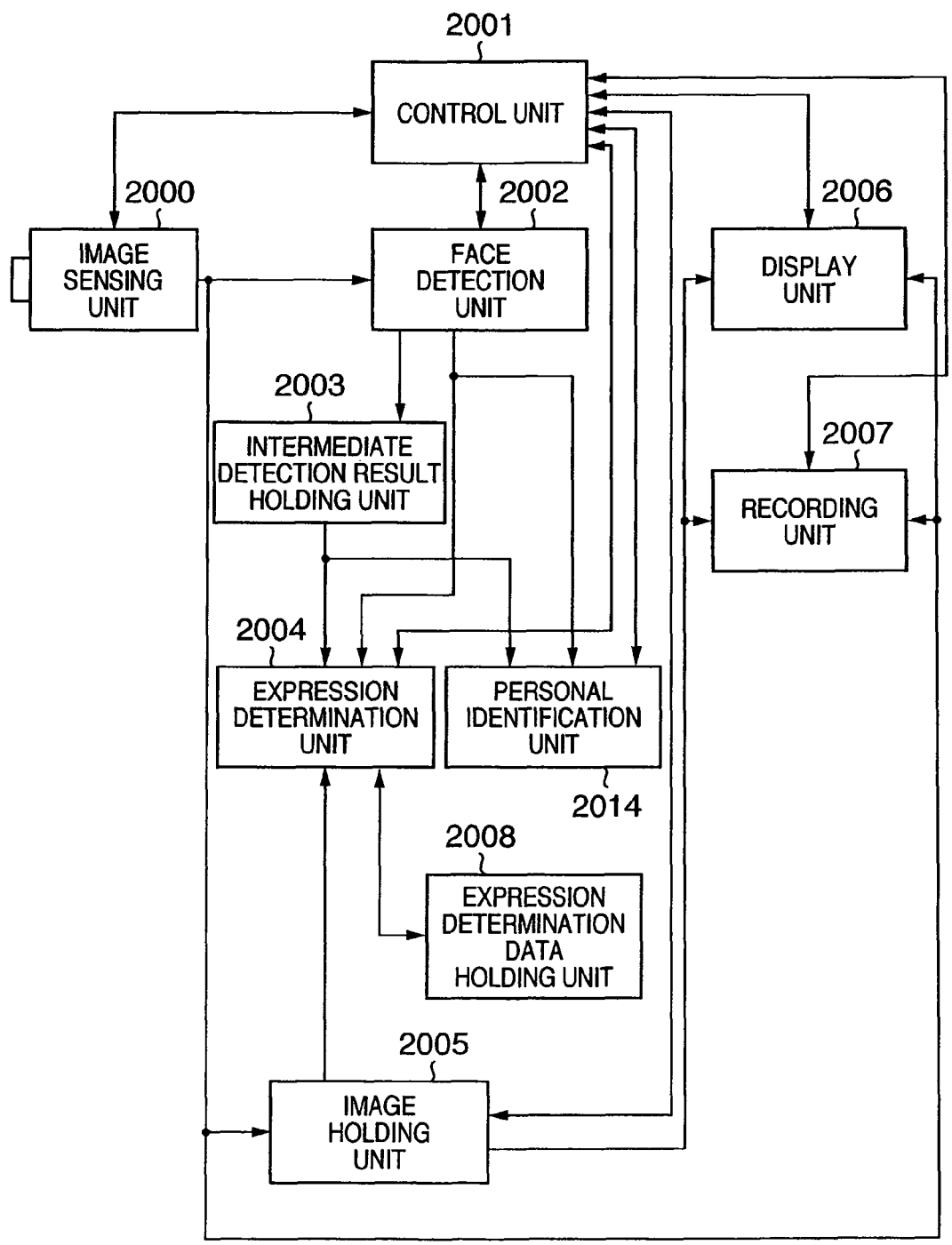
FIG. 20 is a block diagram showing the functional arrangement of an image processing apparatus according to the sixth embodiment of the present invention.

FIG. 20 is a block diagram showing the functional arrangement of an image processing apparatus according to this embodiment. The arrangement shown in FIG. 20 is substantially the same as that of the image processing apparatus according to the fifth embodiment shown in FIG. 18, except that a personal identification unit 2014 and expression determination unit 2004 are connected, and an expression determination data holding unit 2008 is used in place of the integration unit 1708.

Figure 21:
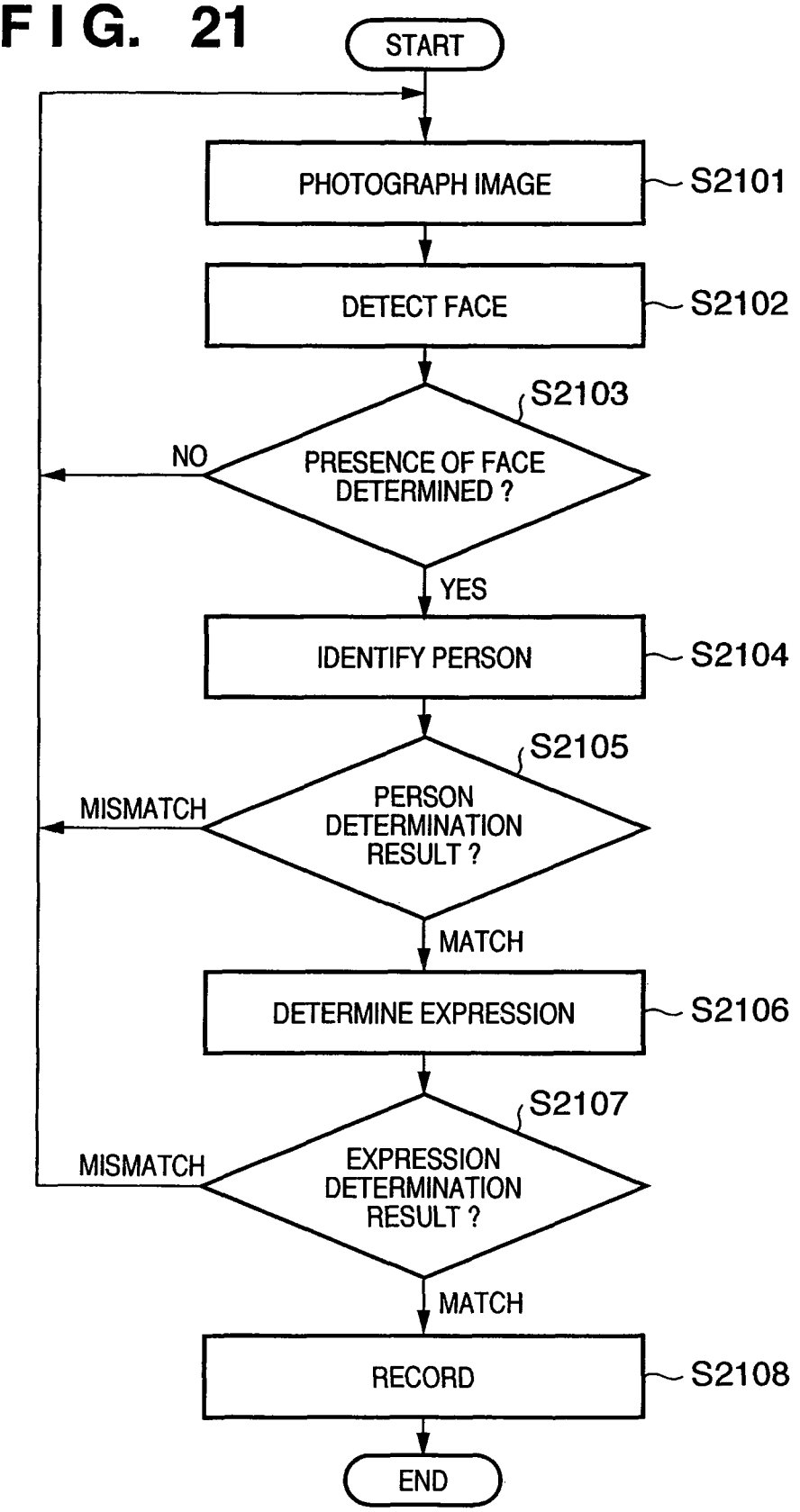
FIG. 21 is a flowchart of a main process to be executed by the image processing apparatus according to the sixth embodiment of the present invention.

FIG. 21 is a flowchart of a main process to be executed by the image processing apparatus according to this embodiment. The process to be executed by the image processing apparatus according to this embodiment will be described below using FIG. 21.

Figure 18:
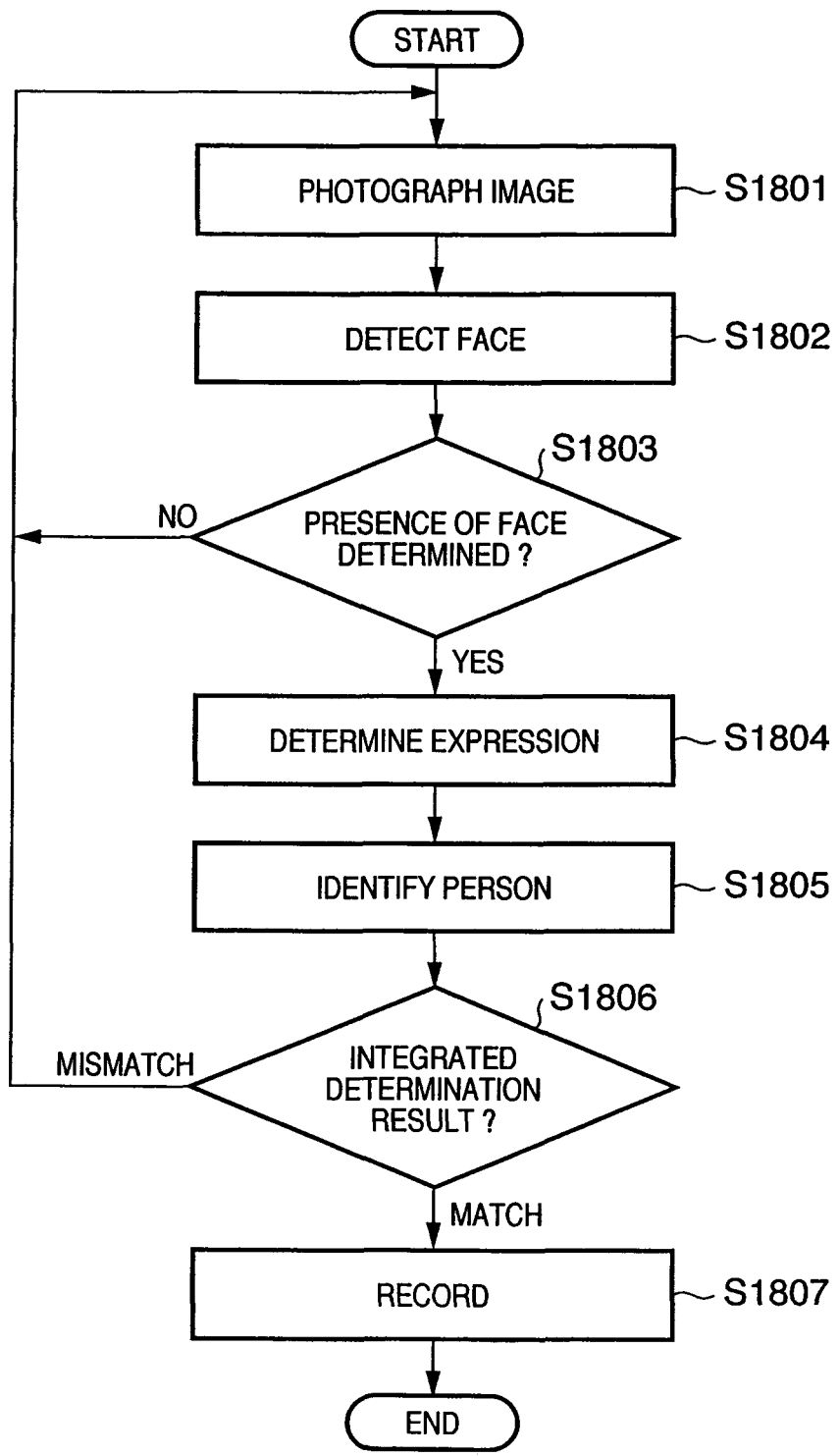
FIG. 18 is a flowchart of a main process for determining a person who has a face in a photographed image, and an expression of that face.

Processes in steps S2101 to S2103 are the same as those in steps S1801 to S1803 in FIG. 18, and a description thereof will be omitted.

In step S2104, the personal identification unit 2014 executes a personal identification process by executing the same process as that in step S1804. Note that the process in step S2104 is executed for each face detected in step S1802.

In step S2105, the personal identification unit 2014 checks if the face identified in step S2104 matches a specific face. This process is attained by referring to management information (a table that stores IDs unique to respective faces and codes indicating persons in association with each other), as has been explained in the fifth embodiment.

If a code that indicates the specific face matches a code that indicates the identified face, i.e., if the face identified in step S2104 matches the specific face, the personal identification unit 2014 advises the expression determination unit 2004 accordingly, and the flow advances to step S2106. In step S2106, the expression determination unit 2004 executes an expression determination process as in the first embodiment.

In this embodiment, the expression determination unit 2004 uses "expression determination data corresponding to each person" held in the expression determination data holding unit 2008 in the expression determination process.

FIG. 22 shows an example of the configuration of this expression determination data. As shown in FIG. 22, expression determination parameters are prepared in advance in correspondence with respective persons. Note that the parameters include "shadows on the cheeks", "shadows under the eyes", and the like in addition to "the distances from the end points of the eyes to the end points of the mouth", "the horizontal width of the mouth", and "the horizontal widths of the eyes" explained in the first embodiment. Basically, as has been explained in the first embodiment, expression recognition independent from a person can be made based on a difference from reference data generated from emotionless image data, but highly precise expression determination can be done by detecting specific changes depending on a person.

For example, assume that when a specific person smiles, the mouth largely stretches horizontally, and shadows appear on the cheeks and under the eyes. In expression determination for that person, these specific changes are used to determine an expression with higher precision.

Therefore, the expression determination unit 2004 receives the code indicating the face identified by the personal identification unit 2014, and reads out parameters for expression determination corresponding to this code from the expression determination data holding unit 2008. For example, when the expression determination data has the configuration shown in FIG. 22, if the personal identification unit 2014 identifies that a given face in the image is that of Mr. A, and outputs a code indicating Mr. A to the expression determination unit 2004, the expression determination unit 2004 reads out parameters (parameters indicating the variation rate of the eye-mouth distance >1.1, cheek region edge density 3.0 . . . ) corresponding to Mr. A, and executes an expression determination process using these parameters.

In this way, the expression determination unit 2004 can determine an expression with higher precision by checking if the variation rate of eye-mouth distance, cheek region edge density, and the like, which are obtained by executing the process described in the first embodiment fall within the ranges indicated by the readout parameters.

Referring back to FIG. 21, the expression determination unit 2004 checks if the expression determined in step S2106 matches a specific expression, which is set in advance. This process is attained by checking if the code indicating the expression determined in step S2106 matches a code that indicates the specific expression, which is set in advance.

If the two codes match, the flow advances to step S2108, and the expression determination unit 2004 advises the control unit 1701 accordingly, thus executing the same process as in step S1406 in FIG. 14.

In this manner, after each person is specified, expression recognition suited to that person is done, thereby improving the expression recognition precision. Since a face is detected from an image to specify a person, and its expression is specified, a photograph of a desired person with a desired expression among a large number of persons can be taken. For example, an instance of one's child with a smile can be photographed among a plurality of children. Furthermore, since a specific person and expression are recognized, this apparatus can be used as a man-machine interface.

In the above embodiment, the user can set "specific person" and "specific expression" via a predetermined operation unit as needed. Hence, when the user sets them as needed, codes indicating them are changed accordingly.

With the aforementioned arrangement of the present invention, identification of a person who has a face in an image and determination of an expression of that face can be easily made.

Also, variations of the position and direction of an object can be coped with by a simple method in detection of a face in an image, expression determination, and personal identification.

Seventh Embodiment

Assume that an image processing apparatus according to this embodiment has the same basic arrangement as that shown in FIG. 11.

Figure 23:
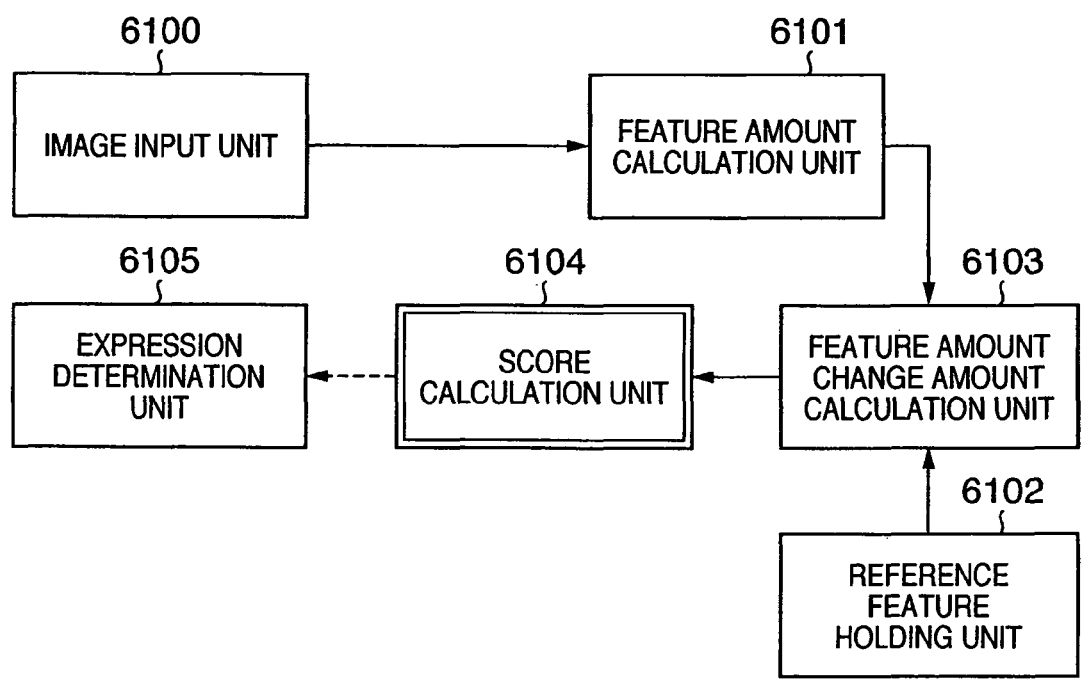
FIG. 23 is a block diagram showing the functional arrangement of an image processing apparatus according to the seventh embodiment of the present invention.

FIG. 23 is a block diagram showing the functional arrangement of the image processing apparatus according to this embodiment.

The functional arrangement of the image processing apparatus comprises an image input unit for time-serially, successively inputting a plurality of images, a feature amount calculation unit 6101 for extracting feature amounts required to determine an expression from the images (input images) input by the image input unit 6100, a reference feature holding unit 6102 for extracting and holding reference features required to recognize an expression from a reference face as a sober face (emotionless), which is prepared in advance, a feature amount change amount calculation unit 6103 for calculating change amounts of respective feature amounts of a face from the reference face by calculating differences between the feature amounts extracted by the feature amount calculation unit 6101 and those held in the reference feature holding unit 6102, a score calculation unit 6104 for calculating scores for respective features on the basis of the change amounts of the respective features extracted by the feature amount change amount calculation unit 6103, and an expression determination unit 6105 for determining an expression of the face in the input images on the basis of the sum total of scores calculated by the score calculation unit 6104.

Note that the respective units shown in FIG. 23 may be implemented by hardware. However, in this embodiment, the image input unit 6100, feature amount calculation unit 6101, feature amount change amount calculation unit 6103, score calculation unit 6104, and expression determination unit 6105 are implemented by programs, which are stored in the RAM 1002. When the CPU 1001 executes these programs, the functions of the respective units are implemented. The reference feature holding unit 6102 is a predetermined area assured in the RAM 1002, but may be an area in the external storage device 1007.

The respective units shown in FIG. 23 will be described in more detail below.

The image input unit 6100 inputs time-series face images obtained by extracting a moving image captured by a video camera or the like frame by frame as input images. That is, according to the arrangement shown in FIG. 11, data of images of respective frames are sequentially output from the image sensing unit 100 such as a video camera or the like, which is connected to the I/F 1009 to the RAM 1009 via this I/F 1009.

Figure 24:
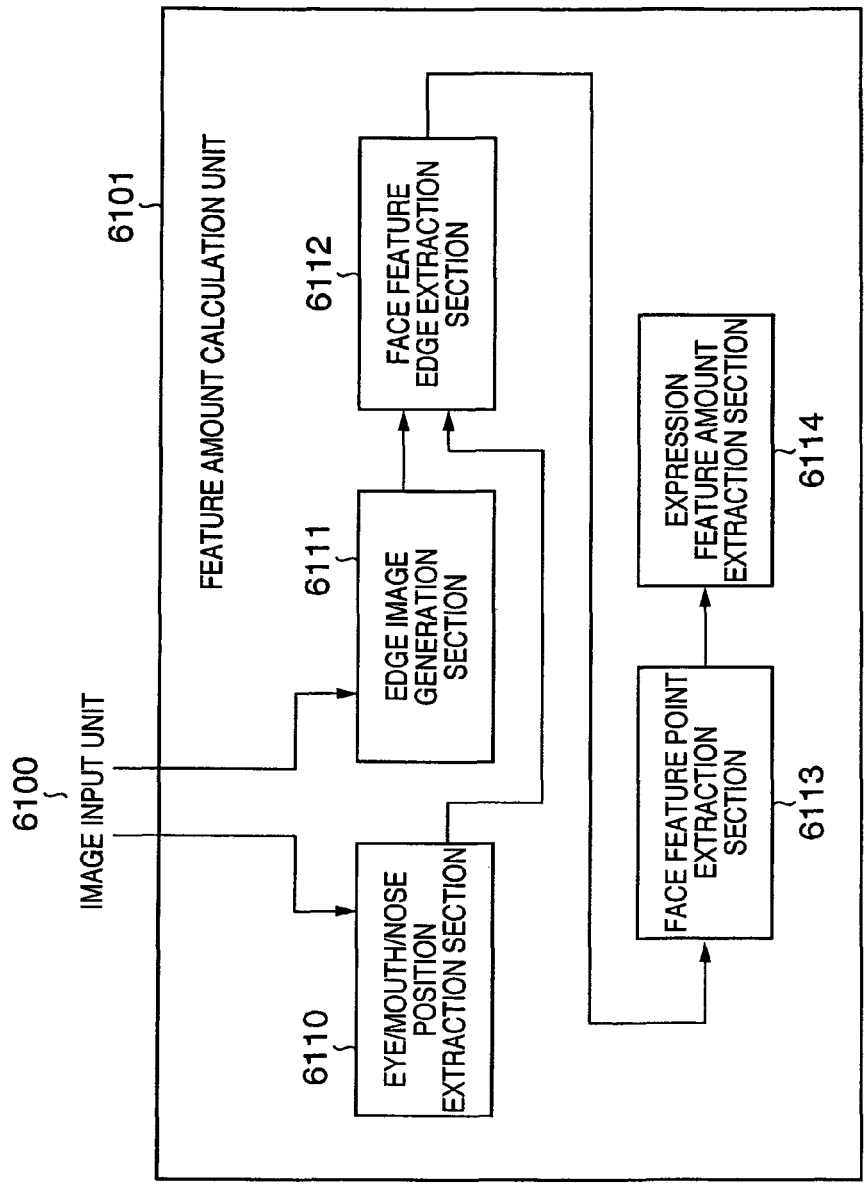
FIG. 24 is a block diagram showing the functional arrangement of a feature amount calculation unit 6101.

The feature amount calculation unit 6101 comprises an eye/mouth/nose position extraction section 6110, edge image generation section 6111, face feature edge extraction section 6112, face feature point extraction section 6113, and expression feature amount extraction section 6114, as shown in FIG. 24. FIG. 24 is a block diagram showing the functional arrangement of the feature amount calculation unit 6101.

The respective sections shown in FIG. 24 will be described in more detail below.

The eye/mouth/nose position extraction section 6110 determines predetermined portions of a face, i.e., the positions of eyes, a mouth, and a nose (those in the input images) from the images (input images) input by the image input unit 6100. As a method of determining the positions of the eyes and mouth, for example, the following method may be used. Templates of the eyes, mouth, and nose are prepared, and eye, mouth, and nose candidates are extracted by template matching. After extraction, the eye, mouth, and nose positions are detected using the spatial positional relationship among the eye, mouth, and nose candidates obtained by template matching, and flesh color information as color information. The detected eye and mouth position data are output to the next face feature edge extraction section 6112.

The edge image generation section 6111 extracts edges from the input images obtained by the image input unit 6100, and generates an edge image by applying an edge dilation process to the extracted edges and then applying a thinning process. For example, the edge extraction can adopt edge extraction using a Sobel filter, the edge dilation process can adopt an 8-neighbor dilation process, and the thinning process can adopt the Hilditch's thinning process. The edge dilation process and thinning process aim at allowing smooth edge scan and feature point extraction (to be described later) since divided edges are joined by dilating edges and then undergo the thinning process. The generated edge image is output to the next face feature edge extraction section 6112.

Figure 25:
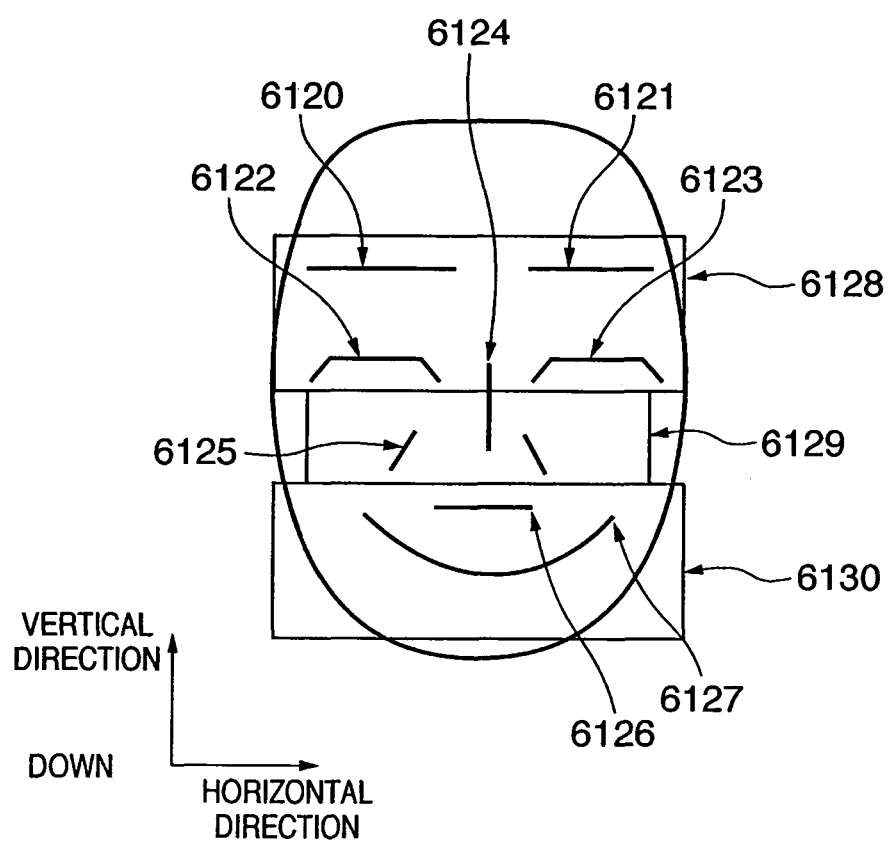
FIG. 25 shows an eye region, cheek region, and mouth region in an edge image.

The face feature edge extraction section 6112 determines an eye region, cheek region, and mouth region in the edge image, as shown in FIG. 25, using the eye and mouth position data detected by the eye/mouth/nose position extraction unit 6110 and the edge image generated by the edge image generation section 6111.

The eye region is set to include only the edges of brows and eyes, the cheek region is set to include only the edges of cheeks and a nose, and the mouth region is designated to include only an upper lip edge, tooth edge, and lower lip edge.

An example of a setting process of these regions will be described below.

As for the height of the eye region, a range which extends upward a distance 0.5 times the distance between the right and left eye position detection results and downward a distance 0.3 times the distance between the right and left eye position detection results from a middle point between the right and left eye position detection results obtained from template matching and the spatial positional relationship is set as a vertical range of the eyes.

As for the width of the eye region, a range which extends to the right and left by the distance between the right and left eye position detection results from the middle point between the right and left eye position detection results obtained from template matching and the spatial positional relationship is set as a horizontal range of the eyes.

That is, the length of the vertical side of the eye region is 0.8 times the distance between the right and left eye position detection results, and the length of the horizontal side is twice the distance between the right and left eye position detection results.

As for the height of the mouth region, a range which extends upward a distance 0.75 times the distance between the nose and mouth position detection results and downward a distance 0.25 times the distance between the middle point of the right and left eye position detection results and the mouth position detection result from the position of the mouth position detection result obtained from template matching and the spatial positional relationship is set as a vertical range. As for the width of the mouth region, a range which extends to the right and left a distance 0.8 times the distance between the right and left eye position detection results from the position of the mouth position detection result obtained from template matching and the spatial positional relationship is set as a horizontal range of the eyes.

As for the height of the cheek region, a range which extends upward and downward a distance 0.25 times the distance between the middle point between the right and left eye detection results and the mouth position detection result from a middle point (which is a point near the center of the face) between the middle point between the right and left eye detection results and the mouth position detection result obtained from template matching and the spatial positional relationship is set as a vertical range.

As for the width of the cheek region, a range which extends to the right and left a distance 0.6 times the distance between the right and left eye detection results from the middle point (which is a point near the center of the face) between the middle point between the right and left eye detection results and the mouth position detection result obtained from template matching and the spatial positional relationship is set as a horizontal range of the cheeks.

That is, the length of the vertical side of the cheek region is 0.5 times the distance between the middle point between the right and left eye detection results and the mouth position detection result, and the length of the horizontal side is 1.2 times the distance between the right and left eye detection results.

With the aforementioned region setting process, as shown in FIG. 25, uppermost edges 6120 and 6121 are determined as brow edges, and second uppermost edges 6122 and 6123 are determined as eye edges in the eye region. In the mouth region, when the mouth is closed, an uppermost edge 6126 is determined as an upper lip edge, and a second uppermost edge 6127 is determined as a lower lip edge, as shown in FIG. 25. When the mouth is open, the uppermost edge is determined as an upper lip edge, the second uppermost edge is determined as a tooth edge, and the third uppermost edge is determined as a lower lip edge.

The aforementioned determination results are generated by the face feature edge extraction section 6122 as data identifying the above three regions (eye, cheek, and mouth regions), i.e., the eye, cheek, and mouth regions, and position and size data of the respective regions, and are output to the face feature point extraction section 6113 together with the edge image.

The face feature point extraction section 6113 detects feature points (to be described later) by scanning the edges in the eye, cheek, and mouth regions in the edge image using various data input from the face feature edge extraction section 6112.

Figure 26:
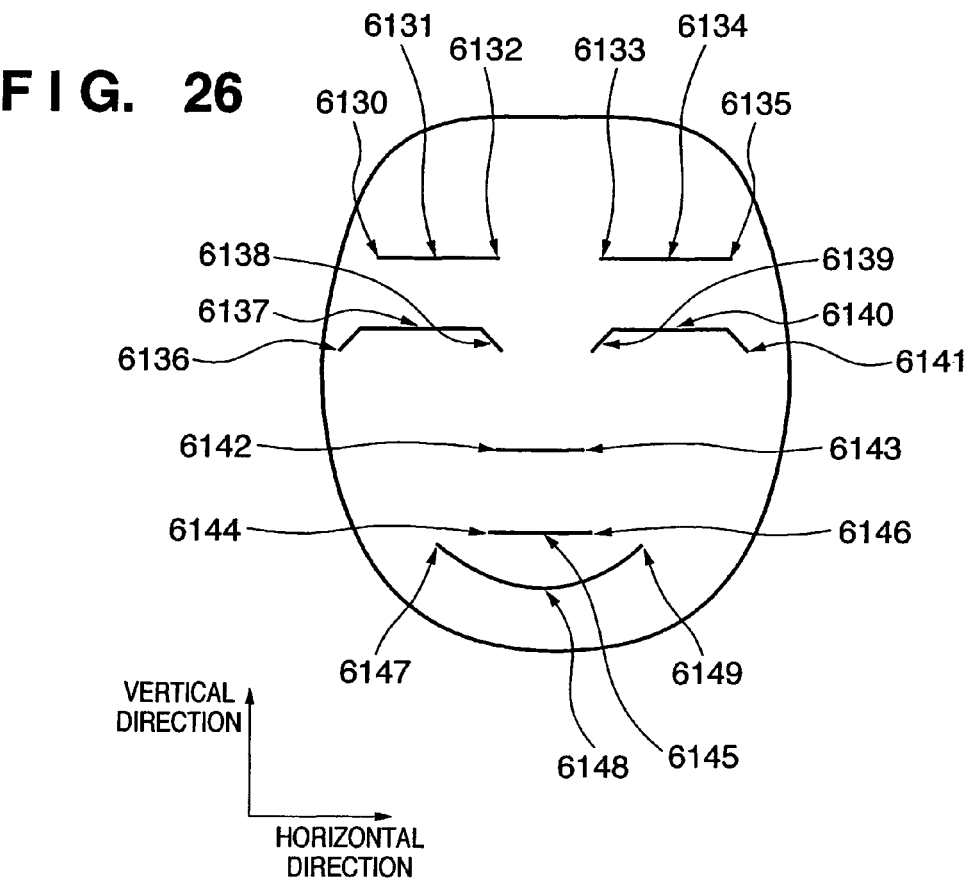
FIG. 26 shows feature points to be detected by a face feature point extraction section 6113.

FIG. 26 shows respective feature points to be detected by the face feature point extraction section 6113. As shown in FIG. 26, respective feature points indicate end points of each edge, and a middle point between the end point on that edge. For example, the end points of an edge can be obtained by calculating the maximum and minimum values of coordinate positions in the horizontal direction with reference to the values of pixels which form the edge (the value of a pixel which forms the edge is 1, and that of a pixel which does not form the edge is 0). The middle point between the end points on the edge can be calculated by simply detecting a position that assumes a coordinate value in the horizontal direction of the middle point between the end points on the edge.

The face feature point extraction section 6113 obtains the position information these end points as feature point information, and outputs eye feature point information (position information of the feature points of respective edges in the eye region) and mouth feature point information (position information of the feature points of respective edges in the mouth region) to the next expression feature amount extraction section 6114 together with the edge image.

As for feature points, templates for calculating the end point positions of the eyes, mouth, and nose or the like may be used in the same manner as in position detection of the eyes, mouth, and nose, and the present invention is not limited to feature point extraction by means of edge scan.

The expression feature amount extraction section 6114 calculates feature amounts such as a "forehead-around edge density", "brow edge shapes", "distance between right and left brow edges", "distances between brow and eye edges", "distances between eye and mouth end points", "eye line edge length", "eye line edge shape", "cheek-around edge density", "mouth line edge length", "mouth line edge shape", and the like, which are required for expression determination, from the respective pieces of feature point information calculated by the face feature point extraction section 6113.

Note that the "distances between eye and mouth end points" indicate a vertical distance from the coordinate position of a feature point 6136 (the right end point of the right eye) to that of a feature point 6147 (the right end point of lips), and also a vertical distance from the coordinate position of a feature point 6141 (the left end point of the left eye) to that of a feature point 6149 (the left end point of lips) in FIG. 26.

The "eye line edge length" indicates a horizontal distance from the coordinate position of the feature point 6136 (the right end point of the right eye) to that of a feature point 6138 (the left end point of the right eye) or a horizontal distance from the coordinate position of a feature point 6139 (the right end point of the left eye) to that of the feature point 6141 (the left end point of the left eye) in FIG. 26.

Figure 27:
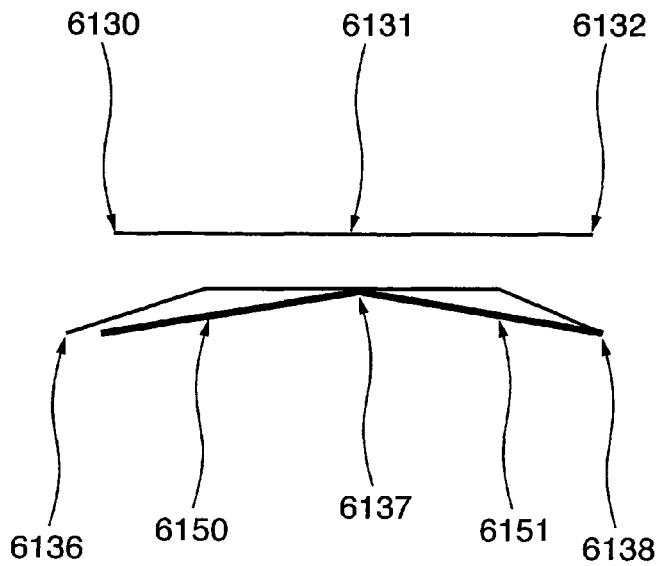
FIG. 27 is a view for explaining a "shape of an eye line edge"

As for the "eye line edge shape", as shown in FIG. 27, a line segment (straight line) 6150 specified by the feature point 6136 (the right end point of the right eye) and a feature point 6137 (a middle point of the right eye) and a line segment (straight line) 6151 specified by the feature point 6137 (the middle point of the right eye) and the feature point 6138 (the left end point of the right eye) are calculated, and the shape is determined based on the slopes of the two calculated straight lines 6150 and 6151.

The same applies to a process for calculating the shape of the line edge of the left eye, except for feature points used. That is, the slope of a line segment specified by two feature points (the right end point and a middle of the left eye) and that of another line segment specified by two feature points (the middle point and left end point of the left eye) are calculated, and the shape is similarly determined based on these slopes.

The "cheek-around edge density" represents the number of pixels which form edges in the cheek region. Since "wrinkles" are formed when cheek muscles are lifted up, and various edges having different lengths and widths are generated accordingly, the number of pixels (that of pixels with a pixel value=1) which form these edges is counted as an amount of these edges, and a density can be calculated by dividing the count value by the number of images which form the cheek region.

The "mouth line edge length" indicates a distance between the coordinate points of two feature points (the right and left end points of the mouth) when all the edges in the mouth region are scanned, and a pixel which has the smallest coordinate position in the horizontal direction is defined as one feature point (the right end point of the mouth) and a pixel with the largest coordinate position is defined as the other feature point (the left end point of the mouth).

As described above, the distance between the end points, the slope of a line segment specified by the two end points, and the edge density are calculated to obtain feature amounts. In other words, this process calculates feature amounts such as the edge lengths, shapes, and the like of respective portions. Therefore, these edge lengths and shapes will often be generally referred to as "edge feature amounts" hereinafter.

The feature amount calculation unit 6101 can calculate respective feature amounts from the input images in this way.

Referring back to FIG. 23, the reference feature holding unit 6102 holds feature amounts of an emotionless face as a sober face, which are detected by the feature amount detection process executed by the feature amount calculation unit 6101 from the emotionless face, prior to the expression determination process.

Hence, in the processes to be described below, change amounts of the feature amounts detected by the feature amount calculation unit 6101 from the edge image of the input images by the feature amount detection process from those held by the reference feature holding unit 6102 are calculated, and an expression of a face in the input images is determined in accordance with the change amounts. Therefore, the feature amounts held by the reference feature holding unit 6102 will often be referred to as "reference feature amounts" hereinafter.

The feature amount change amount calculation unit 6103 calculates the differences between the feature amounts which are detected by the feature amount calculation unit 6101 from the edge image of the input images by the feature amount detection process, and those held by the reference feature holding unit 6102. For example, the unit 6103 calculates the difference between the "distances between the end points of the eyes and mouth" detected by the feature amount calculation unit 6101 from the edge image of the input images by the feature amount detection process, and "distances between the end points of the eyes and mouth" held by the reference feature holding unit 6102, and sets them as the change amounts of the feature amounts. Calculating such differences for respective feature amounts to calculating changes of feature amounts of respective portions.

Upon calculating the differences between the feature amounts which are detected by the feature amount calculation unit 6101 from the edge image of the input images by the feature amount detection process, and those held by the reference feature holding unit 6102, a difference between identical features (e.g., the difference between the "distances between the end points of the eyes and mouth" detected by the feature amount calculation unit 6101 from the edge image of the input images by the feature amount detection process, and "distances between the end points of the eyes and mouth" held by the reference feature holding unit 6102) is calculated. Hence, these feature amounts must be associated with each other. However, this method is not particularly limited.

Note that the reference feature amounts become largely different for respective users. In this case, a given user matches this reference feature amounts but another unit does not match. Hence, the reference feature holding unit 6102 may hold reference feature amounts of a plurality of users. In such case, before images are input from the image input unit 6100, information indicating whose face images are to be input is input in advance, and the feature amount change amount calculation unit 6103 determines reference feature amounts based on this information upon execution of its process. Therefore, the differences can be calculated using the reference feature amounts for respective users, and the precision of the expression determination process to be described later can be further improved.

The reference feature holding unit 6102 may hold feature amounts of an emotionless face, which are detected from an emotionless image of an average face by the feature amount detection process executed by the feature amount calculation unit 6101 in place of the reference feature amounts for respective users.

Data of respective change amounts which are calculated by the feature amount change amount calculation unit 6103 in this way and indicate changes of feature amounts of respective portions are output to the next score calculation unit 6104.

The score calculation unit 6104 calculates a score on the basis of the change amount of each feature amount, and "weight" which is calculated in advance and is held in a memory (e.g., the RAM 1002). As for the weight, analysis for personal differences of change amounts for each portion is made in advance, and an appropriate weight is set for each feature amount in accordance with the analysis result.

For example, small weights are set for features with relatively small change amounts (e.g., the eye edge length and the like) and features with larger personal differences in change amounts (e.g., wrinkles and the like), and large weights are set for features with smaller personal differences in change amounts (e.g., the distances between the end points of the eyes and mouth and the like).

Figure 28:
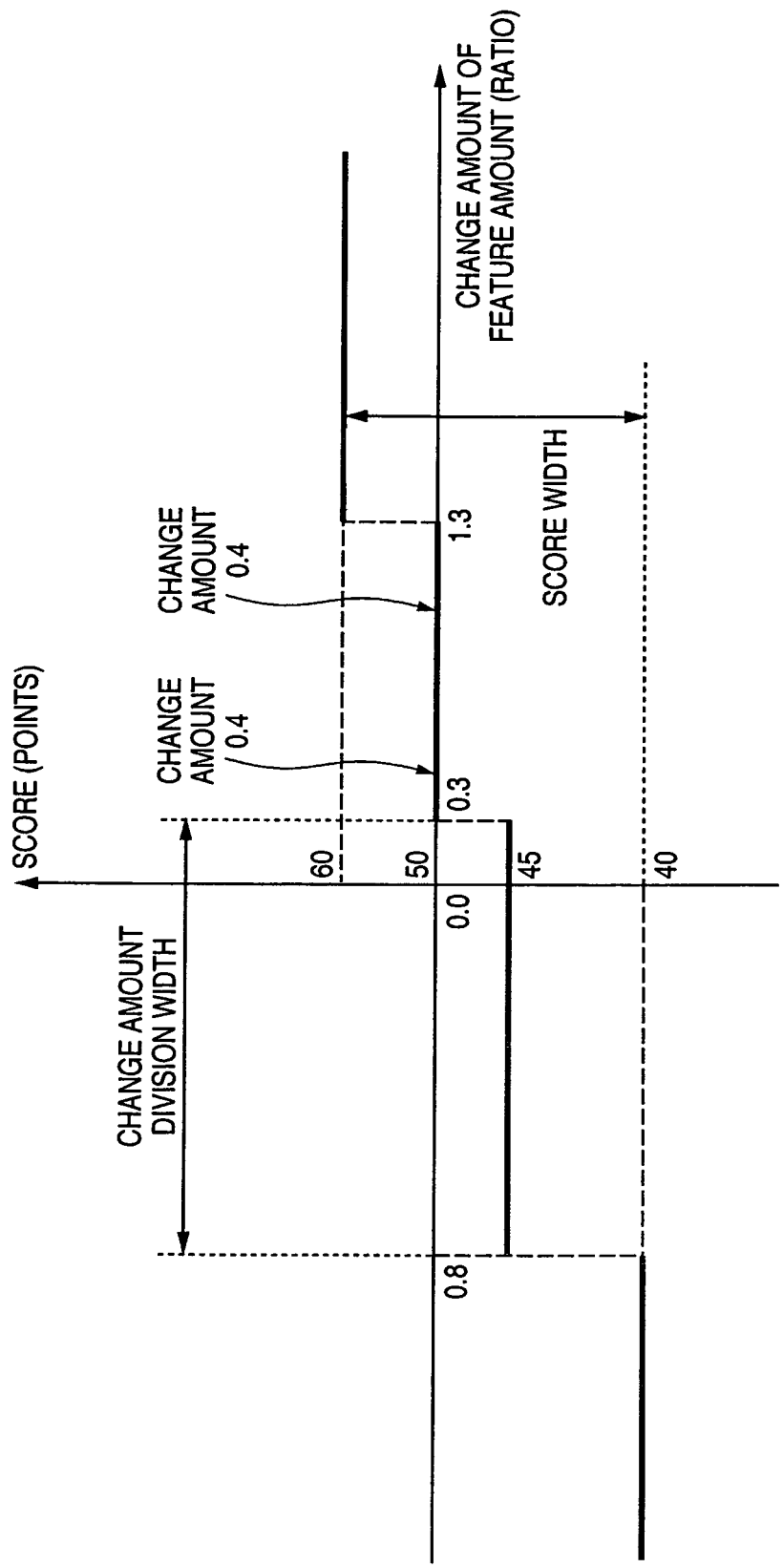
FIG. 28 is a graph to be referred to upon calculating a score from a change amount of an eye edge length as an example of a feature whose change amount has a personal difference.

FIG. 28 shows a graph which is to be referred to upon calculating a score from the eye edge length as an example of a feature which has a large personal difference in its change amount.

The abscissa plots the feature amount change amount (a value normalized by a feature amount of a reference face), and the ordinate plots the score. For example, if the change amount of the eye edge length is 0.4, a score=50 points is calculated from the graph. Even when the change amount of the eye edge length is 1.2, a score=50 points is calculated in the same manner as in the case of the change amount=0.3. In this way, a weight is set to reduce the score difference even when the change amounts are largely different due to personal differences.

Figure 29:
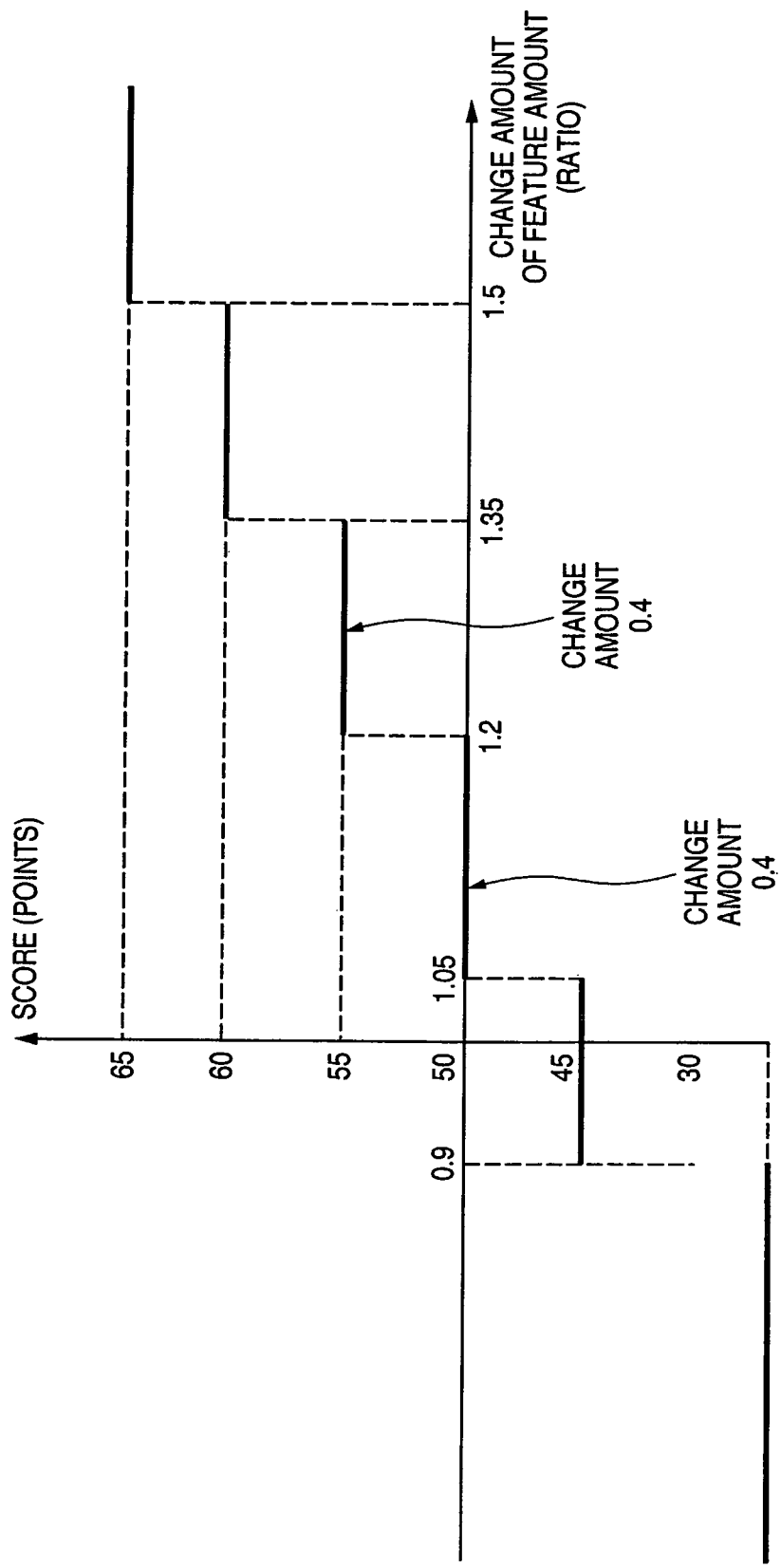
FIG. 29 is a graph to be referred to upon calculating a score from a change amount of the length of a distance between the end points of an eye and mouth as a feature whose change amount has no personal difference.

FIG. 29 shows a graph which is to be referred to upon calculating a score from the distance between the end points of the eye and mouth as a feature which has a small personal difference in change amounts.

As in FIG. 28, the abscissa plots the feature amount change amount, and the ordinate plots the score. For example, when the change amount of the length of the distance between the end points of the eye and mouth is 1.1, 50 points are calculated from the graph; when the change amount of the length of the distance between the end points of the eye and mouth is 1.3, 55 points are calculated from the graph. That is, a weight is set to increase the score difference when the change amounts are largely different due to personal differences.

That is, the "weight" corresponds to the ratio between the change amount division width and score width when the score calculation unit 6104 calculates a score. By executing a step of setting weights for respective feature amounts, personal differences of the feature amount change amounts are absorbed. Furthermore, expression determination does not depend on only one feature to reduce detection errors and non-detection, thus improving the expression determination (recognition) ratio.

Note that the RAM 1002 holds data of the graphs shown in FIGS. 27 and 28, i.e., data indicating the correspondence between the change amounts of feature amounts and scores, and scores are calculated using these data.

Data of scores for respective feature amounts calculated by the score calculation unit 6104 are output to the next expression determination unit 6105 together with data indicating the correspondence between the scores and feature amounts.

The RAM 1002 holds the data of the scores for respective feature amounts calculated by the score calculation unit 6104 by the aforementioned process in correspondence with respective expressions prior to the expression determination process.

Therefore, the expression determination unit 6105 determines an expression by executing:

1. a comparison process between a sum total value of the scores for respective feature amounts and a predetermined threshold value; and 2. a process for comparing the distribution of the scores for respective feature amounts and those of scores for respective feature amounts for respective expressions.

Figure 31:
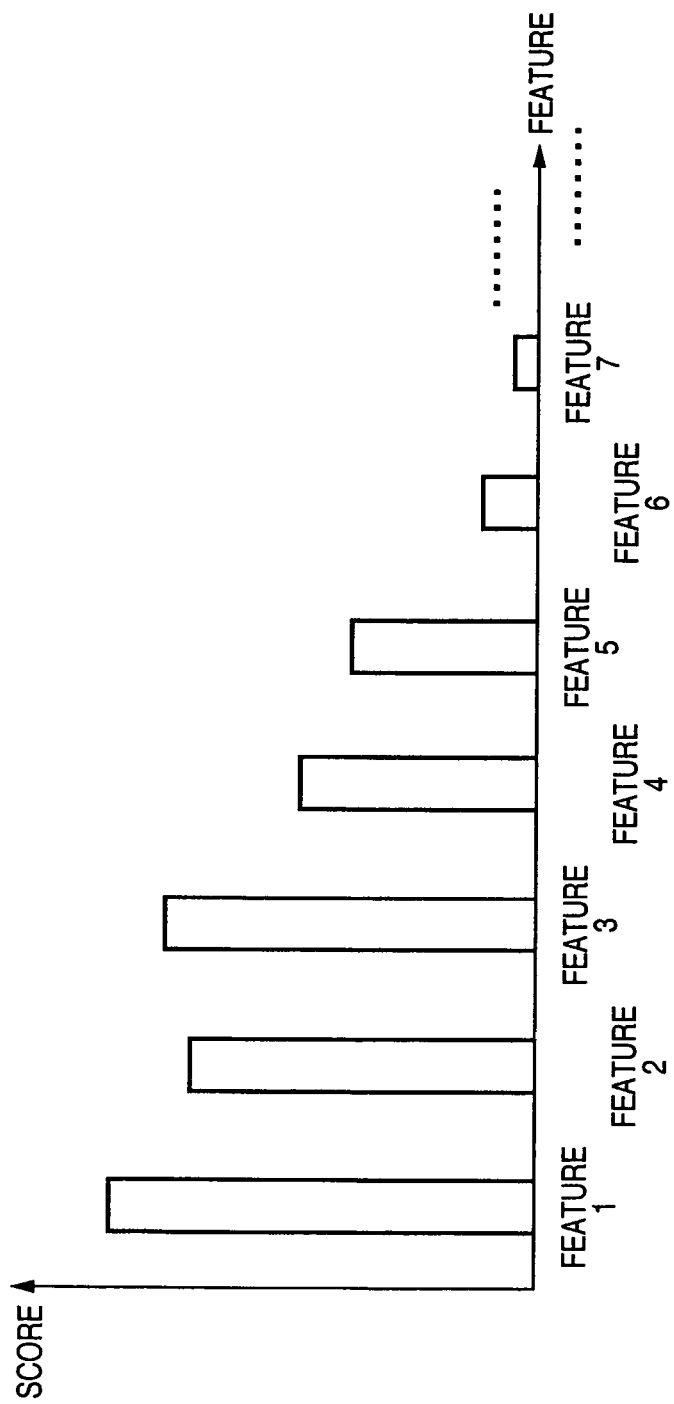
FIG. 31 is a graph showing an example of the distribution of scores corresponding to an expression that indicates joy.

For example, an expression indicating joy shows features:
1. eyes slant down outwards;
2. cheek muscles are lifted up; and
3. mouth corners are lifted up Hence, in the distribution of the calculated scores, the scores of "the distance between the eye and mouth end points", "cheek-around edge density", and "mouth line edge length" are very high, and those of the "eye line edge length" and "eye line edge shape" are higher than those of other feature amounts, as shown in FIG. 31. Therefore, this score distribution is unique to an expression of joy. Other expressions have such unique score distributions. FIG. 31 shows the score distribution of an expression of joy.

Therefore, the expression determination unit 6105 specifies to which of the shapes of the score distributions unique to respective expression the shape of the distribution defined by the scores of respective feature amounts calculated by the score calculation unit 6104 is closest, and determines an expression represented by the score distribution with the closest shape as an expression to be output as a determination result.

As a method of searching for the score distribution with the closest shape, for example, the shape of the distribution is parametrically modeled by mixed Gaussian approximation to determine a similarity between the calculated score distribution and those for respective expressions by checking the distance in a parameter space. An expression indicated by the score distribution with a higher similarity with the calculated score distribution (the score distribution with a smaller distance) is determined as a candidate of determination.

Then, the process for checking if the sum total of the scores of respective feature amounts calculated by the score calculation unit 6104 is equal to or larger than a threshold value is executed. This comparison process is effective to accurately determine a non-expression scene similar to an expression scene as an expression scene. Therefore, if this sum total value is equal to or larger than the predetermined threshold value, the candidate is determined as the finally determined expression. On the other hand, if this sum total value is smaller than the predetermined threshold value, the candidate is discarded, and it is determined that a face in the input images is an emotionless or non-expression face.

In the comparison process of the shape of the score distribution, if the similarity is equal to or smaller than a predetermined value, it may be determined at that time that a face in the input images is an emotionless or non-expression face, and the process may end without executing the comparison process between the sum total value of the scores of respective feature amounts calculated by the score calculation unit 6104 with the threshold value.

Figure 30:
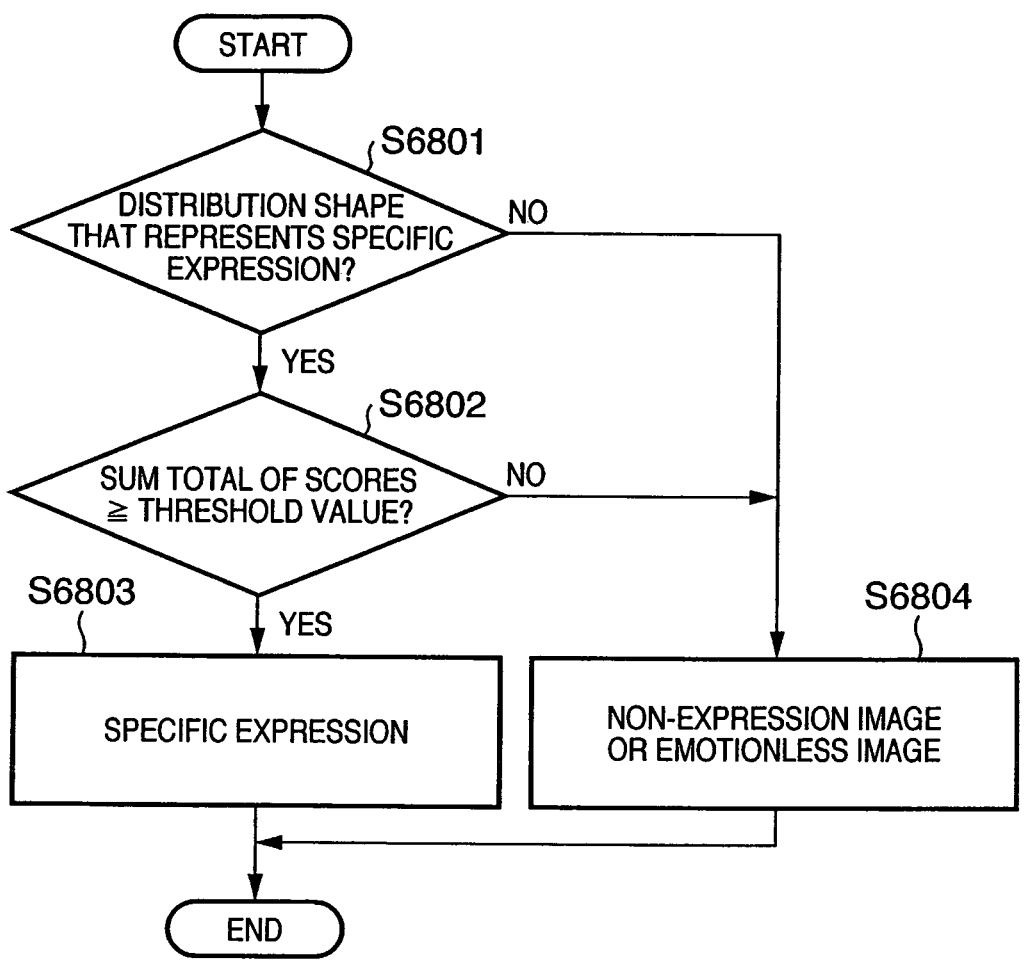
FIG. 30 is a flowchart of a determination process upon determining using the scores for respective feature amounts calculated by a score calculation unit 6104 whether or not a facial expression in an input image is a "specific expression"

FIG. 30 is a flowchart showing a determination process for determining whether or not an expression of a face in the input images is a "specific expression" using the scores for respective feature amounts calculated by the score calculation unit 6104.

The expression determination unit 6105 checks if the shape of the distribution defined by the scores of respective feature amounts calculated by the score calculation unit 6104 is close to that of the score distribution unique to a specific expression (step S6801). For example, if a similarity between the calculated score distribution and the score distribution of the specific expression is equal to or larger than a predetermined value, it is determined that "the shape of the distribution defined by the scores of respective feature amounts calculated by the score calculation unit 6104 is close to that of the score distribution unique to the specific expression".

If it is determined in step S6801 that the shape of the calculated distribution is close to that of the specific expression, the flow advances to step S6802 to execute a determination process for determining if the sum total value of the scores of respective feature amounts calculated by the score calculation unit 6104 is equal to or larger than the predetermined threshold value (step S6802). If it is determined that the sum total value is equal to or larger than the threshold value, it is determined that the expression of the face in the input images is the "specific expression", and that determination result is output.

On the other hand, if it is determined in step S6801 that the shape of the calculated distribution is not close to that of the specific expression, or if it is determined in step S6802 that the sum total value is smaller than the threshold value, the flow advances to step S6804 to output data indicating that the input images are non-expression or emotionless images (step S6804).

In this embodiment, both the comparison process between the sum total value of the scores for respective feature amounts and the predetermined threshold value, and the process for comparing the distribution of the scores for respective feature amounts with those of the scores for respective feature amounts for respective expressions are executed as the expression determination process. However, the present invention is not limited to such specific processes, and one of these comparison processes may be executed.

With the above processes, according to this embodiment, since the comparison process of the score distribution and the comparison process with the sum total value of the scores are executed, an expression of a face in the input image can be more accurately determined. Also, whether or not the expression of the face in the input images is a specific expression can be determined.

Eighth Embodiment

Figure 32:
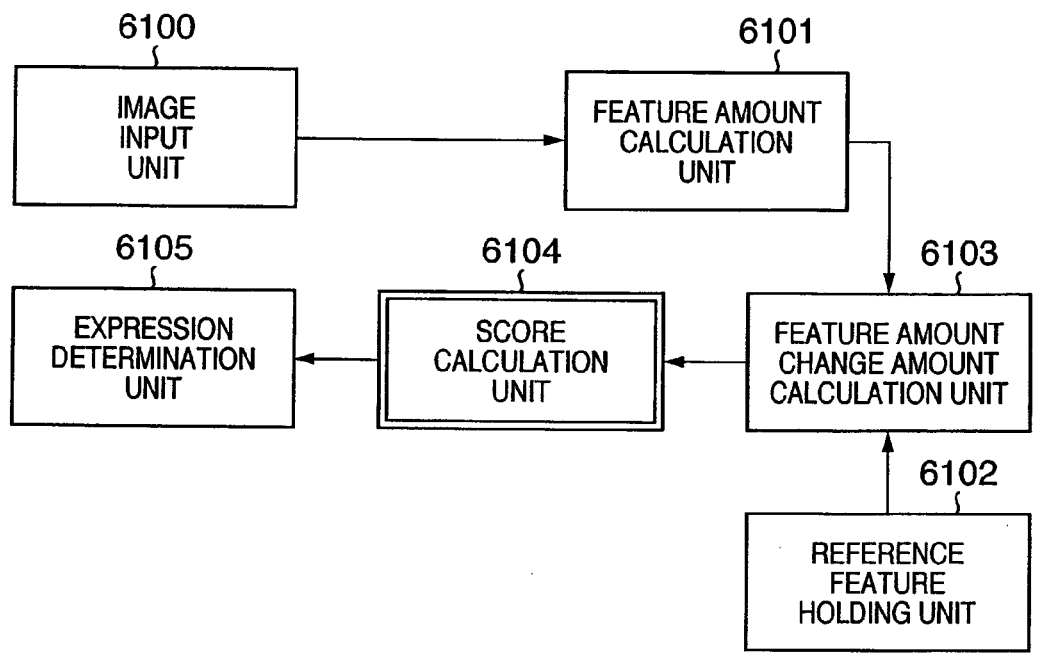
FIG. 32 is a block diagram showing the functional arrangement of an image processing apparatus according to the eighth embodiment of the present invention.

FIG. 32 is a block diagram showing the functional arrangement of an image processing apparatus according to this embodiment. The same reference numerals in FIG. 32 denote the same parts as those in FIG. 23, and a description thereof will be omitted. Note that the basic arrangement of the image processing apparatus according to this embodiment is the same as that of the seventh embodiment, i.e., that shown in FIG. 11.

The image processing apparatus according to this embodiment will be described below. As described above, the functional arrangement of the image processing apparatus according to this embodiment is substantially the same as that of the image processing apparatus according to the seventh embodiment, except for an expression determination unit 6165. The expression determination unit 6165 will be described in detail below.

Figure 33:
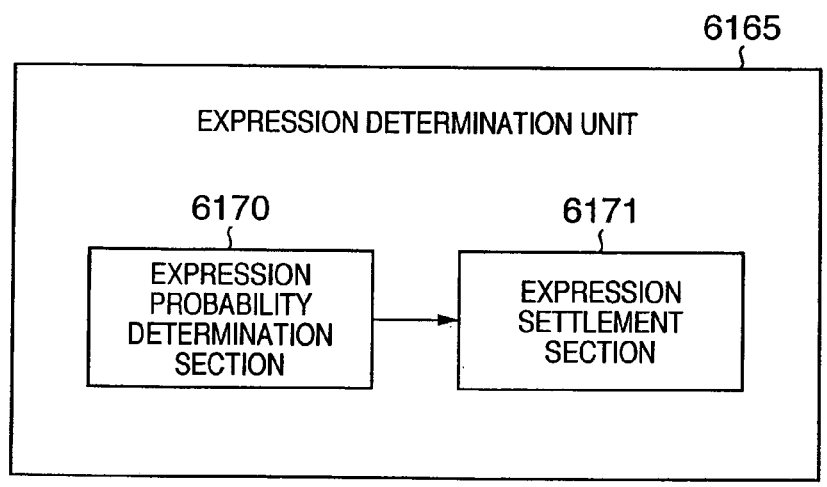
FIG. 33 is a block diagram showing the functional arrangement of an expression determination unit 6165.

FIG. 33 is a block diagram showing the functional arrangement of the expression determination unit 6165. As shown in FIG. 33, the expression determination unit 6165 comprises an expression probability determination section 6170 and an expression settlement section 6171.

The expression probability determination section 6170 executes the same expression determination process as that in the seventh embodiment using the score distribution defined by the scores of respective feature amounts calculated by the score calculation unit 6104, and the sum total value of the scores, and outputs that determination result as an "expression probability determination result". For example, upon determining an expression of joy or not, it is determined that "there is a possibility of an expression of joy" from the distribution and sum total value of the scores calculated by the score calculation unit 6104 in place of determining "expression of joy".

This possibility determination is done to distinguish a non-expression scene as a conversation scene from a scene of joy, since feature changes of a face of pronunciations "i" and "e" in the conversation scene as the non-expression scene are roughly equal to those of a face in a scene of joy.

Figure 34:
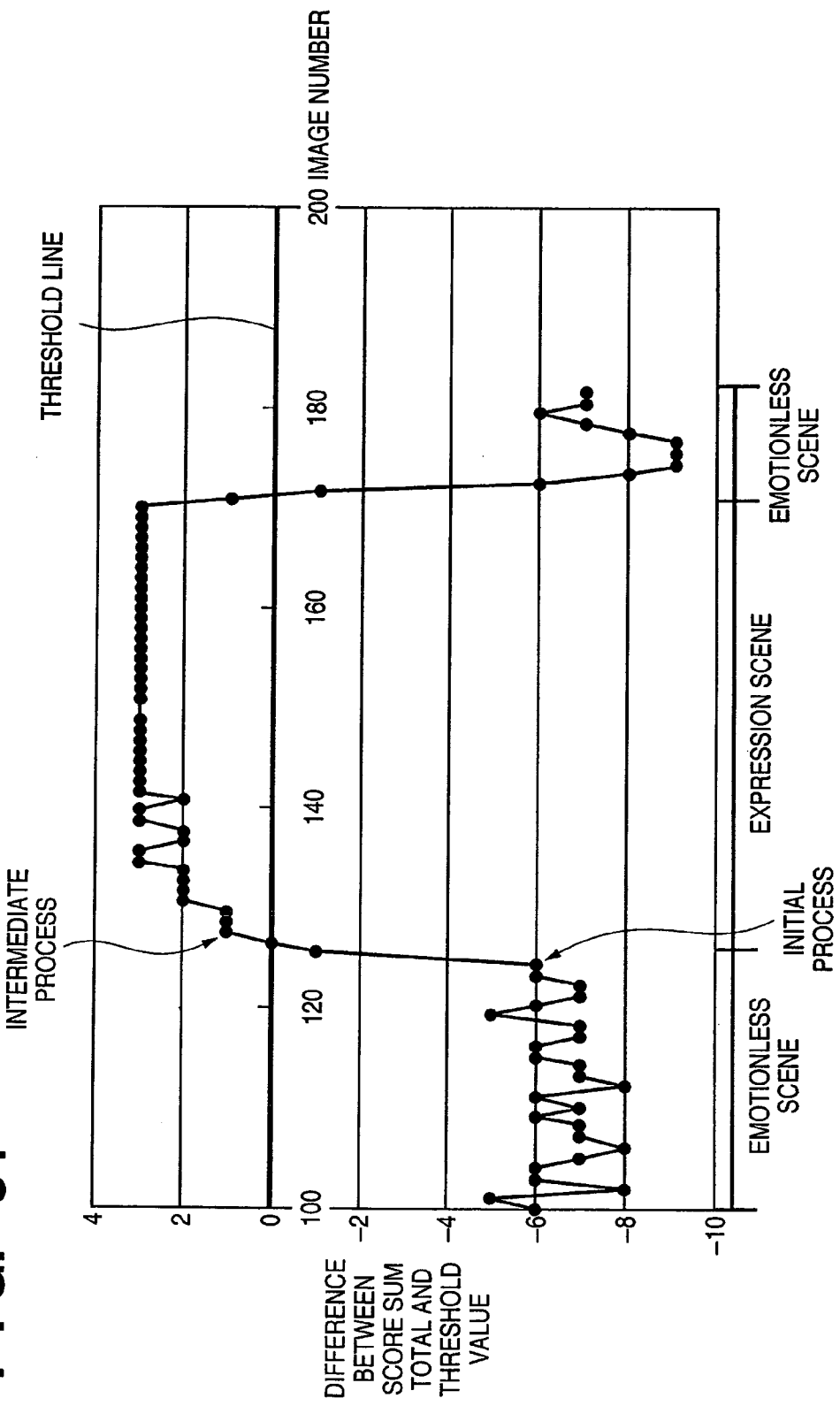
FIG. 34 is a graph showing the difference between the sum total of scores and a threshold line while the abscissa plots the image numbers uniquely assigned to time-series images, and the ordinate plots the difference between the sum total of scores and threshold line, when a non-expression scene as a sober face has changed to a joy expression scene.

The expression settlement section 6171 determines a specific expression image using the expression probability determination result obtained by the expression probability determination section 6170. FIG. 34 is a graph showing the difference between the sum total of scores and a threshold line while the abscissa plots image numbers uniquely assigned to time-series images, and the ordinate plots the difference between the sum total of scores and threshold line, when a non-expression scene as a sober face has changed to a joy expression scene.

Figure 35:
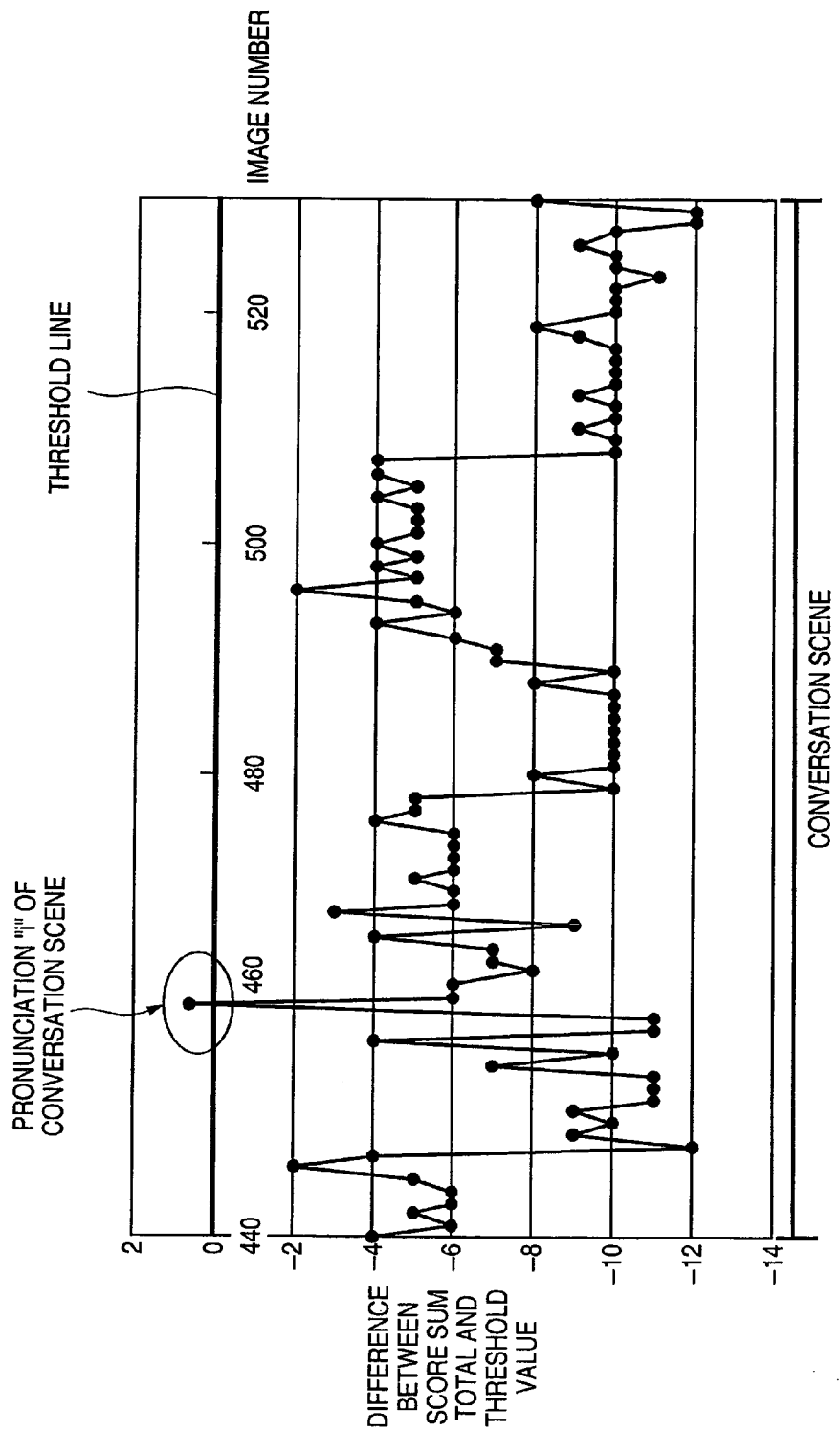
FIG. 35 is a graph showing the difference between the sum total of scores and threshold line in a conversation scene as a non-expression scene while the abscissa plots the image numbers of time-series images, and the ordinate plots the difference between the sum total of scores and threshold line.

FIG. 35 is a graph showing the difference between the sum total of scores and threshold line in a conversation scene as a non-expression scene while the abscissa plots image numbers of time-series images, and the ordinate plots the difference the sum total of scores and threshold line.

With reference to FIG. 34 that shows a case wherein the emotionless scene has changed to the joy expression scene, a score change varies largely from an initial process to an intermediate process, but it becomes calm after the intermediate process, and finally becomes nearly constant. That is, from the initial process to the intermediate process upon changing from the emotionless scene to the joy expression scene, respective portions such as the eyes, mouth, and the like of the face vary abruptly, but variations of respective features of the eyes and mouth become calm from the intermediate process to joy, and they finally cease to vary.

The variation characteristics of respective features of the face similarly apply to other expressions. Conversely, with reference to FIG. 35 that shows a conversation scene as a non-expression scene, in a conversation scene of pronunciation "i" which involves roughly the same feature changes of the face (e.g., the eyes and mouth) as those of joy, images whose score exceed the threshold line are present. However, in the conversation scene of pronunciation "i", respective features of the face always abruptly vary unlike in the joy expression scene. Hence, even when the score becomes equal to or larger than the threshold line, it tends to be quickly equal to or smaller than the threshold line.

Hence, the expression probability determination section 6170 performs expression probability determination, and the expression settlement section 6171 executes a step of settling the expression on the basis of continuity of the expression probability determination results. Hence, the conversation scene can be accurately discriminated from the expression scene.

In psychovisual studies about perception of facial expression by persons, the action of a face in expression ventilation, especially, the speed has a decisive influence on determination of an emotion category from an expression, as can also be seen from M. Kamachi, V. Bruce, S. Mukaida, J. Gyoba, S. Yoshikawa, and S. Akamatsu, "Dynamic properties influence the perception of facial expression," Perception, vol. 30, pp. 875-887, July 2001.

The processes to be executed by the expression probability determination section 6170 and expression settlement section will be described in detail below.

Assume that the probability determination section 6170 determines "first expression" for a given input image (an image of the m-th frame). This determination result is output to the expression settlement section 6171 as a probability determination result. The expression settlement section 6171 does not immediately output this determination result, and counts the number of times of determination of the first expression by the probability determination section 6170 instead. When the probability determination section 6170 determines a second expression different from the first expression, this count is reset to zero.

The reason why the expression settlement section 6171 does not immediately output the expression determination result (the determination result indicating the first expression) is that the determined expression is likely to be indefinite due to various causes, as described above.

The probability determination section 6170 executes expression determination processes for respective input images like an input image of the (m+1)-th frame, an input image of the (m+2)-th frame, . . . . If the count value of the expression settlement section 6171 has reached n, i.e., if the probability determination section 6170 determines "first expression" for all n frames in turn from the m-th frame, the expression settlement section 6171 records data indicating that this timing is the "start timing of first expression", i.e., that the (m+n)-th frame is the start frame in the RAM 1002, and determines an expression of joy after this timing until the probability determination section 6170 determines a second expression different from the first expression.

As in the explanation using FIG. 34, in the expression scene, the difference between the score sum total and threshold value ceases to change for a predetermined period of time, i.e., an identical expression continues for a predetermined period of time. Conversely, when an identical expression does not continue for a predetermined period of time, a conversation scene as a non-expression scene is likely to be detected as in the description using FIG. 35.

Therefore, when a possibility of an identical expression is determined for a predetermined period of time (n frames in this case) by the process executed by the probability determination section 6170, that expression is output as a final determination result. Hence, such factors (e.g., a conversation scene as a non-expression scene or the like) that become disturbance in the expression determination process can be removed, and more accurate expression determination process can be done.

Figure 36:
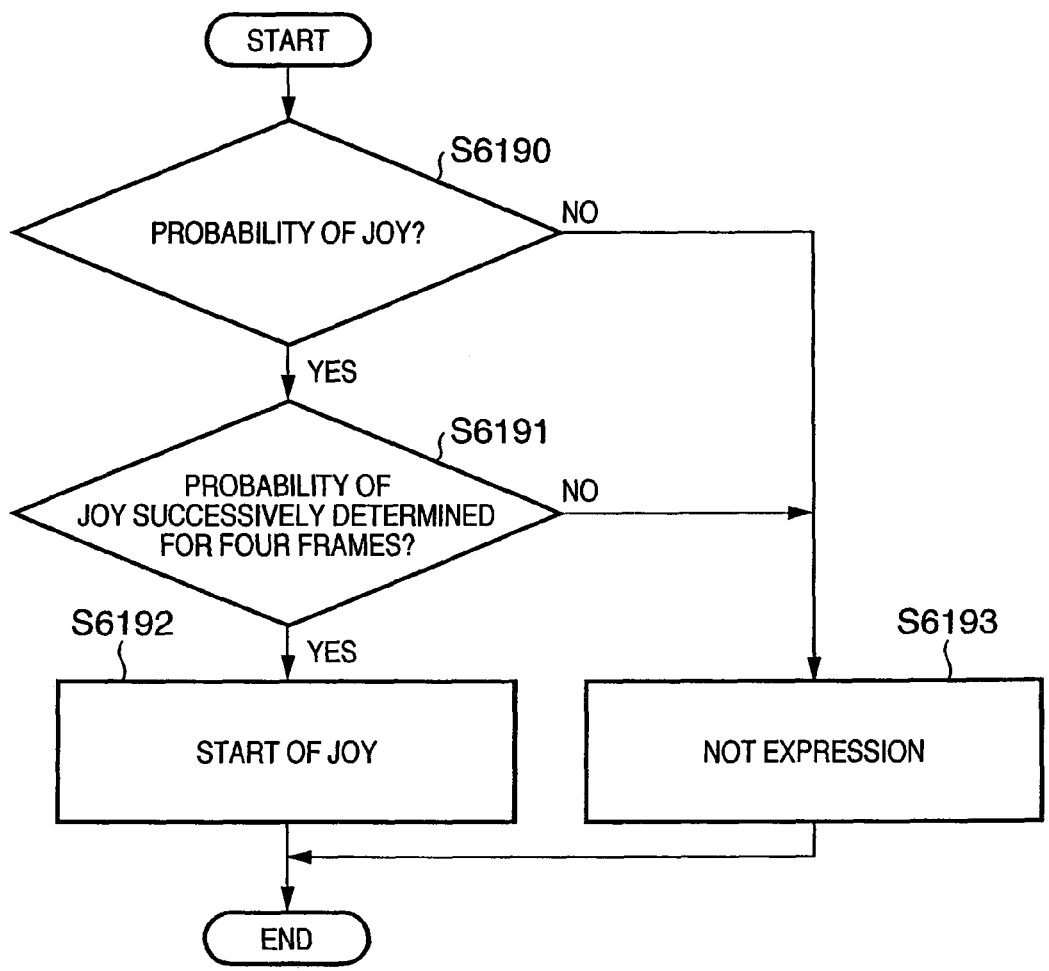
FIG. 36 is a flowchart of a process which is executed by an expression settlement section 6171 to determine the start timing of an expression of joy in images successively input from an image input unit 6100.

FIG. 36 is a flowchart of the process which is executed by the expression settlement section 6171 determining the start timing of an expression of joy in images successively input from the image input unit 6100.

If the probability determination result of the probability determination section 6170 indicates joy (step S6190), the flow advances to step S6191. If the count value of the expression settlement section 6171 has reached p (p=4 in FIG. 36 (step S6191), i.e., if the probability determination result of the probability determination section 6170 successively indicates joy for p frames, this timing is determined as "start of joy", and data indicating this (e.g., the current frame number data and flag data indicating the start of joy) is recorded in the RAM 1002 (step S6192).

With the above process, the start timing (start frame) of an expression of joy can be specified.

Figure 37:
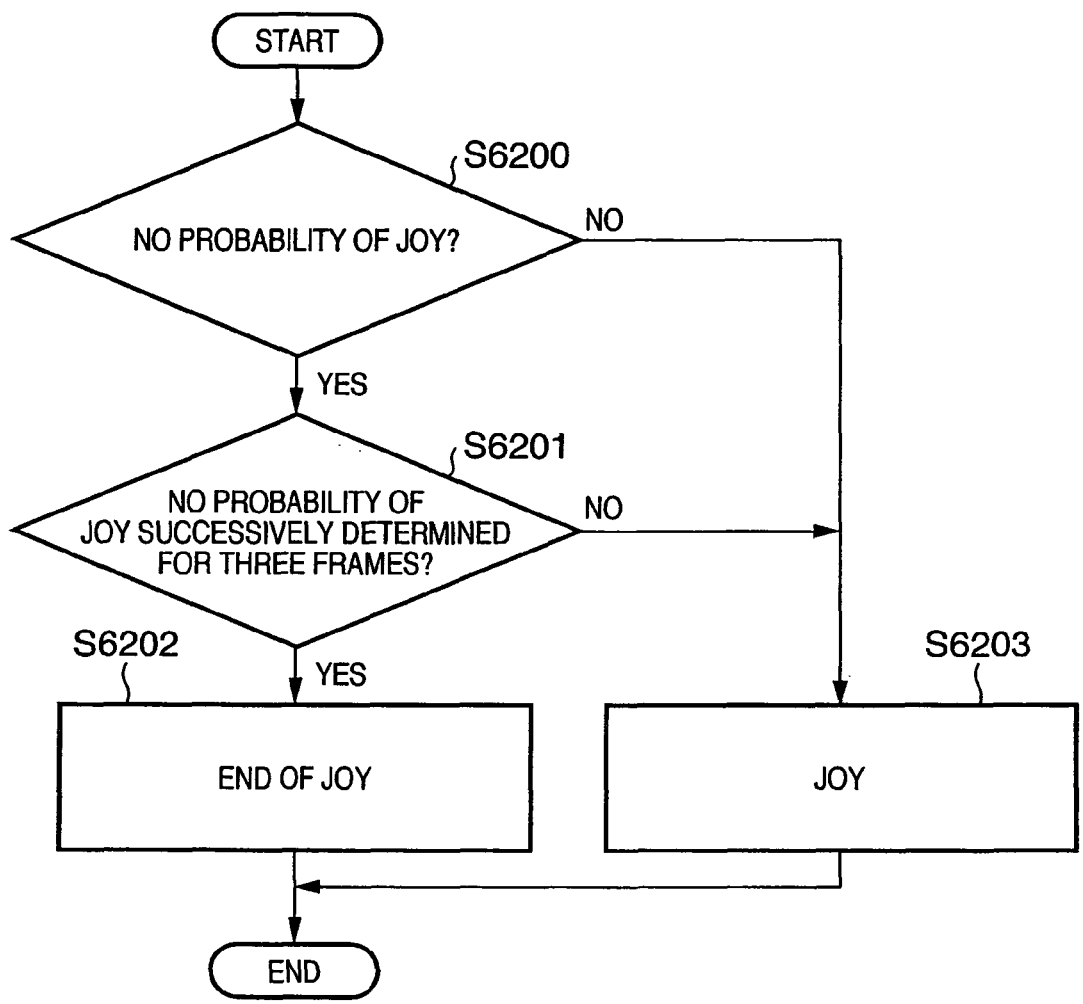
FIG. 37 is a flowchart of a process which is executed by the expression settlement section 6171 to determine the start timing of an expression of joy in images successively input from the image input unit 6100.

FIG. 37 is a flowchart of the process which is executed by the expression settlement section 6171 determining the end timing of an expression of joy in images successively input from the image input unit 6100.

The expression settlement section 6171 checks with reference to the flag data recorded in the RAM 1002 in step S6192 if the expression of joy has started but has not ended yet (step S6200). As will be described later, if the expression of joy ends, this data is rewritten to indicate accordingly. Hence, whether or not the expression of joy has ended yet currently can be determined with reference to this data.

If the expression of joy has ended yet, the flow advances to step S6201. If the expression probability section 6170 determines for q (q=3 in FIG. 37) frames that there is no possibility of joy, (i.e., if the count value of the expression settlement section 6171 is successively zero for q frames), this timing is determined as "end of joy", and the flag data is recorded in the RAM 1002 after it is rewritten to "data indicating the end of joy" (step S6202).

However, if the expression probability section 6170 does not successively determine in step S6201 for q frames that there is no possibility of joy (i.e., if the count value of the expression settlement section 6171 is not successively zero for q frames), the expression of the face in the input images is determined to be "joy" as a final expression determination result without any data manipulation.

After the end of the expression of joy, the expression settlement section 6171 determines the expressions in respective frames from the start timing to the end timing as "joy".

In this manner, expression start and end images are determined, and all images between these two images are determined as expression images. Hence, determination errors of expression determination processes for images between these two images can be suppressed, and the precision of the expression determination process can be improved.

Note that this embodiment has exemplified the process for determining an expression of "joy", but the processing contents are basically the same if this expression is other than "joy".

Ninth Embodiment

Figure 38:
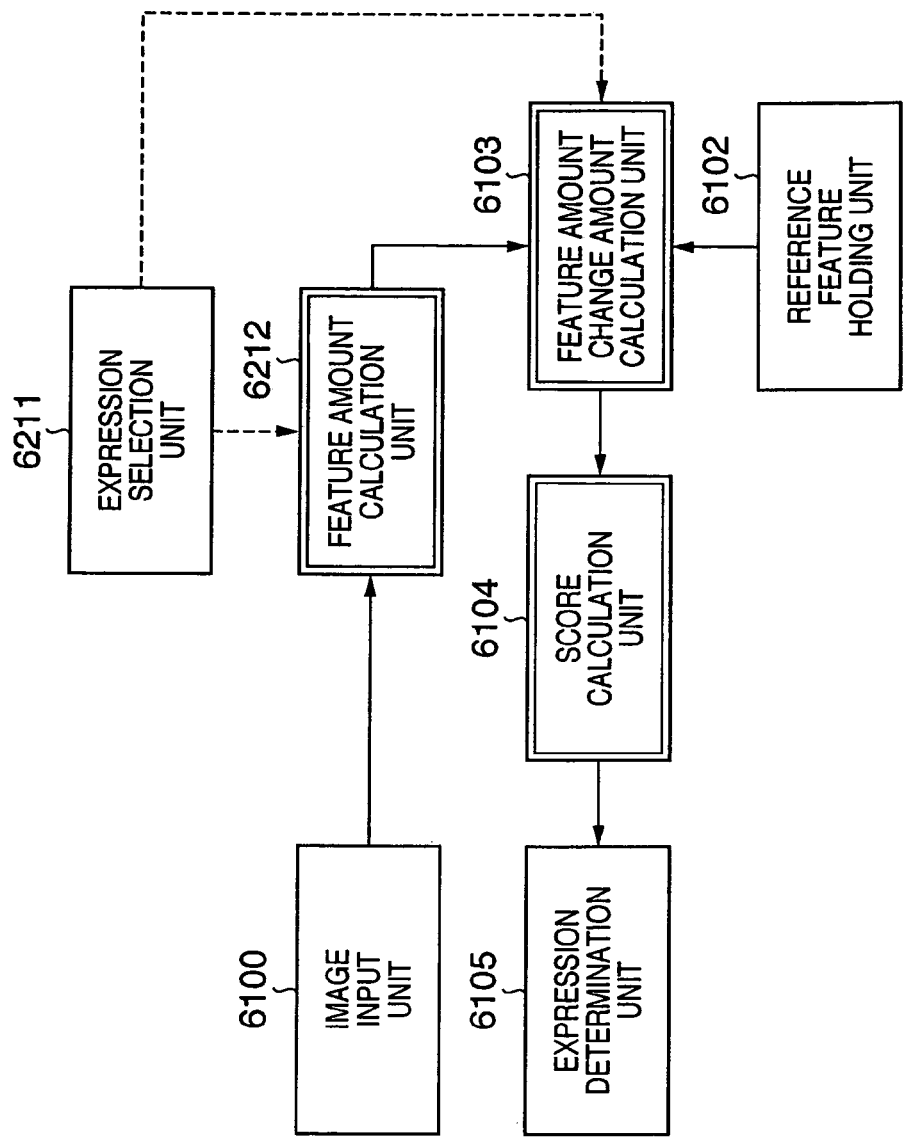
FIG. 38 is a block diagram showing the functional arrangement of an image processing apparatus according to the ninth embodiment of the present invention.

FIG. 38 is a block diagram showing the functional arrangement of an image processing apparatus according to this embodiment. The same reference numerals in FIG. 38 denote parts that make substantially the same operations as those in FIG. 23, and a description thereof will be omitted. Note that the basic arrangement of the image processing apparatus according to this embodiment is the same as that of the seventh embodiment, i.e., that shown in FIG. 11.

The image processing apparatus according to this embodiment receives one or more candidates indicating an expressions of a face in the input images, and determines which of the input candidates corresponds to the expression of the face in the input images.

The image processing apparatus according to this embodiment will be described in more detail below. As described above, the functional arrangement of the image processing apparatus according to this embodiment is substantially the same as that of the image processing apparatus according to the seventh embodiment, except for an expression selection unit 6211, feature amount calculation unit 6212, and expression determination unit 6105. Therefore, the expression selection unit 6211, feature amount calculation unit 6212, and expression determination unit 6105 will be described in detail below.

The expression selection unit 6211 inputs one or more expression candidates. In order to input candidates, the user may select one or more expressions using the keyboard 1004 or mouse 1005 on a GUI which is displayed on, e.g., the display screen of the display device 1006 and is used to select a plurality of expressions. Note that the selected results are output to the feature amount calculation unit 6212 and feature amount change amount calculation unit 6103 as codes (e.g., numbers).

The feature amount calculation unit 6212 executes a process for calculating feature amounts required to recognize the expressions selected by the expression selection unit 6211 from a face in an image input from the image input unit 6100.

The expression determination unit 6105 executes a process for determining which of the expressions selected by the expression selection unit 6211 corresponds to the face in the image input from the image input unit 6100.

Figure 39:
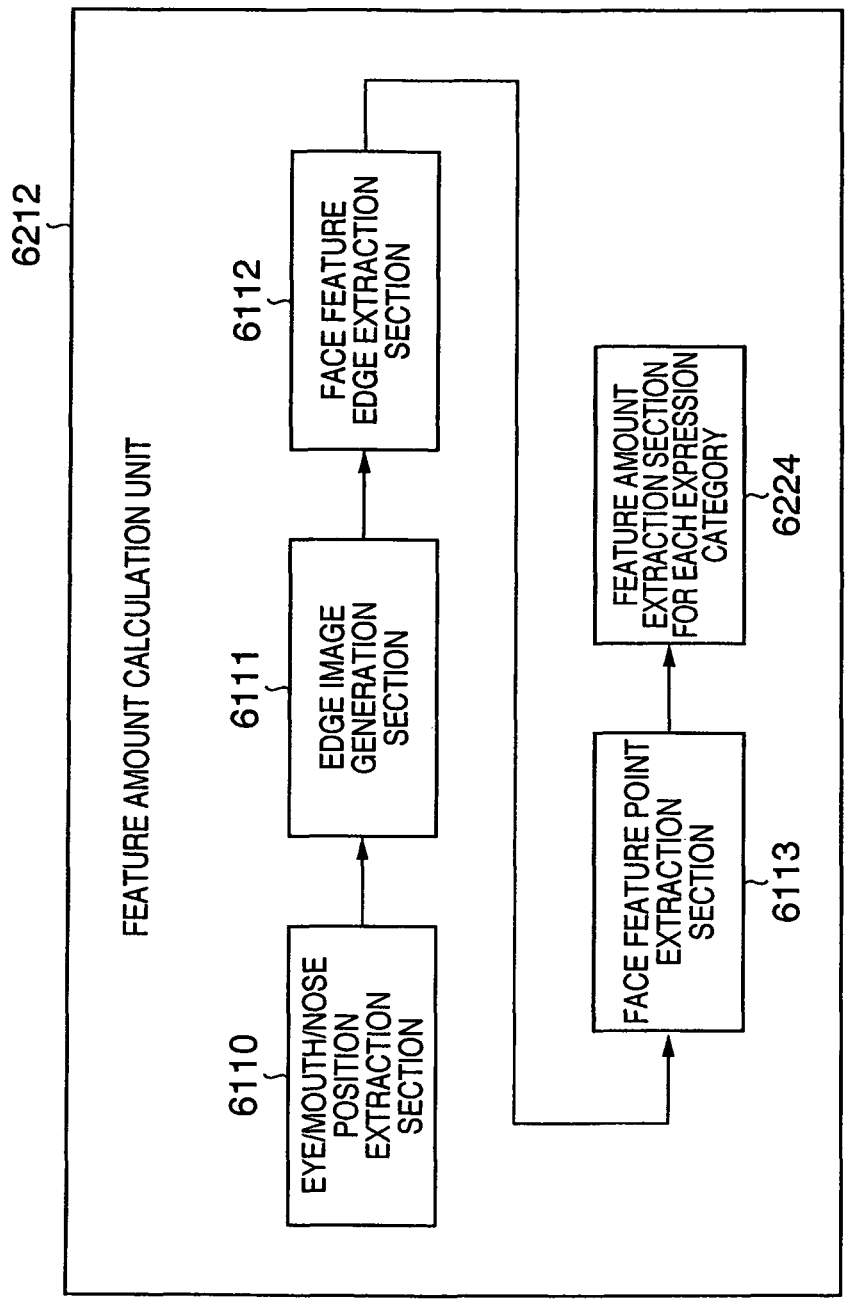
FIG. 39 is a block diagram showing the functional arrangement of a feature amount calculation unit 6212.

FIG. 39 is a block diagram showing the functional arrangement of the feature amount calculation unit 6212. Note that the same reference numerals in FIG. 39 denote the same parts as those in FIG. 24, and a description thereof will be omitted. Respective sections shown in FIG. 39 will be described below.

An expression feature amount extraction section 6224 calculates feature amounts corresponding to the expressions selected by the expression selection unit 6211 using feature point information obtained by the face feature point extraction section 6113.

Figure 40:
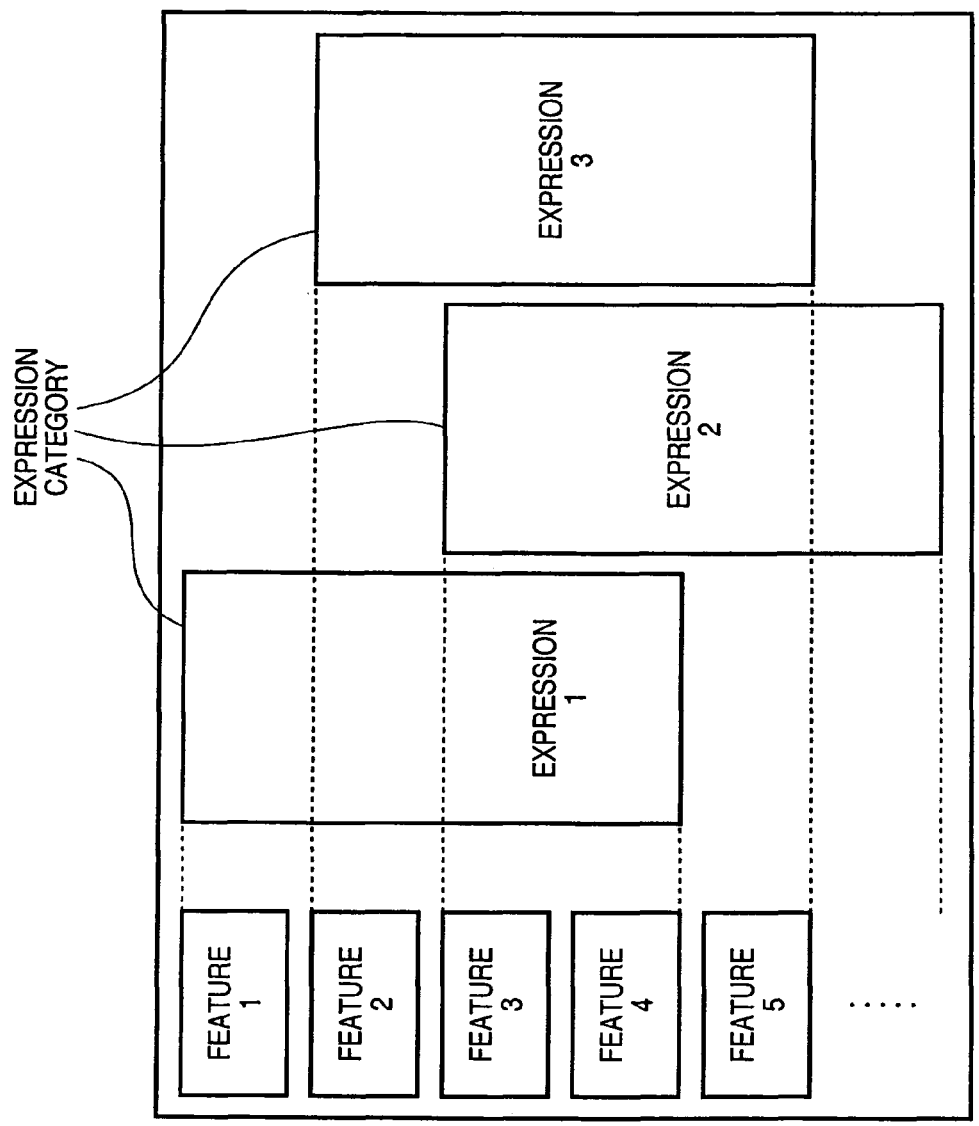
FIG. 40 shows feature amounts corresponding to respective expressions (expressions 1, 2, and 3) selected by an expression selection unit 6211.

FIG. 40 shows feature amounts corresponding to respective expressions (expressions 1, 2, and 3) selected by the expression selection unit 6211. For example, according to FIG. 40, features 1 to 4 must be calculated to recognize expression 1, and features 2 to 5 must be calculated to recognize expression 3.

For example, assuming that the expression selection unit 6211 selects an expression of joy, six features, i.e., the distance between the eye and mouth end points, eye edge length, eye edge slope, mouth edge length, mouth edge slope, and cheek-around edge density are required to recognize the expression of joy. In this way, expression-dependent feature amounts are required.

Such table indicating feature amounts required to recognize each expression (a table which stores correspondence exemplified in FIG. 40), i.e., a table that stores codes indicating expressions input from the expression selection unit 6211 and data indicating feature amounts required to recognize these expressions in correspondence with each other, is recorded in advance in the RAM 1002.

As described above, since a code corresponding to each selected expression is input from the expression selection unit 6211, the feature amount calculation unit 6212 can specify feature amounts required to recognize the expression corresponding to the code with reference to this table, and can consequently calculate feature amounts corresponding to the expression selected by the expression selection unit 6211.

Referring back to FIG. 38, the next feature amount change amount calculation unit 6103 calculates differences between the feature amounts calculated by the feature amount calculation unit 6212 and those held by the reference feature holding unit 6102, as in the seventh embodiment.

Note that the number and types of feature amounts to be calculated by the feature amount calculation unit 6212 vary depending on expressions. Therefore, the feature amount change amount calculation unit 6103 according to this embodiment reads out feature amounts required to recognize the expression selected by the expression selection unit 6211 from the reference feature holding unit 6102 and uses them. The feature amounts required to recognize the expression selected by the expression selection unit 6211 can be specified with reference to the table used by the feature amount calculation unit 6212.

Since six features, i.e., the distance between the eye and mouth end points, eye edge length, eye edge slope, mouth edge length, mouth edge slope, and cheek-around edge density are required to recognize the expression of joy, features similar to these six features are read out from the reference feature holding unit 6102 and are used.

Since the feature amount change amount calculation unit 6103 outputs the change amounts of respective feature amounts, the score calculation unit 6104 executes the same process as in the seventh embodiment. In this embodiment, since a plurality of expressions are often selected by the expression selection unit 6211, the unit 6103 executes the same score calculation process as in the seventh embodiment for each of the selected expressions, and calculates the scores for respective feature amounts for each expression.

Figure 41:
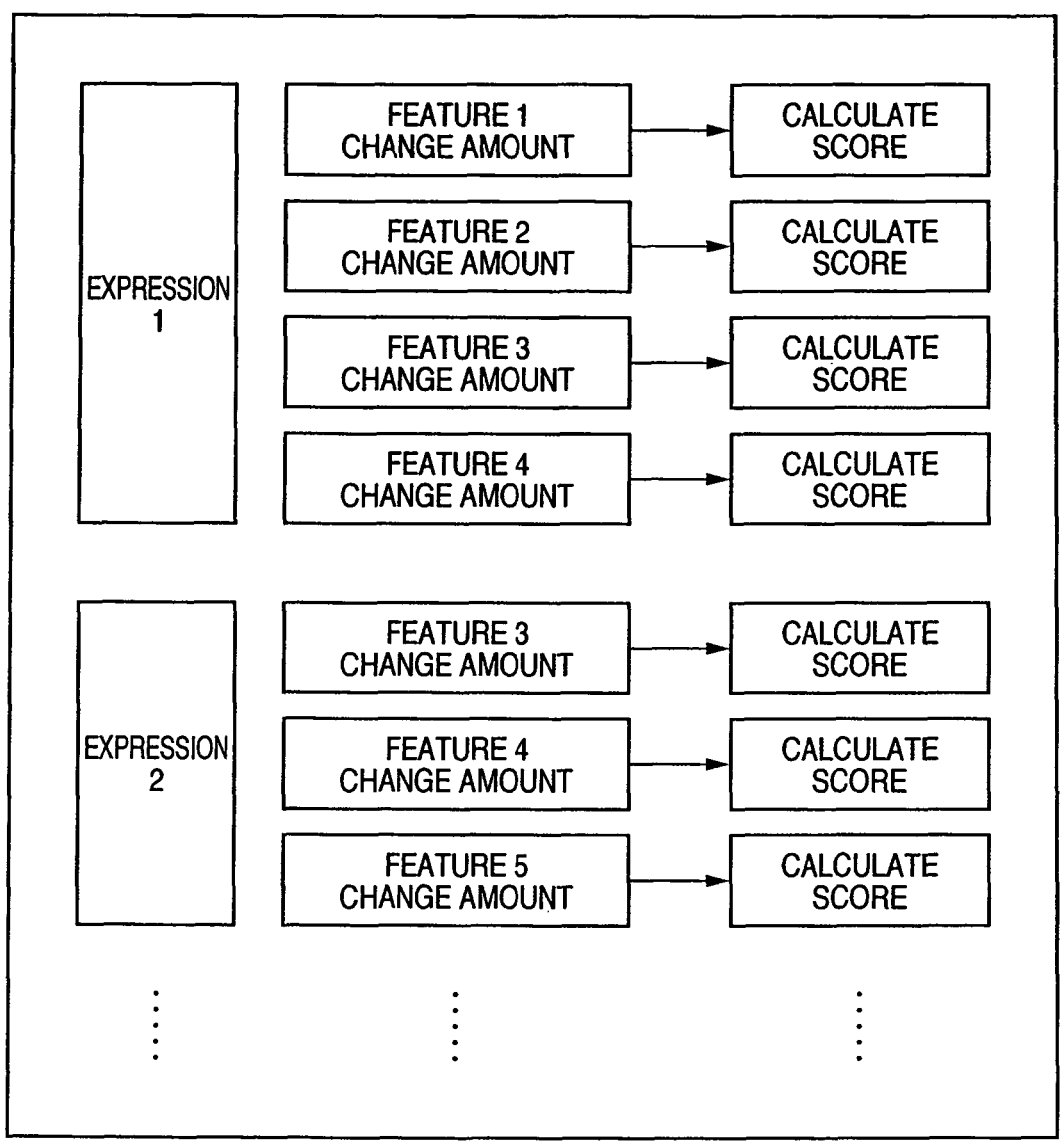
FIG. 41 shows a state wherein the scores are calculated based on change amounts for respective expressions.

FIG. 41 shows a state wherein the scores are calculated based on change amounts for respective expressions.

The expression determination unit 6105 calculates the sum total value of the scores for respective expressions pluralized by the expression selection unit 6211. An expression corresponding to the highest one of the sum total values for respective expressions can be determined as an expression of a face in the input images.

For example, if an expression of joy of those of joy, grief, anger, surprise, hatred, and fear has the highest score sum total, it is determined that the expression is an expression of joy.

10th Embodiment

An image processing apparatus according to this embodiment further determines a degree of expression in an expression scene when it determines the expression of a face in input images. As for the basic arrangement and functional arrangement of the image processing apparatus according to this embodiment, those of any of the seventh to ninth embodiments may be applied.

In a method of determining the degree of expression, transition of a score change or score sum total calculated by the score calculation unit for an input image which is determined by the expression determination unit to have a specific expression is referred to.

If the score sum total calculated by the score calculation unit has a small difference from a threshold value of the sum total of the scores, it is determined that the degree of joy is small. Conversely, if the score sum total calculated by the score calculation unit has a large difference from a threshold value of the sum total of the scores, it is determined that the degree of joy is large. This method can similarly determine the degree of expression for expressions other than the expression of joy.

11th Embodiment

In the above embodiment, whether or not the eye is closed can be determined based on the score of the eye shape calculated by the score calculation unit.

Figure 43:
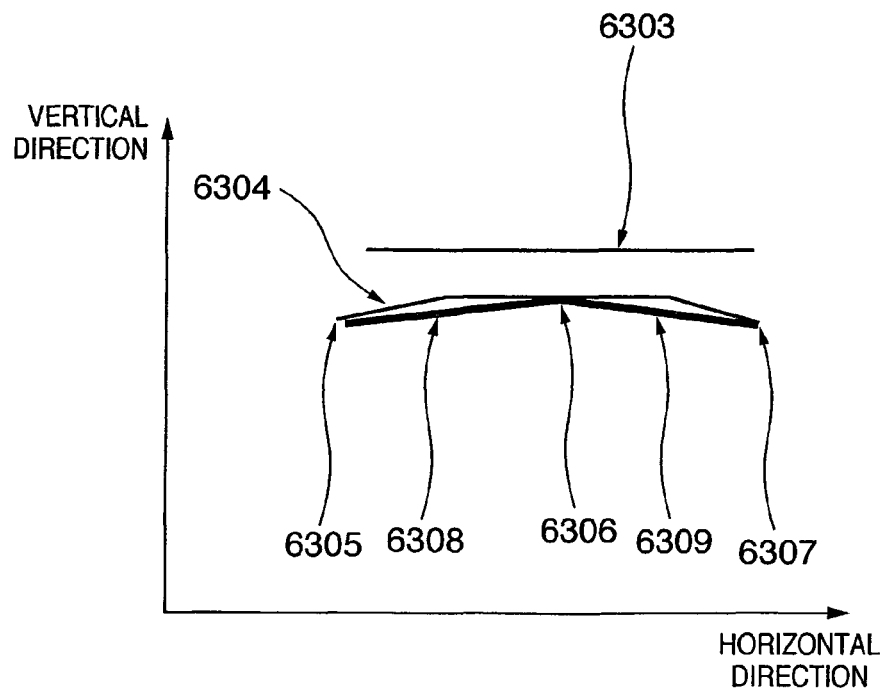
FIG. 43 shows the edge of an eye of a reference face, i.e., that of the eye when the eye is open.
Figure 44:
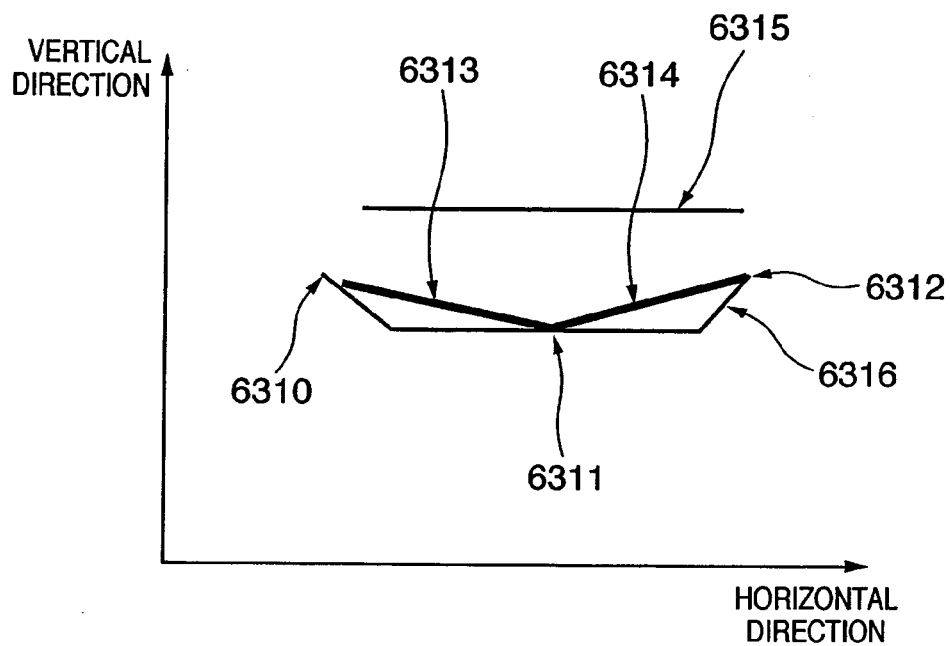
FIG. 44 shows the edge of an eye when the eye is closed.

FIG. 43 shows the edge of an eye of a reference face, i.e., that of the eye when the eye is open, and FIG. 44 shows the edge of an eye when the eye is closed.

The length of an eye edge 6316 when the eye is closed, which is extracted by the feature amount extraction unit remains the same as that of an eye edge 6304 of the reference image.

However, upon comparison between the slope of a straight line 6308 obtained by connecting feature points 6305 and 6306 of the eye edge 6304 when the eye is open in FIG. 43 and that of a straight line 6313 obtained by connecting feature points 6310 and 6311 of the eye edge 6316 when the eye is closed in FIG. 44, the change amount of the slope of the straight line becomes negative when the state wherein the eye is open changes to the state wherein the eye is closed.

Also, upon comparison between the slope of a straight line 6309 obtained from feature points 6306 and 6307 of the eye edge 6304 when the eye is open in FIG. 43 and that of a straight line 6314 obtained from feature points 6311 and 6312 of the eye edge 6316 when the eye is closed in FIG. 44, the change amount of the slope of the straight line becomes positive when the state wherein the eye is closed changes to the state wherein the eye is open.

Hence, when the eye edge length remains the same, the absolute values of the change amounts of the slopes of the aforementioned two, right and left straight lines obtained from the eye edge have a predetermined value or more, and these change amounts respectively exhibit negative and positive changes, it is determined that the eye is more likely to be closed, and the score to be calculated by the score calculation unit is extremely reduced in correspondence with the change amounts of the slopes of the straight lines.

Figure 42:
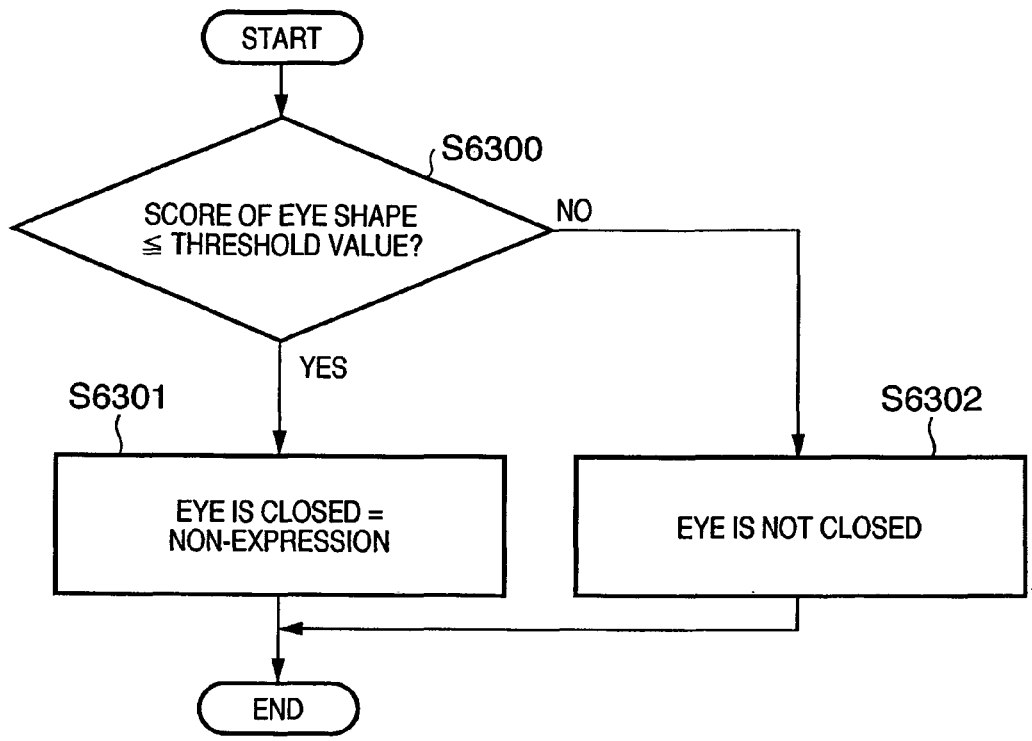
FIG. 42 is a flowchart of a determination process for determining based on the scores of the shapes of eyes calculated by a score calculation unit whether or not the eyes are closed.

FIG. 42 is a flowchart of a determination process for determining whether or not the eye is closed, on the basis of the scores of the eye shapes calculated by the score calculation unit.

As described above, whether or not the score corresponding to the eye shape is equal to or smaller than a threshold value is checked. If the score is equal to or smaller than the threshold value, it is determined that the eye is closed; otherwise, it is determined that the eye is not closed.

12th Embodiment

Figure 45:
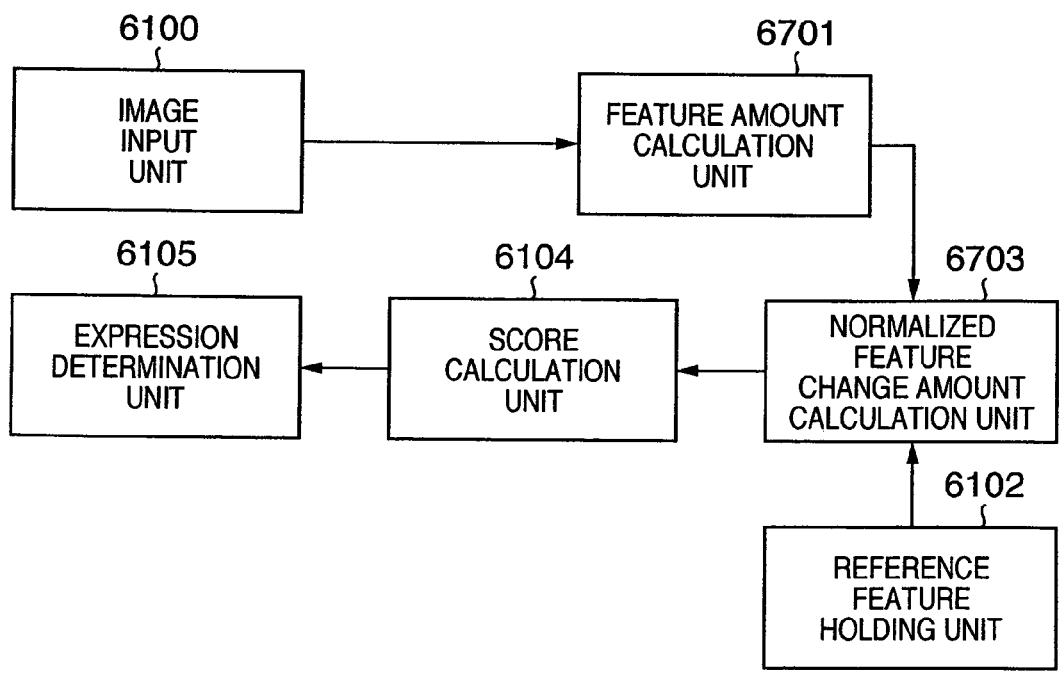
FIG. 45 is a block diagram showing the functional arrangement of an image processing apparatus according to the 12th embodiment of the present invention.

FIG. 45 is a block diagram showing the functional arrangement of an image processing apparatus according to this embodiment. The same reference numerals in FIG. 45 denote parts that make substantially the same operations as those in FIG. 23, and a description thereof will be omitted. Note that the basic arrangement of the image processing apparatus according to this embodiment is the same as that of the seventh embodiment, i.e., that shown in FIG. 11.

Figure 46:
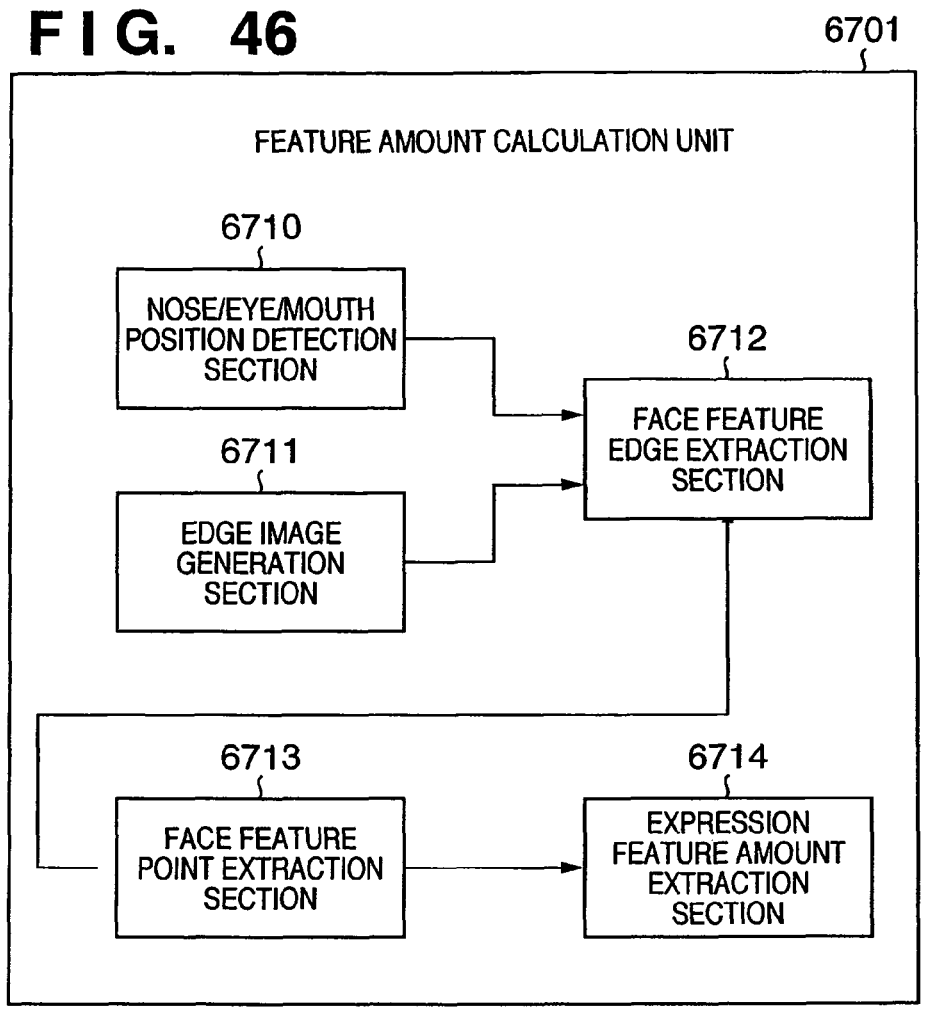
FIG. 46 is a block diagram showing the functional arrangement of a feature amount extraction unit 6701.

A feature amount extraction unit 6701 comprises a nose/eye/mouth position calculation section 6710, edge image generation section 6711, face feature edge extraction section 6712, face feature point extraction section 6713, and expression feature amount extraction section 6714, as shown in FIG. 46. FIG. 46 is a block diagram showing the functional arrangement of the feature amount extraction unit 6701.

A normalized feature change amount calculation unit 6703 calculates ratios between respective features obtained from the feature extraction unit 6701 and those obtained from a reference feature holding unit 6702. Note that feature change amounts calculated by the normalized feature change amount calculation unit 6703 are a "distance between eye and mouth end points", "eye edge length", "eye edge slope", "mouth edge length", and "mouth edge slope" if a smile is to be detected. Furthermore, respective feature amounts are normalized according to face size and rotation variations.

Figure 47:
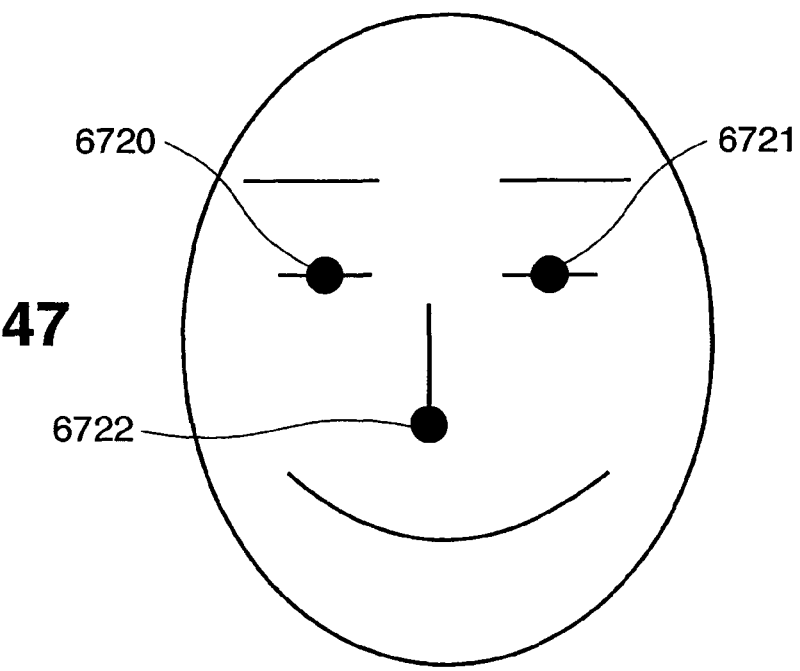
FIG. 47 shows the barycentric positions of eyes and a nose in a face in an image.

A method of normalizing the feature change amounts calculated by the normalized feature change amount calculation unit 6703 will be described below. FIG. 47 shows the barycentric positions of the eyes and nose in a face in an image. Referring to FIG. 47, reference numerals 6720 and 6721 respectively denote the barycentric positions of the right and left eyes; and 6722, the barycentric position of a nose. From the barycentric position 6722 of the nose and the barycentric positions 6720 and 6721 of the eyes, which are detected by the nose/eye/mouth position detection section 6710 of the feature amount extraction unit 6701 using corresponding templates, a horizontal distance 6730 between the right eye position and face position, a horizontal distance 6731 between the left eye position and face position, and a vertical distance 6732 between the average vertical coordinate position of the right and left eyes and the face position are calculated, as shown in FIG. 49.

Figure 48:
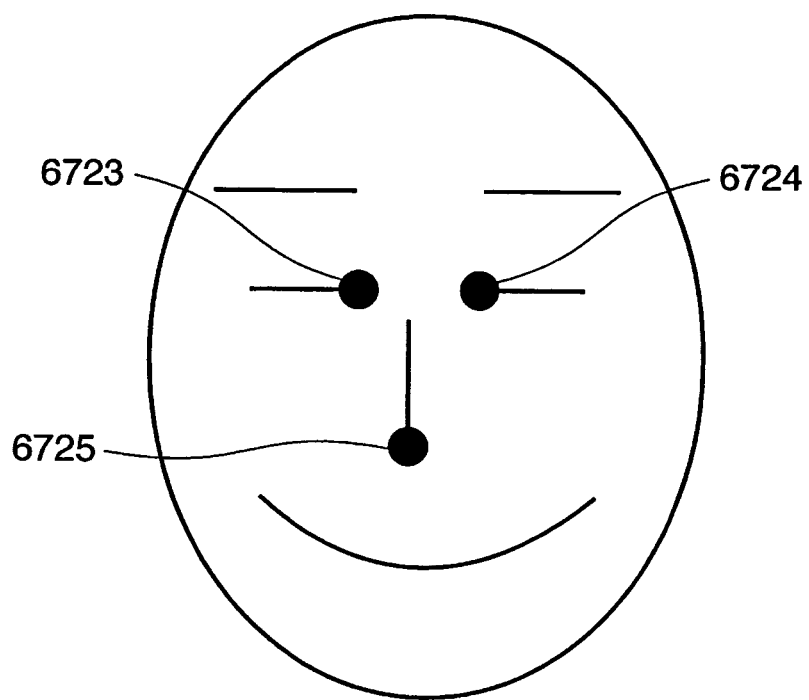
FIG. 48 shows the barycentric positions of right and left larmiers and a nose.

As for a ratio a:b:c of the horizontal distance 6730 between the right eye position and face position, the horizontal distance 6731 between the left eye position and face position, and the vertical distance 6732 between the average vertical coordinate position of the right and left eyes and the face position, when the face size varies, a ratio a1:b1:c1 of a horizontal distance 6733 between the right eye position and face position, a horizontal distance 6734 between the left eye position and face position, and a vertical distance 6735 between the average vertical coordinate position of the right and left eyes and the face position remains nearly unchanged, as shown in FIG. 50. However, a ratio a:a1 of the horizontal distance 6730 between the right eye position and face position when the size does not vary and the horizontal distance 6733 between the right eye position and face position, a horizontal distance 6734 between the left eye position and face position when the size varies, changes according to the face size variation. Upon calculating the horizontal distance 6730 between the right eye position and face position, the horizontal distance 6731 between the left eye position and face position, and the vertical distance 6732 between the average vertical coordinate position of the right and left eyes and the face position, eye end point positions (6723, 6724), right and left nasal cavity positions, and the barycentric position of the right and left nasal cavity positions may be used in addition to the barycentric positions of the nose and eyes, as shown in FIG. 48. As a method of calculating the eye end points, a method of scanning an edge and a method using a template for eye end point detection are available. As a method for calculating the nasal cavity positions, a method of using the barycentric positions of the right and left nasal cavities or right and left nasal cavity positions using a template for nasal cavity detection is available. As the distance between features used to determine a variation, other features such as a distance between right and left larmiers and the like may be used.

Figure 49:
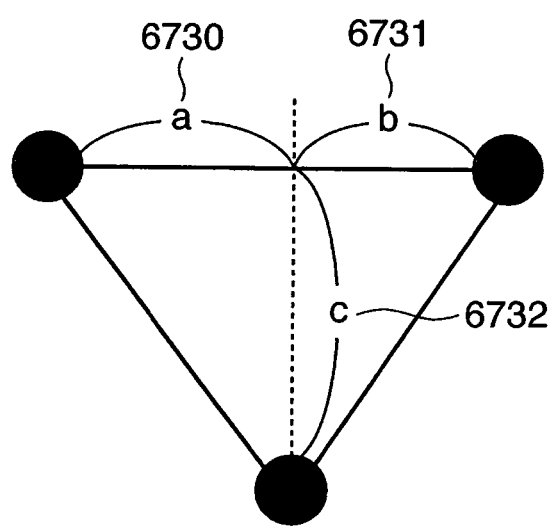
FIG. 49 shows the distance between right and left eyes, the distances between the right and left eyes and nose, and the distance between the eye and nose when no variation occurs.

Furthermore, a ratio c:c2 of the vertical distance 6732 between the average vertical coordinate position of the right and left eyes and the face position when the face does not rotate, as shown in FIG. 49 and a vertical distance 6738 between the average vertical coordinate position of the right and left eyes and the face position changes depending on the up or down rotation of the face, as shown in FIG. 51.

As shown in FIG. 52, a ratio a3:b3 of a horizontal distance 6739 between the right eye position and face position and a horizontal distance 6740 between the left eye position and face position changes compared to the ratio a:b of the horizontal distance 6730 between the right eye position and face position and the horizontal distance 6731 between the left eye position and face position when the face does not rotate to the right or left, as shown in FIG. 49.

Figure 53:
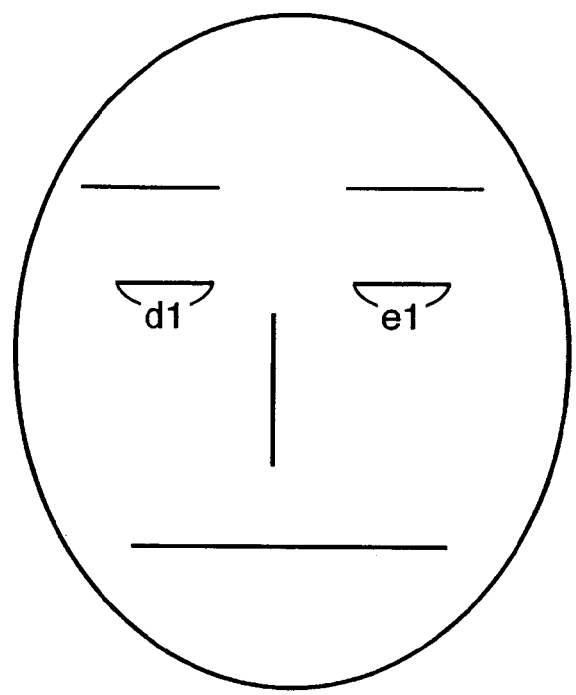
FIG. 53 shows the distances between the end points of the right and left eyes in case of an emotionless face.
Figure 54:
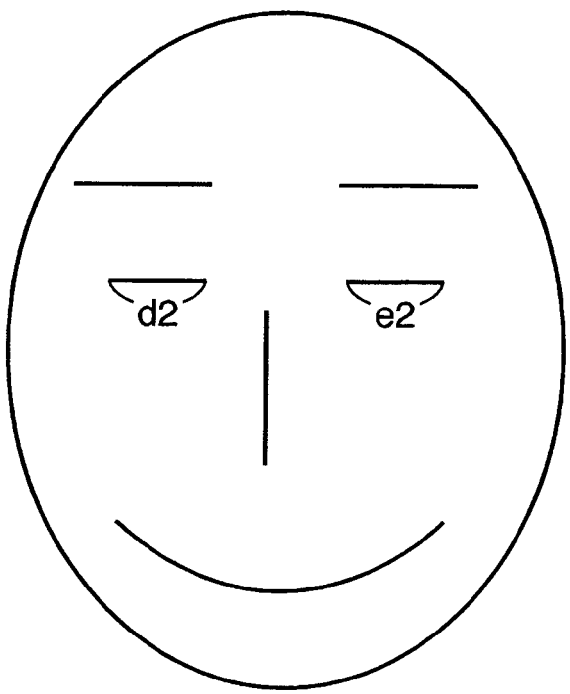
FIG. 54 shows the distances between the end points of the right and left eyes in case of a smiling face.

When the face has rotated to the right or left, a ratio g2/g1 of a ratio g1 (=d1/e1) of a distance d1 between the end points of the right eye and a distance e1 between the end points of the left eye of a reference image (an emotionless image) shown in FIG. 53 and a ratio g2 (=d2/e2) of a distance d2 between the end points of the right eye and a distance e2 between the end points of the left eye of an input image (a smiling image) shown in FIG. 54 may be used.

Figure 55B:
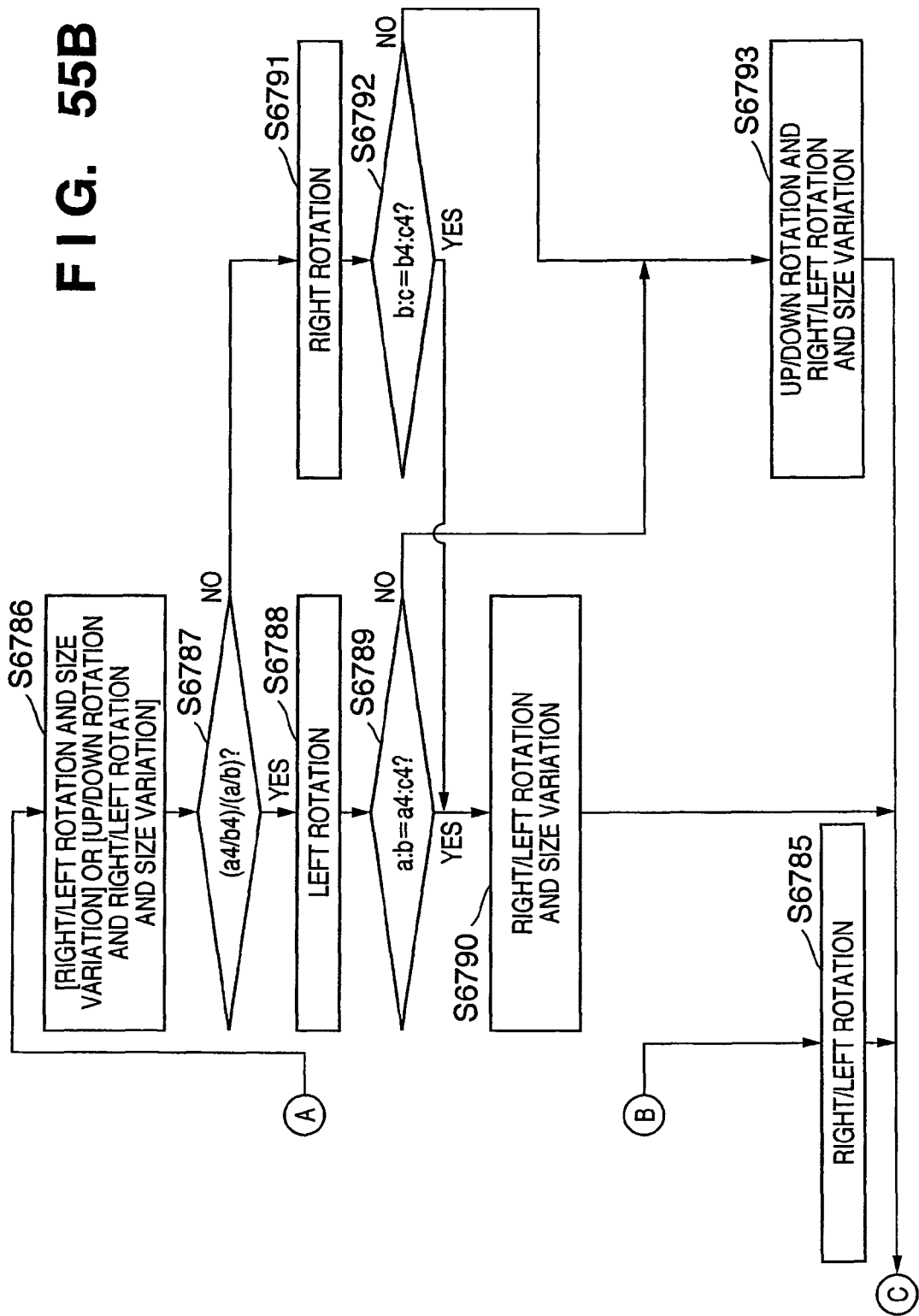
FIG. 55B is a flowchart of a process for determining a size variation, right/left rotation variation, and up/down rotation variation.
Figure 56:
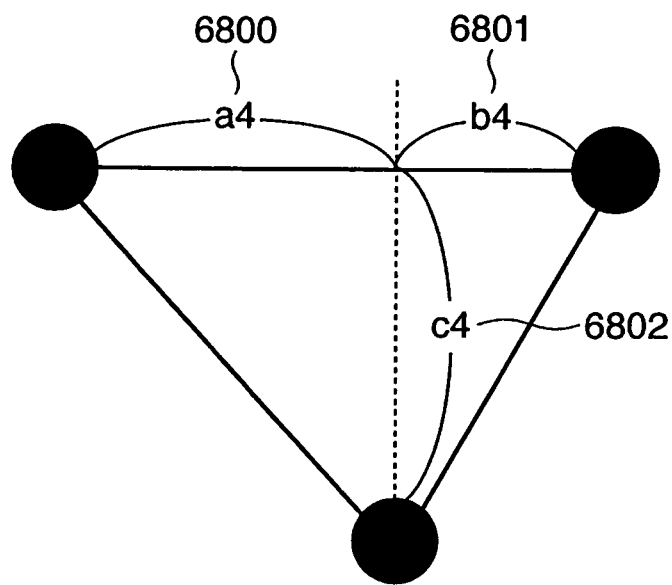
FIG. 56 shows the distance between right and left eyes, the distances between the right and left eyes and nose, and the distance between the eye and nose when one of a size variation, right/left rotation variation, and up/down rotation variation has occurred.

FIGS. 55A and 55B are flowcharts of the process for determining a size variation, right/left rotation variation, and up/down rotation variation. The process for determining a size variation, right/left rotation variation, and up/down rotation variation will be described below using the flowcharts of FIGS. 55A and 55B. In this case, FIG. 49 is used as a "figure that connects the positions of the eyes and nose via straight lines while no variation occurs, and FIG. 56 is used as a "figure that connects the positions of the eyes and nose via straight lines after a size variation, right/left rotation variation, or up/down rotation variation has occurred".

It is checked in step S6770 if a:b:c=a4:b4:c4. Upon checking if "two ratios are equal to each other", they need not always be "exactly equal" to each other, and it may be determined that they are "equal" if "the difference between the two ratios falls within a given allowable range".

If it is determined in the checking process in step S6770 that a:b:c=a4:b4:c4, the flow advances to step S6771 to determine "no change or size variation only". Furthermore, the flow advances to step S6772 to check if a/a4=1.

If a/a4=1, the flow advances to step S6773 to determine "no size and rotation variations". On the other hand, if it is determined in step S6772 that a/a4≠1, the flow advances to step S6774 to determine "size variation only".

On the other hand, if it is determined in the checking process in step S6770 that a:b:c≠a4:b4:c4, the flow advances to step S6775 to determine "any of up/down rotation, right/left rotation, up/down rotation and size variation, right/left rotation and size variation, up/down rotation and right/left rotation, and up/down rotation and right/left rotation and size variation".

The flow advances to step S6776 to check if a:b=a4:b4 (the process for checking if "two ratios are equal to each other" in this case is done in the same manner as in step S6770). If a:b=a4:b4, the flow advances to step S6777 to determine "any of up/down rotation, and up/down rotation and size variation". The flow advances to step S6778 to check if a/a4=1. If it is determined that a/a4≠1, the flow advances to step S6779 to determine "up/down rotation and size variation". On the other hand, if it is determined that a/a4=1, the flow advances to step S6780 to determine "up/down rotation only".

On the other hand, if it is determined in step S6776 that a:b≠a4:b4, the flow advances to step S6781 to check if a/a4=1, as in step S6778.

If a/a4=1, the flow advances to step S6782 to determine "any of right/left rotation, and up/down rotation and right/left rotation". The flow advances to step S6783 to check if c/c3=1. If it is determined that c/c≠1, the flow advances to step S6784 to determine "up/down rotation and right/left rotation". If it is determined that c/c3=1, the flow advances to step S6785 to determine "right/left rotation".

On the other hand, if it is determined in step S6781 that a/a4≠1, the flow advances to step S6786 to determine "any of right/left rotation and size variation, and up/down rotation and right/left rotation and size variation". The flow advances to step S6787 to check if (a4/b4)/(a/b)>1.

If (a4/b4)/(a/b)>1, the flow advances to step S6788 to determine "left rotation". The flow advances to step S6789 to check if a:c=a4:c4 (the same "equal" criterion as in step S6770 applies). If a:c=a4:c4, the flow advances to step S6790 to determine "right/left rotation and size variation". On the other hand, if a:c≠a4:c4, the flow advances to step S6793 to determine "up/down rotation and right/left rotation and size variation".

On the other hand, if it is determined in step S6787 that (a4/b4)/(a/b)≦1, the flow advances to step S6791 to determine "right rotation". The flow advances to step S6792 to check if b:c=b4:c4 (the same "equal" criterion as in step S6770 applies). If b:c=b4:c4, the flow advances to step S6790 to determine "right/left rotation and size variation". On the other hand, if b:c≠b4:c4, the flow advances to step S6793 to determine "up/down rotation and right/left rotation and size variation". The ratios used in respective steps are not limited to those written in the flowcharts. For example, in steps S6772, S6778, and S6781, b/b4, (a+b)/(a4+b4), and the like may be used.

With the above process, the face size and rotation variations can be determined. If these variations are determined, respective feature change amounts calculated by the normalized feature change amount calculation unit 6703 are normalized, thus allowing recognition of an expression even when the face size has varied or the face has rotated.

Figure 57:
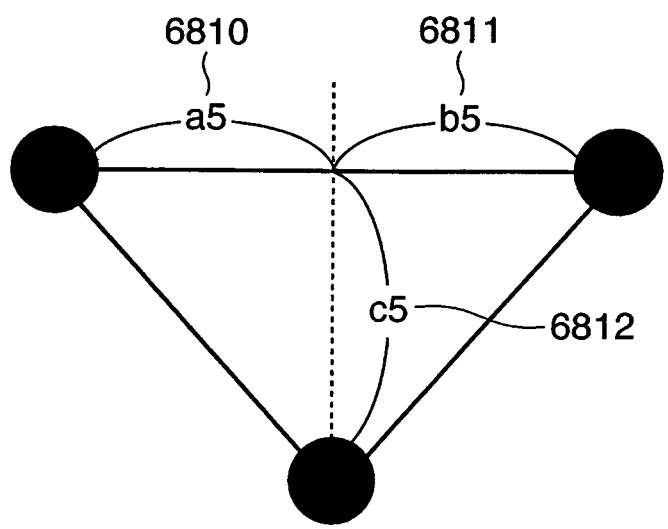
FIG. 57 shows the distance between right and left eyes, the distances between the right and left eyes and nose, and the distance between the eye and nose when a up/down rotation variation and size variation have occurred.

As the feature amount normalization method, for example, a case will be explained below using FIGS. 49 and 50 wherein only a size variation has taken place. In such case, all feature change amounts obtained from an input image need only be multiplied by 1/(a1/a). Note that 1(1b/b), 1/((a1+b1)/(a+b)), 1/(c1/c), and other features may be used in place of 1/(a1/a). When an up/down rotation and size variation have occurred, as shown in FIG. 57, after the distances between the eye and mouth end points, which are influenced by the up/down rotation, multiplied by (a5/c5)/(a/c), all feature amounts can be multiplied by 1/(a1/a). In case of the up/down rotation, the present invention is not limited to use of (a5/c5)/(a/c) as in the above case. In this way, the face size variation, and up/down and right/left rotation variations are determined, and the feature change amounts are normalized to allow recognition of an expression even when the face size has varied or the face has suffered the up/down rotation variation and/or right/left rotation variation.

Figure 58:
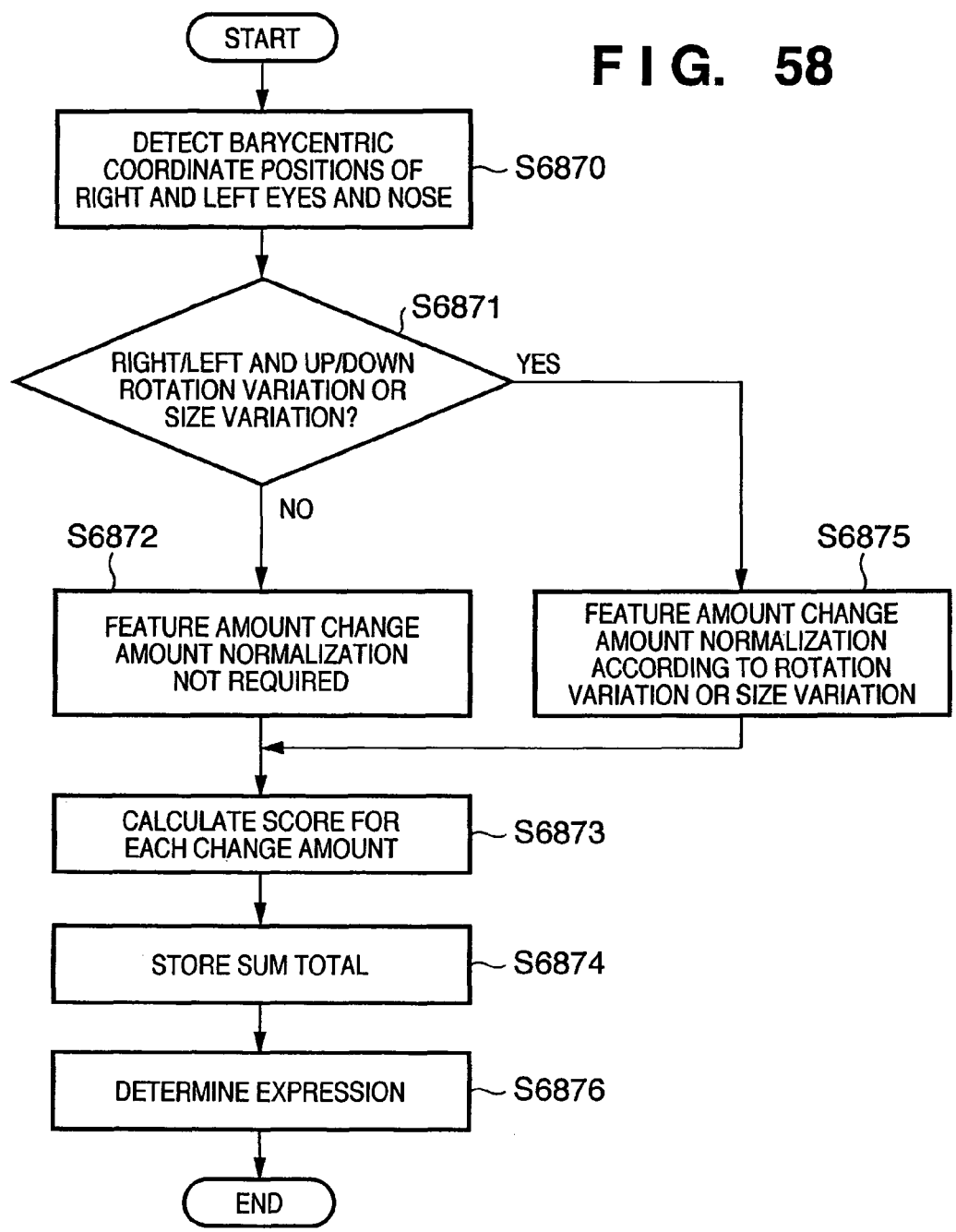
FIG. 58 is a flowchart of a process for normalizing feature amounts in accordance with up/down and right/left rotation variations and size variation on the basis of the detected positions of the right and left eyes and nose, and determining an expression.

FIG. 58 is a flowchart of a process for normalizing feature amounts in accordance with up/down and right/left rotation variations and size variation on the basis of the detected positions of the right and left eyes and nose, and determining an expression.

After the barycentric coordinate positions of the right and left eyes and nose are detected in step S6870, it is checked in step S6871 if right/left and up/down rotation variations or a size variation have occurred. If neither right/left nor up/down rotation variations have occurred, it is determined in step S6872 that normalization of feature change amounts is not required. The ratios of the feature amounts to reference feature amounts are calculated to calculate change amounts of the feature amounts. The scores are calculated for respective features in step S6873, and the score sum total are calculated from respective feature amount change amounts in step S6874. On the other hand, if it is determined in step S6871 that the right/left and up/down rotation variations or size variation have occurred, it is determined in step S6875 that normalization of feature change amounts is required. The ratios of the feature amounts to reference feature amounts are calculated to calculate change amounts of the feature amounts, which are normalized in accordance with the right/ left and up/down rotation variations or size variation. After that, the scores are calculated for respective features in step S6873, and the score sum total are calculated from respective feature amount change amounts in step S6974.

An expression of a face in the input image is determined on the basis of the calculated sum total of the scores in the same manner as, in the first embodiment in step S6876.

13th Embodiment

Figure 59:
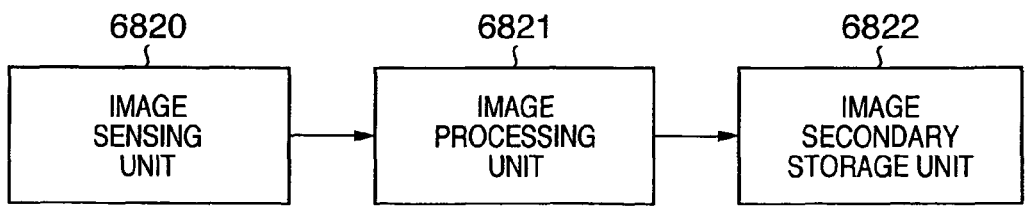
FIG. 59 is a block diagram showing the functional arrangement of an image sensing apparatus according to the 13th embodiment of the present invention.

FIG. 59 is a block diagram showing the functional arrangement of an image sensing apparatus according to this embodiment. The image sensing apparatus according to this embodiment comprises an image sensing unit 6820, image processing unit 6821, and image secondary storage unit 6822, as shown in FIG. 59.

Figure 60:
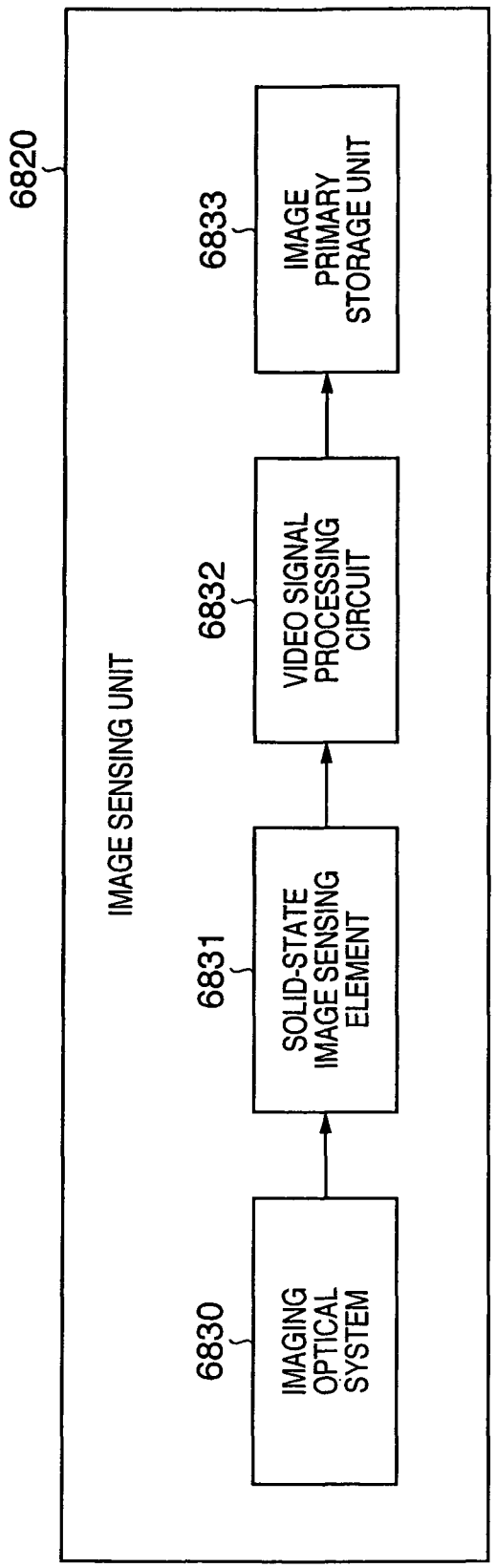
FIG. 60 is a block diagram showing the functional arrangement of an image sensing unit 6820.

FIG. 60 is a block diagram showing the functional arrangement of the image sensing unit 6820. As shown in FIG. 60, the image sensing unit 6820 roughly comprises an imaging optical system 6830, solid-state image sensing element 6831, video signal process 6832, and image primary storage unit 6833.

The imaging optical system 6830 comprises, e.g., a lens, which images external light on the next solid-state image sensing element 6831, as is well known. The solid-state image sensing element 6831 comprises, e.g., a CCD, which converts an image formed by the imaging optical system 6830 into an electrical signal, and consequently output a sensed image to the next video signal processing circuit 6832 as an electrical signal, as is well known. The video signal processing circuit 6832 A/D-converts this electrical signal, and outputs a digital signal to the next image primary storage unit 6833. That is, data of a sensed image is output to the image primary storage unit 6833. The image primary storage unit 6833 comprises a storage medium such as a flash memory or the like, and stores data of the sensed image.

Figure 61:
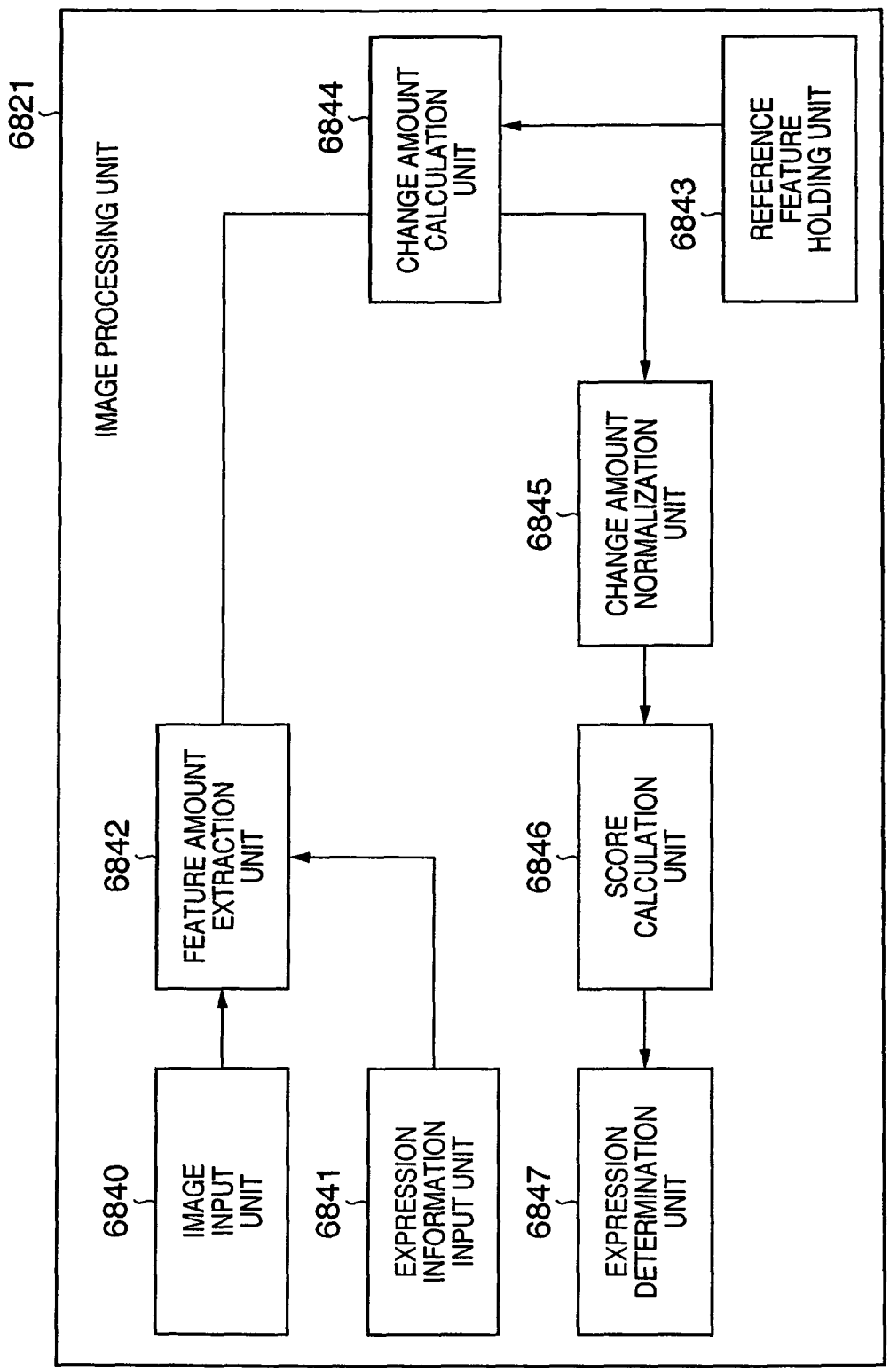
FIG. 61 is a block diagram showing the functional arrangement of an image processing unit 6821.

FIG. 61 is a block diagram showing the functional arrangement of the image processing unit 6821. The image processing unit 6821 comprises an image input unit 6840 which reads out sensed image data stored in the image primary storage unit 6833 and outputs the readout data to a next feature amount extraction unit 6842, an expression information input unit 6841 which receives expression information (to be described later) and outputs it to the next feature amount extraction unit 6842, the feature amount extraction unit 6842, a reference feature holding unit 6843, a change amount calculation unit 6844 which calculates change amounts by calculating the ratios of feature amounts extracted by the feature amount extraction unit 6842, a change amount normalization unit 6845 which normalizes the change amounts of respective features calculated by the change amount calculation unit 6844 in accordance with rotation and up/down variations, or a size variation, a score calculation unit 6846 which calculates scores for respective change amounts from the change amounts of features normalized by the change amount normalization unit 6845, and an expression determination unit 6847. The respective units shown in FIG. 61 have the same functions as those with the same names which appear in the above embodiments, unless otherwise specified.

The expression information input unit 6841 inputs photographing expression information when a photographer selects an expression to be photographed. That is, when the photographer wants to take a smiling image, he or she selects a smile photographing mode. In this manner, only a smile is photographed. Hence, this expression information indicates a selected expression. Note that the number of expressions to be selected is not limited to one, but a plurality of expressions may be selected.

Figure 62:
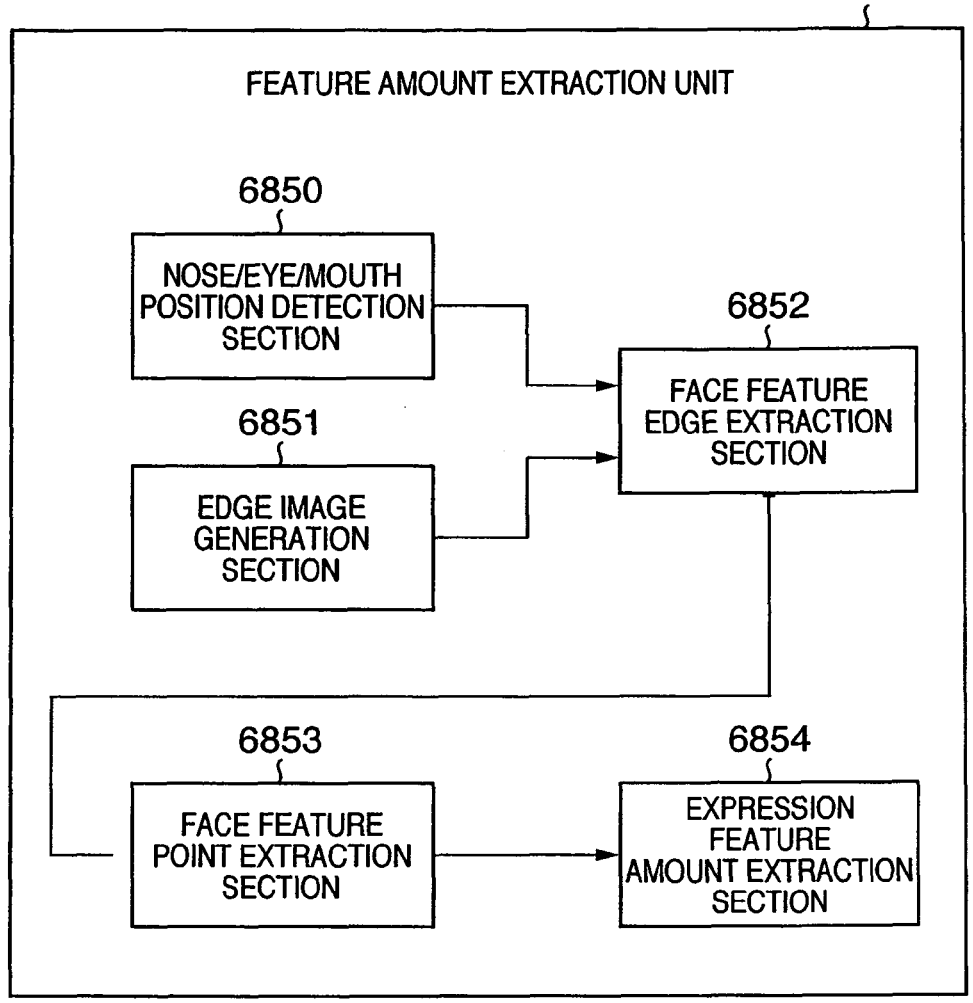
FIG. 62 is a block diagram showing the functional arrangement of a feature amount extraction unit 6842.

FIG. 62 is a block diagram showing the functional arrangement of the feature amount extraction unit 6842. As shown in FIG. 62, the feature amount extraction unit 6842 comprises a nose/eye/mouth position calculation section 6850, edge image generation section 6851, face feature edge extraction section 6852, face feature point extraction section 6853, and expression feature amount extraction section 6854. The functions of the respective units are the same as those shown in FIG. 46, and a description thereof will be omitted.

The image input unit 6840 in the image processing unit 6821 reads out sensed image data stored in the image primary storage unit 6833, and outputs the readout data to the next feature amount extraction unit 6842. The feature amount extraction unit 6842 extracts feature amounts of an expression to be photographed, which is selected by the photographer, on the basis of expression information input from the expression information input unit 6841. For example, when the photographer wants to take a smiling image, the unit 6842 extracts feature amounts required to recognize a smile.

Furthermore, the change amount calculation unit 6844 calculates change amounts of respective feature amounts by calculating the ratios between the extracted feature amounts and those which are held by the reference feature holding unit 6843. The change amount normalization 6845 normalizes the ratios of respective feature change amounts calculated by the change amount calculation unit 6844 in accordance with a face size variation or rotation variation. The score calculation unit 6846 calculates scores in accordance with weights and change amounts for respective features.

Figure 63:
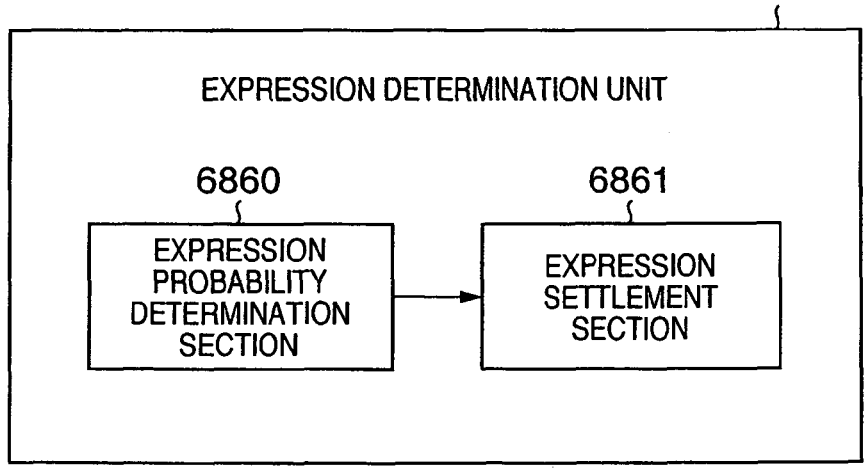
FIG. 63 is a block diagram showing the functional arrangement of an expression determination unit 6847.

FIG. 63 is a block diagram showing the functional arrangement of the expression determination unit 6847. An expression probability determination section 6860 performs probability determination of an expression obtained by the expression information input unit 6841 by a threshold process of the sum total of the scores for respective features calculated by the score calculation unit 6846. An expression settlement section 6861 settles an expression obtained by the expression information input unit 6841 on the basis of continuity of expression probability determination results. If an input expression matches the expression obtained by the expression information input unit 6841, image data sensed by the image sensing unit 6820 is stored in the image secondary storage unit 6822.

In this way, only an image with an expression that the photographer intended can be recorded.

Note that the functional arrangement of the image processing unit 6821 is not limited to this, and the apparatus (or program) which is configured to execute the expression recognition process in each of the above embodiments may be applied.

14th Embodiment

FIG. 64 is a block diagram showing the functional arrangement of an image sensing apparatus according to this embodiment. The same reference numerals in FIG. 64 denote the same parts as those in FIG. 59, and a description thereof will be omitted. The image sensing apparatus according to this embodiment comprises an arrangement to which an image display unit 6873 is added to the image sensing apparatus according to the 13th embodiment.

The image display unit 6873 comprises a liquid crystal display or the like, and displays an image recorded in the image secondary storage unit 6822. Note that the image display unit 6873 may display only an image selected by the photographer using the image processing unit 6821. The photographer can select whether or not an image displayed on the image display unit 6873 is to be stored in the image secondary storage unit 6822 or is to be deleted. For this purpose, the image display unit 6873 may comprise a touch panel type liquid crystal display, which displays, on its display screen, a menu that prompts the photographer to select whether an image displayed on the image display unit 6873 is to be stored in the image secondary storage unit 6822 or is to be deleted, so as to allow the photographer to make one of these choices.

According to the aforementioned arrangement of the present invention, an expression of a face in an image can be accurately determined by a method robust against personal differences, expression scenes, and the like. Furthermore, even when the face size has varied or the face has rotated, an expression of a face in an image can be determined more accurately.

In the above embodiments, an object to be photographed is a face. However, the present invention is not limited to such specific object, and vehicles, buildings, and the like may be photographed.

Other Embodiments

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements novel functions of the present invention, and the recording medium which stores the program code constitutes the present invention.

The functions of the above-mentioned embodiments may be implemented not only by executing the readout program code by the computer but also by some or all of actual processing operations executed by an OS or the like running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores program codes corresponding to the aforementioned flowcharts.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2003-199357 filed on Jul. 18, 2003, Japanese Patent Application No. 2003-199358 filed on Jul. 18, 2003, Japanese Patent Application No. 2004-167588 filed on Jun. 4, 2004, and Japanese Patent Application No. 2004-167589 filed on Jun. 4, 2004, the entire contents of which are incorporated by reference herein.

The invention claimed is:

1. An image sensing apparatus comprising:
a sensing unit constructed to successively sense images;
a region determination unit constructed to determine a face region in each of the successively sensed images;
an extraction unit constructed to extract predetermined features representing parts of a face from the determined face region in each of the successively sensed images;
a score derivation unit constructed to derive a score corresponding to an expression of the face in each of the successively sensed images on the basis of the predetermined features extracted from the face region;
a recording unit constructed to selectively record the successively sensed images in a predetermined storage device; and
a control unit constructed to control whether or not to perform recording in the predetermined storage device for each of the successively sensed images, based on the score derived for each of the successively sensed images.

2. An image processing apparatus comprising:
a sensing unit constructed to successively sense frame images;
a region determination unit constructed to determine a face region in each of the successively sensed frame images;
an extraction unit constructed to extract predetermined features representing parts of a face from the determined face region in each of the successively sensed frame images;
a score derivation unit constructed to derive a score corresponding to an expression of the face on the basis of differences between relative positions of predetermined features detected from a face image which is set in advance as a reference and the extracted predetermined features included in a region of an image of a second frame subsequent to a first frame, wherein the region of the image of the second frame positionally corresponds to the face region determined by said region determination unit in an image of the first frame sensed by said sensing unit;
a recording unit constructed to selectively record the successively sensed frame images in a predetermined storage device; and
a control unit constructed to control whether or not to perform recording in the predetermined storage device for each of the successively sensed frame images, based on the score derived for each of the successively sensed frame images.

3. An image processing apparatus comprising:
a sensing unit constructed to successively sense images;
a region determination unit constructed to determine a face region in each of the successively sensed images;
an extraction unit constructed to extract predetermined features representing parts of a face from the determined face region in each of the successively sensed images;
a first determination unit constructed to identify a person who has the face in the image sensed by said sensing unit using the predetermined features extracted from the face region determined by said region determination unit;
score derivation unit constructed to derive a score corresponding to an expression of the face using the predetermined features extracted from the face region determined by said region determination unit;
a recording unit constructed to selectively record the successively sensed images in a predetermined storage device; and a control unit constructed to control whether or not to perform recording in the predetermined storage device for each of the successively sensed images, based on the score derived for each of the successively sensed images.

4. An image processing method comprising: performing by a processor the following steps:
an input step of successively sensing images;
a region determination step of determining a face region in each of the successively sensed images;
an extraction step of extracting predetermined features representing parts of a face from the determined face region in each of the successively sensed images;
a score derivation step of deriving a score corresponding to an expression of the face in each of the successively sensed images on the basis of the predetermined features extracted from the face region;
a recording step of selectively recording the successively sensed images in a predetermined storage device; and
a control step of controlling whether or not to perform recording in the predetermined storage device for each of the successively sensed images, based on the score derived for each of the successively sensed images.

5. An image processing method comprising:
performing by a processor the following steps:
an input step of successively sensing frame images;
a region determination step of determining a face region in each of the successively sensed frame images;
an extraction step of extracting predetermined features representing parts of a face from the determined face region in each of the successively sensed frame images;
a score derivation step of deriving a score corresponding to an expression of the face on the basis of differences between relative positions of the predetermined features detected from a face image which is set in advance as a reference and the extracted predetermined features included in a region of an image of a second frame subsequent to a first frame, wherein the region of the image of the second frame positionally corresponds to the face region determined in said region determination step in an image of the first frame sensed in the sensing step;
a recording step of selectively recording the successively sensed frame images in a predetermined storage device; and
a control step of controlling whether or not to perform recording in the predetermined storage device for each of the successively sensed frame images, based on the score derived for each of the successively sensed frame images.

6. An image processing method comprising: performing by a processor the following steps:
a sensing step of successively sensing images;
a region determination step of determining a face region in each of the successively sensed images;
an extraction step of extracting predetermined features representing parts of a face from the determined face region in each of the successively sensed images;
a first determination step of identifying a person who has the face in the image sensed in the sensing step using the predetermined features extracted from the face region determined in the region determination step;
a score derivation step of deriving a score corresponding to an expression of the face using the predetermined features extracted from the face region determined in the region determination step;
a recording step of selectively recording the successively sensed images in a predetermined storage device; and
a controlling step of controlling whether or not to perform recording in the predetermined storage device for each of the successively sensed images, based on the score derived for each of the successively sensed images.

7. A computer-executable program retrievably stored on a non-transitory computer-readable storage medium for making a computer execute an image processing method of claim 4.

8. A non-transitory computer-readable storage medium retrievably storing a program of claim 7.

9. An image sensing apparatus according to claim 1, further comprising:
a first feature detection unit for detecting a plurality of local features from an entirety of the image sensed by said sensing unit; and
a second feature detection unit for detecting predetermined features representing parts of the face from the entirety of the sensed image on the basis of combinations of the detected local features,
wherein said region determination unit determines the face region in the sensed image on the basis of the detected predetermined features.

10. An image sensing apparatus according to claim 9, wherein said extraction unit extracts predetermined features included within the determined predetermined face region from the predetermined features in the entirety of the sensed image detected by said second feature detection unit.

11. An image sensing apparatus according to claim 1, wherein said score derivation unit derives the score corresponding to the expression of the face on the basis of the differences between relative positions of the predetermined features extracted from the face region and predetermined features detected in a face image which is set in advance as a reference.

12. An image processing apparatus according to claim 3, further comprising:
a first feature detection unit for detecting a plurality of local features from an entirety of the image sensed by said sensing unit; and
a second feature detection unit for detecting predetermined features representing parts of the face from the entirety of the sensed image on the basis of combination of the detected local features,
wherein said region determination unit determines the face region in the sensed image on the basis of the detected predetermined features.

13. The apparatus according to claim 9, wherein said first feature detection unit, said second feature detection unit and said region determination unit comprise a hierarchical neural network, and wherein intermediate layer outputs of the hierarchical neural network are used as detection results for the predetermined features.

14. The apparatus according to claim 11, wherein said score derivation unit derives which distribution, of a number of distributions corresponding to respective expressions derived in advance, has a highest similarity to a distribution of differences between relative positions of the predetermined features extracted from the face region and relative positions derived in advance as references for the predetermined features in the face region, and determines an expression indicated by the distribution with the highest similarity.

15. The apparatus according to claim 11, wherein
said input unit successively inputs images by successively executing a process of inputting a next image when said region determination unit completes a process for determining a face region, and
wherein said score derivation unit executes a process for deriving the score corresponding to the expression of the face on the basis of differences between relative positions of the predetermined features extracted from the face region using an image previously sensed by said sensing unit at a timing when said sensing unit inputs an image, and relative positions derived in advance as references for the predetermined features in the face region.

16. An image processing apparatus according to claim 3, wherein said score derivation unit changes parameters used to perform expression determination for a face of interest, in according with a result from first determination unit which identifies the person of the face of interest.

17. A non-transitory computer-readable storage medium retrievably storing a program for making a computer execute an image processing method of claim 5.

18. A non-transitory computer-readable storage medium retrievably storing a program for making a computer execute an image processing method of claim 6.

\* \* \* \* \*